US010311527B2

(12) United States Patent
Pfeiffer et al.

(10) Patent No.: US 10,311,527 B2
(45) Date of Patent: Jun. 4, 2019

(54) AGRONOMIC VARIATION AND TEAM PERFORMANCE ANALYSIS

(71) Applicant: Deere & Company, Moline, IL (US)

(72) Inventors: Dohn W. Pfeiffer, Bettendorf, IA (US); Timothy A. Deutsch, Newton, IA (US); John F. Reid, Moline, IL (US); Alex D. Foessel, Sherrard, IL (US)

(73) Assignee: Deere & Company, Moline, IL (US)

( * ) Notice: Subject to any disclaimer, the term of this patent is extended or adjusted under 35 U.S.C. 154(b) by 355 days.

(21) Appl. No.: 14/546,725

(22) Filed: Nov. 18, 2014

(65) Prior Publication Data

US 2015/0199775 A1     Jul. 16, 2015

Related U.S. Application Data

(63) Continuation-in-part of application No. 14/445,699, filed on Jul. 29, 2014, which is a continuation-in-part of application No. 14/271,077, filed on May 6, 2014, which is a continuation-in-part of application No. 14/155,023, filed on Jan. 14, 2014, now Pat. No. 9,892,376.

(51) Int. Cl.
*G06F 17/30* (2006.01)
*G06Q 50/02* (2012.01)
*G06Q 10/06* (2012.01)

(52) U.S. Cl.
CPC ....... *G06Q 50/02* (2013.01); *G06Q 10/06398* (2013.01)

(58) Field of Classification Search
CPC ........ G06F 17/30368; G06F 17/30554; G06Q 10/06; G06Q 50/02
See application file for complete search history.

(56) References Cited

U.S. PATENT DOCUMENTS

| | | | | |
|---|---|---|---|---|
| 4,951,031 | A | | 8/1990 | Strubbe |
| 5,585,757 | A | * | 12/1996 | Frey .................. G06G 7/24 327/348 |
| 5,679,094 | A | * | 10/1997 | Nakamura ............. F01L 1/356 477/110 |
| 5,734,849 | A | * | 3/1998 | Butcher ............ G06F 13/4243 710/124 |
| 5,751,199 | A | * | 5/1998 | Shiau .................. H01P 1/2136 333/134 |

(Continued)

FOREIGN PATENT DOCUMENTS

| | | |
|---|---|---|
| CN | 101622928 A | 1/2010 |
| EP | 1714822 A2 | 10/2006 |

(Continued)

OTHER PUBLICATIONS

Electronic Fleet Management for Work Truck Fleets: Jun. 20, 2013 2 pages. www.zonarsystems.com.

(Continued)

*Primary Examiner* — Daniel A Kuddus
(74) *Attorney, Agent, or Firm* — Joseph R. Kelly; Kelly, Holt & Christenson PLLC

(57) ABSTRACT

Performance information indicative of operator performance of a mobile machine is received. A performance opportunity space is identified, indicative of possible performance improvement. Savings identified in the performance opportunity space are quantified.

12 Claims, 54 Drawing Sheets

(56) References Cited

U.S. PATENT DOCUMENTS

| | | | |
|---|---|---|---|
| 5,755,281 A * | 5/1998 | Kang | F28F 1/325 |
| | | | 165/151 |
| 6,449,932 B1 | 9/2002 | Cooper et al. | |
| 6,990,459 B2 * | 1/2006 | Schneider | A01B 79/00 |
| | | | 705/7.28 |
| 6,999,877 B1 * | 2/2006 | Dyer | G06Q 10/00 |
| | | | 702/2 |
| 7,047,135 B2 * | 5/2006 | Dyer | A01B 79/005 |
| | | | 702/2 |
| 7,184,892 B1 * | 2/2007 | Dyer | G06Q 10/00 |
| | | | 702/2 |
| 7,333,922 B2 | 2/2008 | Cannon | |
| 7,397,392 B2 | 7/2008 | Mahoney et al. | |
| 8,280,595 B2 | 10/2012 | Foster et al. | |
| 8,469,784 B1 | 6/2013 | Hoskinson | |
| 9,330,062 B2 | 5/2016 | Thurow et al. | |
| 9,892,376 B2 | 2/2018 | Pfeiffer | |
| 2002/0040300 A1 * | 4/2002 | Ell | A01B 79/005 |
| | | | 705/7.12 |
| 2002/0103688 A1 * | 8/2002 | Schneider | A01B 79/00 |
| | | | 705/7.28 |
| 2003/0014171 A1 | 1/2003 | Ma | |
| 2003/0161906 A1 | 8/2003 | Braunhardt et al. | |
| 2005/0150202 A1 | 7/2005 | Quick | |
| 2005/0171660 A1 | 8/2005 | Woolford et al. | |
| 2005/0171835 A1 | 8/2005 | Mook et al. | |
| 2006/0187048 A1 | 8/2006 | Curkendall et al. | |
| 2006/0241838 A1 | 10/2006 | Mangiardo et al. | |
| 2006/0293913 A1 | 12/2006 | Iwig et al. | |
| 2007/0156318 A1 * | 7/2007 | Anderson | G06Q 10/00 |
| | | | 701/50 |
| 2007/0192173 A1 | 8/2007 | Moughler et al. | |
| 2008/0319927 A1 * | 12/2008 | Dallmier | A01H 5/10 |
| | | | 705/400 |
| 2009/0036184 A1 | 2/2009 | Craessaerts et al. | |
| 2009/0259483 A1 * | 10/2009 | Hendrickson | G06Q 10/06 |
| | | | 705/315 |
| 2009/0312919 A1 | 12/2009 | Foster | |
| 2010/0036696 A1 | 2/2010 | Lang et al. | |
| 2010/0153409 A1 | 6/2010 | Joshi et al. | |
| 2010/0217631 A1 | 8/2010 | Boss et al. | |
| 2011/0251752 A1 * | 10/2011 | DeLarocheliere | G07C 5/008 |
| | | | 701/31.4 |
| 2011/0270495 A1 | 11/2011 | Knapp | |
| 2012/0215395 A1 | 8/2012 | Aznavorian et al. | |
| 2012/0253744 A1 * | 10/2012 | Schmidt | G07C 5/008 |
| | | | 702/182 |
| 2012/0260366 A1 * | 10/2012 | Heuvelmans | A01H 1/08 |
| | | | 800/260 |
| 2012/0323453 A1 | 12/2012 | Havimaki et al. | |
| 2012/0323496 A1 * | 12/2012 | Burroughs | G06F 19/3481 |
| | | | 702/19 |
| 2013/0317872 A1 | 11/2013 | Nakamichi | |
| 2014/0019018 A1 | 1/2014 | Baumgarten | |
| 2014/0025440 A1 | 1/2014 | Nagda et al. | |
| 2014/0122147 A1 | 5/2014 | Christie et al. | |
| 2014/0129048 A1 | 5/2014 | Baumgarten et al. | |
| 2014/0156105 A1 | 6/2014 | Faivre et al. | |
| 2014/0188576 A1 | 7/2014 | de Oliveira et al. | |
| 2014/0172247 A1 | 9/2014 | Thomson | |
| 2014/0277905 A1 | 9/2014 | Anderson | |
| 2015/0046043 A1 | 2/2015 | Bollin et al. | |
| 2015/0064668 A1 | 3/2015 | Manci et al. | |
| 2015/0112546 A1 | 4/2015 | Ochsendorf et al. | |
| 2015/0178661 A1 | 6/2015 | Keaveny et al. | |
| 2015/0199360 A1 | 7/2015 | Pfeiffer et al. | |
| 2015/0199630 A1 | 7/2015 | Pfeiffer et al. | |
| 2015/0199637 A1 | 7/2015 | Pfeiffer et al. | |
| 2015/0199775 A1 | 7/2015 | Pfeiffer et al. | |
| 2016/0078391 A1 | 3/2016 | Pfeiffer et al. | |
| 2016/0098637 A1 | 4/2016 | Hodel et al. | |
| 2016/0202227 A1 | 7/2016 | Mathur et al. | |
| 2016/0212969 A1 | 7/2016 | Ouchida et al. | |
| 2018/0359917 A1 | 12/2018 | Blank et al. | |
| 2018/0359919 A1 | 12/2018 | Blank et al. | |
| 2018/0364652 A1 | 12/2018 | Blank et al. | |
| 2018/0364698 A1 | 12/2018 | Blank et al. | |

FOREIGN PATENT DOCUMENTS

| | | |
|---|---|---|
| WO | 2013096716 A1 | 6/2013 |
| WO | 2013096721 A2 | 6/2013 |
| WO | 2015153809 A1 | 10/2015 |
| WO | 2018115499 A1 | 7/2016 |
| WO | 2016200699 A1 | 12/2016 |

OTHER PUBLICATIONS

2013 Buyer's Guide: Fleet Automation Software, http://www.teletrac.com/assets/TT_BuyersGuide_2013.pdf. 10 pages.

Fleet Management: How it works. 2014 Verizon. 3 pages.

U.S. Appl. No. 14/155,023 Office Action dated Jul. 20, 2016. 18 Pages.

U.S. Appl. No. 14/155,023, Final Office Action, dated Mar. 7, 2017, 40 pages.

International Search Report and Written Opinion for International Application No. PCT/US2014/069541, dated Apr. 15, 2015, date of filing: Dec. 10, 2014, 17 pages.

Office Action for U.S. Appl. No. 14/445,699, dated Jun. 20, 2017, 40 pages.

U.S. Appl. No. 14/271,077 Office Action dated Jul. 14, 2017, 25 pages.

European Search Report Application No. 148792237 dated May 22, 2017, 7 pages.

U.S. Appl. No. 14/445,699 Office Action dated Mar. 30, 2018, 61 pages.

Final Office Action for U.S. Appl. No. 14/271,077 dated Jan. 25, 2018, 25 pages.

U.S. Appl. No. 14/445,699 Office Action dated Jul. 20, 2018, 70 pages.

U.S. Appl. No. 14/925,237 Final Office Acton dated Nov. 5, 2018, 30 pages.

U.S. Appl. No. 14/546,725 Office Action dated Oct. 11, 2018, 11 pages.

Chinese Patent Application No. 201480068108.2, dated Oct. 3, 2018, 12 pages.

U.S. Appl. No. 15/980,234 Application and Drawings, filed May 15, 2018, Preliminary Amendment filed May 17, 2018, 219 pages.

U.S. Appl. No. 14/025,237 Final Office Action dated Nov. 5, 2018, 30 pages.

European Patent Application No. 18176691.6-1217 Extended European Search Report dated Oct. 25, 2018, 8 pages.

U.S. Appl. No. 14/271,077 Office Action dated Oct. 2, 2018, 10 pages.

U.S. Appl. No. 14/545,725 Office Action dated Oct. 11, 2018, 11 pages.

U.S. Appl. No. 14/445,699 Application and Drawings filed Jul. 29, 2014. 115 pages.

U.S. Appl. No. 14/271,077 Prosecution History as of Jan. 23, 2019, 190 pages.

U.S. Appl. No. 14/925,237 Prosecution History as of Jan. 22 2019, 201 pages.

U.S. Appl. No. 15/626,934 Prosecution History as of Jan. 22, 2019, 88 pages.

U.S. Appl. No. 15/626,967 Prosecution History as of Jan. 22, 2019, 155 pages.

U.S. Appl. No. 15/629,260 filed Jun. 21, 2017, Application and Drawings, 64 pages.

U.S. Appl. No. 15/983,456 Application and Drawings filed May 18, 2018 and Preliminary Amendment filed Jul. 13, 2018, 198 pages.

U.S. Appl. No. 16/246,818 Application and Drawings filed Jan. 14, 2019, 62 pages.

Combine Harvester Instrumentation System for use in Precision Agriculture, Yap Kin, 201, 21 pages.

U.S. Appl. No. 14/445,699 Final Office Action dated Mar. 6, 2019, 66 pages.

(56) References Cited

OTHER PUBLICATIONS

U.S. Appl. No. 15/626,967 Notice of Allowance dated Jan. 3, 2019, 6 pages.
Extended European Search Report Application No. 18176687.4 dated Nov. 6, 2018, 6 pages.

* cited by examiner

|  |  | Units | Worst Day | Lagging Avg | Leading Avg | Best Day | Optimum | Comment |
|---|---|---|---|---|---|---|---|---|
| Faster Grain out of the field | Grain Productivity | Tn/hr | 35.5 | 63.9 | 69.0 | 75.8 | 77.8 | Average |
|  | Power efficiency | % Power | 79 | 88 | 87 | 90 | 100 | Good |
|  | Harvest spec. power | Kw/tn/hr | 9.30 | 5.47 | 4.97 | 4.17 |  | Good |
| Higher Quality of Job Done | Harvest fuel efficiency | l/Tn | 1.77 | 1.30 | 1.16 | 1.00 | 0.91 | Average |
|  | Field Transport Eff | l/km | 8.20 | 5.84 | 5.23 | 4.17 | 3.50 | Good |
|  | Road Transport Eff | l/km | 3.78 | 2.33 | 1.79 | 1.60 | 1.60 | Good |
| Minimize Unproductive fuel | Idle time | l/day |  | 22.0 | 18.0 |  | 7.5 | Poor |
|  | Waiting to unload | l/day |  | 3.6 | 1.1 |  | 0 | Good |
|  | Unloading while stationary | l/day |  |  |  |  | 0 | Good |
| Minimize Unproductive time | Idle time | hrs |  | 1.63 | 1.50 |  | 0.6 | Poor |
|  | Waiting to unload | hrs |  | 0.27 | 0.09 |  | 0 | Good |
|  | Unloading while stationary | hrs |  | 0.27 | 0.23 |  | 0 | Good |

Context:
Average sep hrs/day = 6.5
Average engine hrs/day = 11.1
Number of harvest days = 110

Note:
Grain loss levels were consistently low
Grain quality levels were consistently good

FIG. 10A

AGRONOMIC VARIATION AND TEAM PERFORMANCE ANALYSIS

CROSS-REFERENCE TO RELATED APPLICATION

The present application is a continuation-in-part of and claims priority of U.S. patent application Ser. No. 14/445,699, filed Jul. 29, 2014 which is a continuation-in-part of and claims priority of U.S. patent application Ser. No. 14/271,077, filed May 6, 2014 which is a continuation-in-part of, and claims priority of U.S. patent application Ser. No. 14/155,023, filed Jan. 14, 2014, the contents of all of which are hereby incorporated by reference in their entirety.

FIELD OF THE DISCLOSURE

The present disclosure relates to mobile equipment. More specifically, the present disclosure relates to identifying performance opportunities to improve performance in the operation of mobile equipment.

BACKGROUND

There is a wide variety of different types of equipment that are operated by an operator. Such equipment can include, for instance, agricultural equipment, construction equipment, turf and forestry equipment, among others. Many of these pieces of mobile equipment have mechanisms that are controlled by the operator in performing operations. For instance, a combine can have multiple different mechanical, electrical, hydraulic, pneumatic and electromechanical subsystems, all of which need to be operated by the operator. The systems may require the operator to set a wide variety of different settings and provide various control inputs in order to control the combine. Some inputs not only include controlling the combine direction and speed, but also concave spacing, sieve settings, rotor speed settings, and a wide variety of other settings and control inputs.

There are currently some existing methods which allow operators or farm equipment managers to obtain dashboard information indicative of the operation of a piece of agricultural equipment. This information is usually informative in nature.

The discussion above is merely provided for general background information and is not intended to be used as an aid in determining the scope of the claimed subject matter.

SUMMARY

Performance information indicative of operator performance of a mobile machine is received. A performance opportunity space is identified, indicative of possible performance improvement. Savings identified in the performance opportunity space are quantified.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 6H-6T show additional examples of user interface displays.

FIG. 10A is one example of a user interface display.

DETAILED DESCRIPTION

Figure 1:
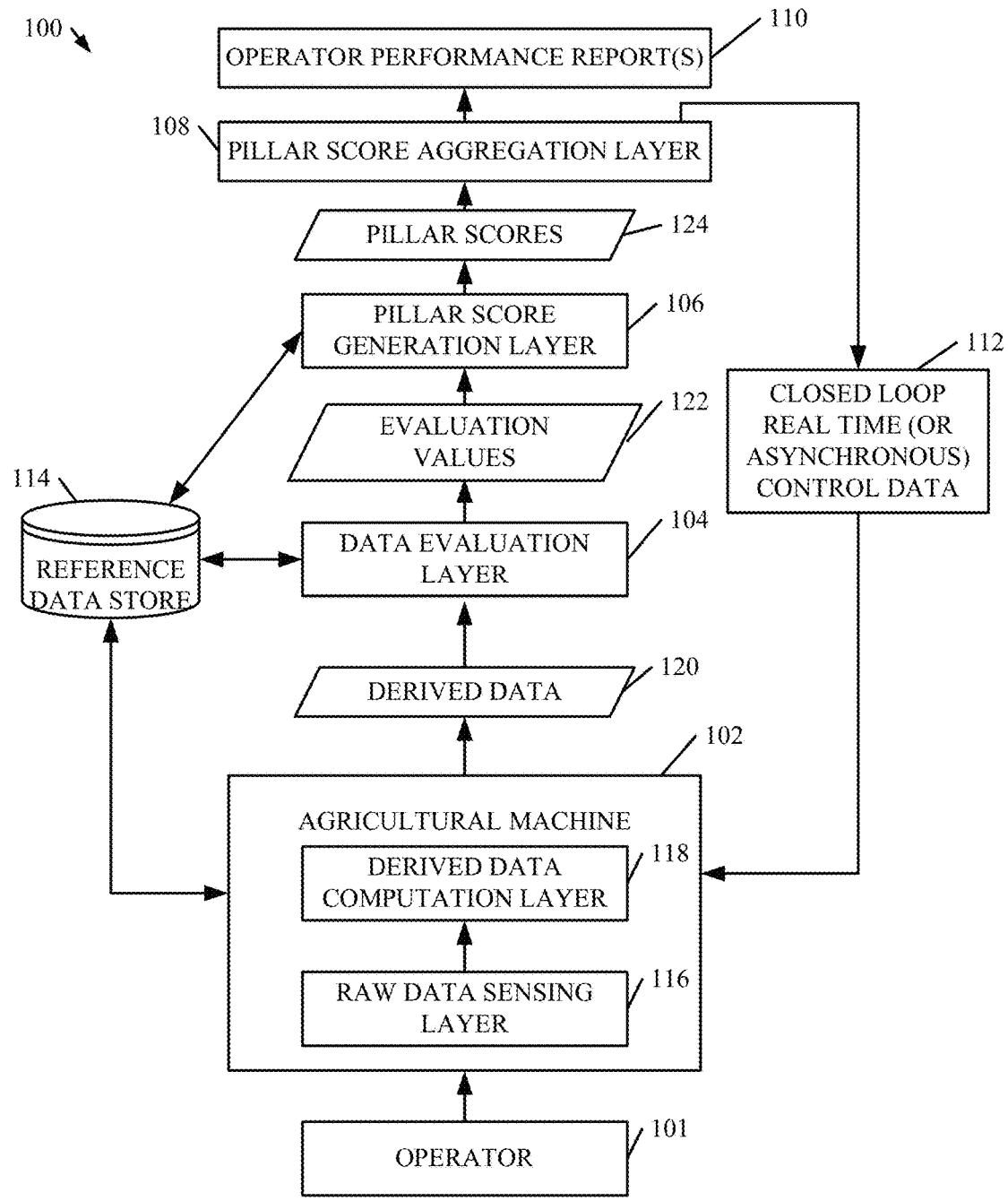
FIG. 1 is a block diagram of one exemplary operator performance computation architecture.

FIG. 1 is a block diagram of one embodiment of a performance report generation architecture 100. Architecture 100 illustratively includes a mobile machine 102, a data evaluation layer 104, a pillar score generation layer 106, and a pillar score aggregation layer 108. Layer 108 generates operator performance reports 110, and can also generate closed loop, real time (or asynchronous) control data 112 which can be provided back to agricultural machine 102. Architecture 100 is also shown having access to a reference data store 114.

In the embodiment shown in FIG. 1, mobile machine 102 is described as being an agricultural machine (and specifically a combine), but this is exemplary only. It could be another type of agricultural mobile machine as well, such as a tractor, a seeder, a cotton harvester, a sugarcane harvester, or others. Also, it could be a mobile machine used in the turf and forestry industries, the construction industry or others. Machine 102 illustratively includes raw data sensing layer 116 and derived data computation layer 118. It will be noted that layer 118 can be provided on machine 102, or elsewhere in architecture 100. It is shown on machine 102 for the sake of example only.

Raw data sensing layer 116 illustratively includes a plurality of different sensors (some of which are described in greater detail below) that sense machine operating parameters as well as environmental data, such as product quality and the type and quality of material being expelled from the agricultural machine 102. The raw data sensor signals are provided from raw data sensing layer 116 to derived data computation layer 118 where some computation is performed on those sensor signals, in order to obtain derived data 120. In one embodiment, derived data computation layer 118 performs computations that do not require a great deal of computational overhead or storage requirements.

Derived data 120 is provided to data evaluation layer 104. In one embodiment, data evaluation layer 104 compares the derived data 120 against reference data stored in reference data store 114. The reference data can be historical data from operator 101, or from a variety of other sources, such as data collected for operators in the fleet for a single farm that employs operator 101, or from relevant data obtained from other operators as well. Data evaluation layer 104 generates evaluation values 122 based upon an evaluation of how the derived data 120 for operator 101 compares to the reference data in data store 114.

Evaluation values 122 are provided to pillar score generation layer 106. Layer 106 illustratively includes a set of score calculators that calculate a performance score 124 for each of a plurality of different performance pillars (or performance categories) that can be used to characterize the performance of operator 101 in operating agricultural machine 102. The particular performance pillars, and associated scores 124, are described in greater detail below.

Each of the pillar scores 124 are provided to pillar score aggregation layer 108. Layer 108 illustratively generates a composite score and operator performance reports 110, based upon the various pillar scores 124 that are received for operator 101. The performance reports can take a wide variety of different forms, and can include a wide variety of different information, some of which is described below in greater detail with respect to FIGS. 6G to 6T. In one embodiment, reports 110 illustratively include the composite score (which is an overall score for operator 101) indicative of the performance of operator 101, and is based upon the individual pillar scores 124 for the individual performance pillars (or performance categories). It can also illustratively include the individual pillar scores, supporting pillar scores, underlying information, recommendations which are actionable items that can be performed by operator 101, in order to improve his or her performance in operating agricultural machine 102 while considering the included contextual information, and a wide variety of other information.

In one embodiment, layer 108 also generates closed loop, real time (or asynchronous) control data 112 which can be fed back to agricultural machine 102. Where the data is fed back in real time, it can be used to adjust the operation, settings, or other control parameters for machine 102, on-the-fly, in order to improve the overall performance. It can also be used to display information to operator 101, indicating the operator's performance scores, along with recommendations of how operator 101 should change the settings, control parameters, or other operator inputs, in order to improve his or her performance. The data can also illustratively be provided asynchronously, in which case it can be downloaded to the agricultural machine 102 intermittently, or at preset times, in order to modify the operation of machine 102.

Therefore, as described in greater detail below, there may be, for example, three different user experiences for the information generated herein, each with its own set of user interface displays and corresponding functionality. The first can be a real time or near real time user experience that displays individual operator performance information for the operator (such as in a native application run on a device in an operator's compartment of the mobile machine 102). This can show, among other things, a comparison of operator performance scores, compared against scores for a reference group. The reference group may be previous scores for the operator himself or herself, scores for other operators in the fleet or scores for other operators in other fleets in a similar crop or geographic region or both. It can show real time data, recommendations, alerts, etc. These are examples only.

A second user experience can include displaying the information for a remote farm manager. This can be done in near real time and on-demand. It can summarize fleet performance, itself, and it can also display the performance as compared to other reference groups, or in other ways. This can also be in a native application on the farm manger's machine, or elsewhere.

A third user experience can include displaying the information as a fleet scorecard at the end of the season. This experience can show fleet performance and financial impact information. It can show summaries, analysis results, comparisons, and projections. It can generate recommendations for forming a plan for the next season that has a higher operational and financial performance trajectory, as examples.

Each of these user experiences can include a set of user interfaces. Those interfaces can have associated functionality for manipulating the data, such as drill down functionality, sort functionality, projection and summarization functionality among others. Some examples of such interfaces are described below with respect to FIGS. 6G-6T and FIGS. 10A-10B.

Figure 2A:
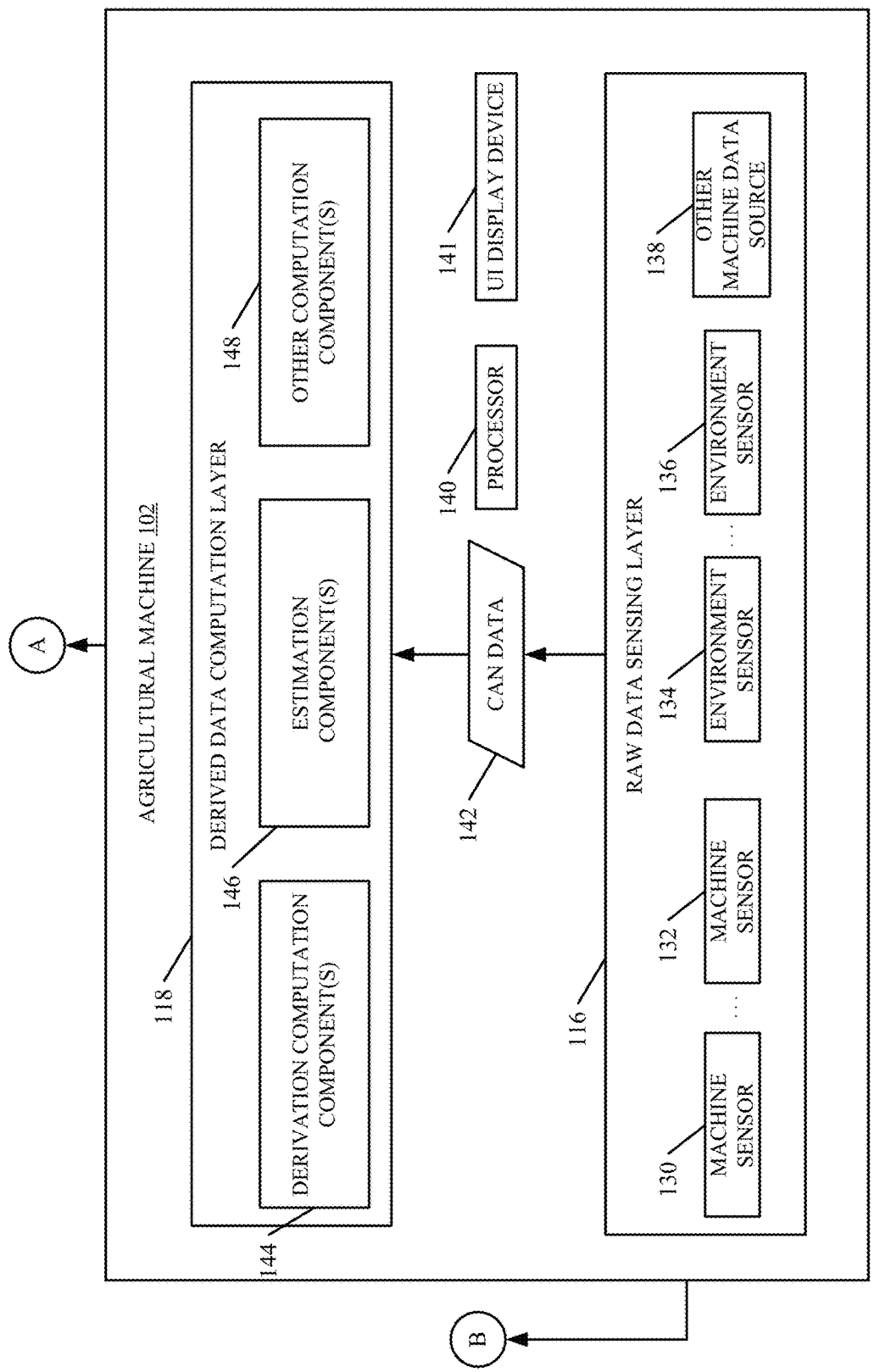
FIGS. 2A and 2B (collectively FIG. 2) is a more detailed block diagram of the architecture shown in FIG. 1.
Figure 2B:
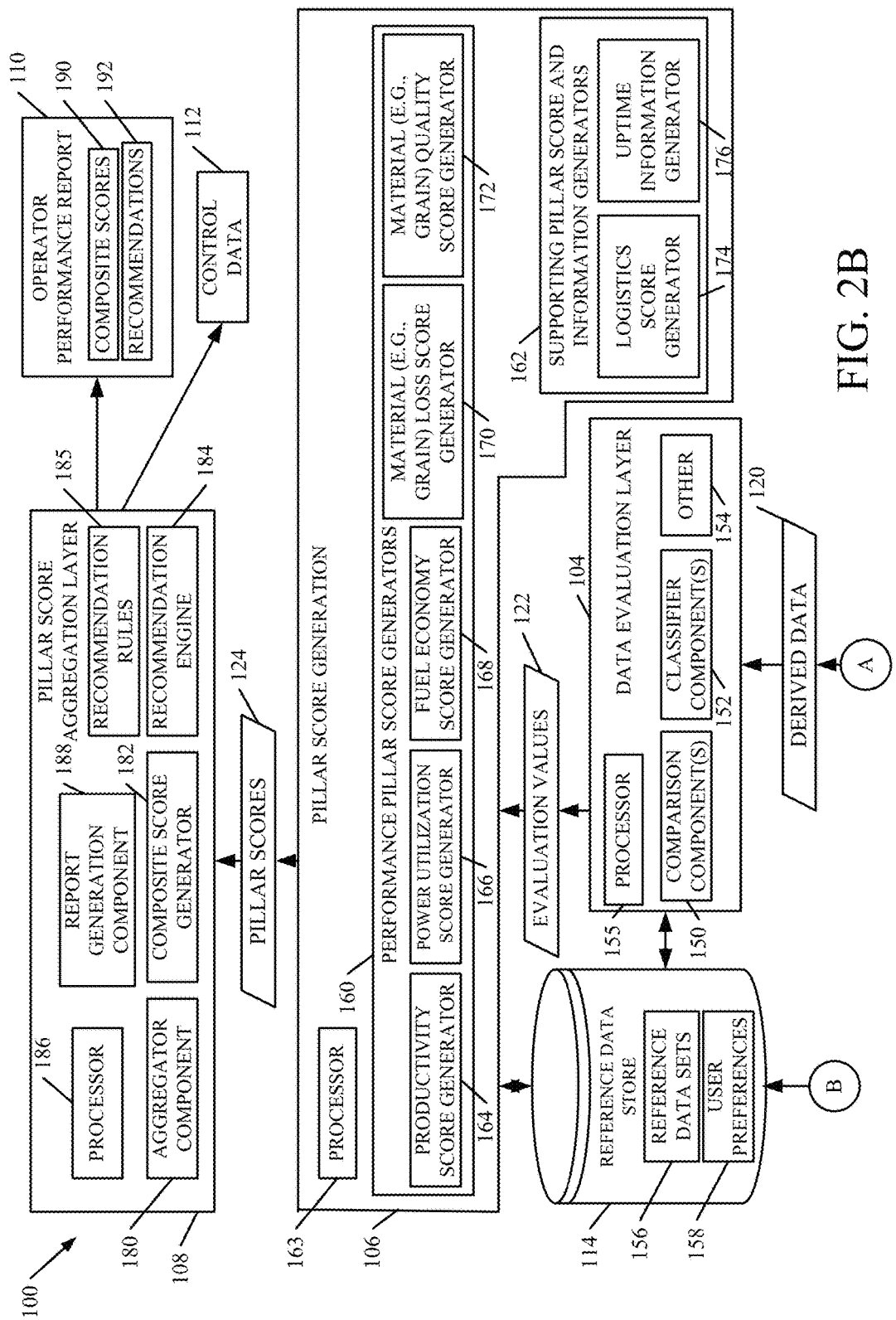

Before describing the overall operation of architecture 100, a more detailed block diagram of one embodiment of the architecture will be described. FIGS. 2A and 2B are collectively referred to as FIG. 2. FIG. 2 shows one embodiment of a more detailed block diagram of architecture 100. Some of the items shown in FIG. 2 are similar to those shown in FIG. 1, and are similarly numbered.

FIG. 2 specifically shows that raw data sensing layer 116 in machine 102 illustratively includes a plurality of machine sensors 130-132, along with a plurality of environment sensors 134-136. Raw data sensing layer 116 can also obtain raw data from other machine data sources 138. By way of example, machine sensors 130-132 can include a wide variety of different sensors that sense operating parameters and machine conditions on machine 102. For instance, they can include speed sensors, mass flow sensors that measure the mass flow of product through the machine, various pressure sensors, pump displacement sensors, engine sensors that sense various engine parameters, fuel consumption sensors, among a wide variety of other sensors, some of which are described in greater detail below.

Environment sensors 134-136 can also include a wide variety of different sensors that sense different things regarding the environment of machine 102. For instance, when machine 102 is a type of harvesting machine (such as a combine), sensors 134-136 can include crop loss sensors that sense an amount of crop that is being lost, as opposed to harvested. In addition, they can include crop quality sensors that sense the quality of the harvested crop. They can also include, for instance, various characteristics of the material that is discarded from machine 102, such as the length and volume of straw discarded from a combine. They can include sensors from mobile devices in the operator's compartment, irrigation sensors or sensor networks, sensors on unmanned aerial vehicles or other sensors. Environment sensors 134-136 can sense a wide variety of other environmental parameters as well, such as terrain (e.g., pitch and roll sensors), weather conditions (such as temperature, humidity, etc.), among others. Sensors can also include position sensors, such as GPS sensors, cellular triangular sensors or other sensors.

Other machine data sources 138 can include a wide variety of other sources. For instance, they can include systems that provide and record alerts or warning messages regarding machine 102. They can include the count and category for each warning, diagnostic code or alert message, and they can include a wide variety of other information as well.

Machine 102 also illustratively includes processor 140 and a user interface display device 141. Display device 141 illustratively generates user interface displays (under control of processor 140 or another component) that allows user 101 to perform certain operations with respect to machine 102. For instance, the user interface displays on the device 141 can include user input mechanisms that allow the user to enter authentication information, start the machine, set certain operating parameters for the machine, or otherwise control machine 102.

In many agricultural machines, data from sensors (such as from raw data sensing layer 116) are illustratively communicated to other computational components within machine 102, such as computer processor 140. Processor 140 is illustratively a computer processor with associated memory and timing circuitry (not separately shown). It is illustratively a functional part of machine 102 and is activated by, and facilitates the functionality of, other layers, sensors or components or other items on machine 102. In one embodiment, the signals and messages from the various sensors in layer 116 are communicated using a controller area network (CAN) bus. Thus, the data from sensing layer 116 is illustratively referred to as CAN data 142.

The CAN data 142 is illustratively provided to derived data computation layer 118 where a number of computations are performed on that data to obtain derived data 120, that is derived from the sensor signals included in CAN data 142. Derived data computation layer 118 illustratively includes derivation computation components 144, estimation components 146 and can include other computation components 148. Derivation computation components 144 illustratively calculate some of the derived data 120 based upon CAN data 142. Derivation computation components 144 can illustratively perform fairly straight forward computations, such as averaging, computing certain values as they occur over time, plotting those values on various plots, calculating percentages, among others.

In addition, derivation computation components 144 illustratively include windowing components that break the incoming data sensor signals into discrete time windows or time frames that are processed both discretely, and relative to data in other or adjacent time windows. Estimation components 146 illustratively include components that estimate derived data. In one embodiment components 146 illustratively perform estimation on plotted points to obtain a function that has a metric of interest. The metric of interest, along with the underlying data, can be provided as derived data 120. This is but one example embodiment of a computation component 144, and a wide variety of others can be used as well. Other computation components 148 can include a wide variety of components to perform other operations. For instance, in one embodiment, components 148 include filtering and other signal conditioning components that filter and otherwise condition the sensor signals received from raw data sensing layer 116. Components 148 can of course include other components as well.

Regardless of the type of components 144, 146 and 148 in layer 118, it will be appreciated that layer 118 illustratively performs computations that require relatively light processing and memory overhead. Thus, in one embodiment, layer 118 is disposed on machine 102 (such as on a device located in the cab or other operator compartment of machine 102) or on a hand held or other mobile device that can be accessed on machine 102 by user 101. In another embodiment, derived data computation layer 118 is located elsewhere, other than on machine 102, and processor 140 communicates CAN data 142 to layer 118 using a communication link (such as a wireless or wired communication link, a near field communication link, or another communication link).

In any case, derived data 120 is obtained from layer 118 and provided to data evaluation layer 104. Again, this can be done by processor 140 (or another processor) using a wireless link (such as a near field communication link, a cellular telephone link, a Wi-Fi link, or another wireless link), or using a variety of hard wired links. Data evaluation layer 104 illustratively includes comparison components 150, one or more classifier components 152, and it can include other components 154 as well. It will be appreciated that, in one embodiment, derived data 120 is illustratively associated with a specific user 101 either by processor 140, or in another way. For instance, when user 101 begins operating machine 102, it may be that processor 140 requests user 101 to enter authentication information (such as a username and password, a personal mobile device serial number, a carried token such as an RFID badge, or other authentication information) when user 101 attempts to start up machine 102. In that way, processor 140 can identify the particular user 101 corresponding to CAN data 142 and derived data 120.

Layer 104 includes comparison components 150, classifier components 152, other components 154 and processor 155. Comparison components 150 illustratively compare the derived data 120 for this operator 101 against reference data stored in reference data store 114. The reference data can include a plurality of different reference data sets 156 and it can also include user preferences 158, which are described in greater detail below. The reference data sets can be used to compare the derived data 120 of user 101 against the user's historical derived data, against data for other operators in the same fleet as user (or operator) 101, against data for leading performers in the operator's fleet, against the highest performers in the same crop and geographic region as the operator 101, or against another set of relevant reference data. In any case, comparison components 150 illustratively perform a comparison of derived data 120 against reference data sets 156. They provide an output indicative of that comparison, and classifier components 152 illustratively classify that output into one of a plurality of different performance ranges (such as good, medium or poor, although these are exemplary and more, fewer, or different ranges can be used). In one embodiment, for instance, comparison component 150 and classifier components 152 comprise fuzzy logic components that employ fuzzy logic to classify the received values into a good category, a medium category or a poor category, based on how they compare to the reference data. In another embodiment, classifier components 152 provide an output value in a continuous rating system. The output value lies on a continuum between good and poor, and indicates operator performance. In the present description, categories are described, but this is for the sake of example only. These categories indicate whether the performance of user 101, characterized by the received derived data values, indicate that the performance of user 101 in operating machine 102 is good, medium or poor, relative to the reference data set to which it was compared.

The classified evaluation values 122 are then provided to pillar score generation layer 106. In the embodiment shown in FIG. 2, pillar score generation layer 106 includes performance pillar score generators 160, supporting pillar score generators 162 and processor 163. Performance pillar score generators 160 illustratively include generators that generate pillar scores corresponding to performance pillars that better characterize the overall performance of operator 101 in various performance categories. In one embodiment, the pillar scores are generated for productivity, power utilization, fuel economy, material loss and material quality. Supporting pillar score generators 162 illustratively generate scores for supporting pillars that, to some degree, characterize the performance of user 101, but perhaps less so than the pillar scores generated by generators 160. Thus, supporting pillar scores include scores for logistics and uptime. Thus, these measures indicate a relative value that can consider reference data corresponding to similar conditions as those for operator 101.

It can thus be seen that, in the present embodiment, performance pillar score generators 160 include productivity score generator 164, power utilization score generator 166, fuel consumption score generator 168, material (e.g., grain) loss score generator 170, and material (e.g., grain) quality score generator 172. Supporting pillar score generators 162 illustratively include logistics score generator 174 and uptime information generator 176.

As one example, productivity score generator 164 can include logic for generating a score based on an evaluation of a productivity versus yield slope in evaluation values 122.

Power utilization score generator 166 illustratively considers information output by the fuzzy logic classifiers 152 in layer 104 that are indicative of an evaluation of the engine power used by machine 102, under the control of user (or operator) 101. It thus generates a supporting pillar score indicative of that evaluation.

Fuel economy score generator 168 can be a logic component that considers various aspects related to fuel economy, and outputs a score based on those considerations.

By way of example, where machine 102 is a combine, fuel economy score generator 168 can consider the separator efficiency, the harvest fuel efficiency, and non-productive fuel efficiency that are output by the fuzzy logic components in data evaluation layer 104. Material loss score generator 170 can include items such as the crop type, the measured loss on machine 102 using various loss sensors, an evaluation of the loss using fuzzy logic components, and an evaluation of the tailings, also using fuzzy logic components 152 in data evaluation layer 104. Based upon these considerations, material loss score generator 170 generates a material loss score indicative of the performance of machine 102 (under the operation of user 101) with respect to material loss.

Material quality score generator 172 illustratively includes evaluation values 122 provided by the fuzzy logic components 152 in layer 104 that are indicative of an evaluation of material other than grain that has been harvested, whether the harvested product (such as the corn or wheat) is broken or cracked, and whether the harvested product includes foreign matter (such as cob or chaff), and it can also include evaluation values 122 that relate to the size and quality of the residue expelled from machine 102.

Logistics score generator 174 can include logic that evaluates the performance of the machine 102 during different operations. For instance, it can evaluate the performance of the machine (under the operation of user 101) during unloading, during harvesting, and during idling. It can also include measures such as the distance that the machine traveled in the field and on the road, an individual percentage breakdown in terms of total time, field setup (passes vs. headlands), and other information. This is but one example.

Uptime information generator 176 illustratively generates uptime information (such as a summary) either based on evaluation values 122 provided by layer 104, or based on derived data 120 that has passed through layer 104 to layer 106. The uptime supporting information can be indicative of the performance of the machine based on how much time it is in each machine state, and it can also illustratively consider whether any alert codes or diagnostic trouble codes were generated, and how often they were generated, during the machine operation. In another embodiment only alerts and diagnostics trouble codes that impact the performance are considered. The uptime information is illustratively provided to (or available to) other items in architecture 100, as context information.

All of the pillar scores and supporting pillar scores (indicated by 124 in FIG. 2) are illustratively provided to pillar score aggregation layer 108. Layer 108 illustratively includes an aggregator component 180, composite score generator 182, recommendation engine 184 (that accesses recommendation rules 185), processor 186 and report generator 188. Aggregator component 180 illustratively aggregates all of the pillar scores and supporting pillar scores 124 using a weighting applied to each score. The weighting can be based on user preferences (such as if the user indicates that fuel economy is more important than productivity), they can be default weights, or they can be a combination of default weights and user preferences or other weights. Similarly, the weighting can vary based upon a wide variety of other factors, such as crop type, crop conditions, geography, machine configuration, or other things.

Once aggregator component 180 aggregates and weights the pillar scores 124, composite score generator 182 illustratively generates a composite, overall score, for operator 101, based upon the most recent data received from the operation of machine 102. Recommendation engine 184 generates actionable recommendations which can be performed in order to improve the performance of operator 101. Engine 184 uses the relevant information, pillar score 124, evaluation values 124 and other information as well as, for instance, expert system logic, to generate the recommendations. This is described in greater detail below with respect to FIG. 4A. The recommendations can take a wide variety of different forms.

Once the composite score and the recommendations are generated, report generator component 188 illustratively generates an operator performance report 110 indicative of the performance of operator 101. Component 188 can access the composite score, the performance pillar scores, all the underlying data, the recommendations, location and mapping information and other data. Operator performance report 110 can be generated periodically, at the request of a manager, at the request of operator 101, or another user, it can be generated daily, weekly, or in other ways. It can also be generated on-demand, while operation is on-going. In one embodiment, operator performance report 110 illustratively includes a composite score 190 generated by composite score generator 182 and the recommendations 192 generated by recommendation engine 194. Layer 108 can also illustratively generate control data 112 that is passed back to machine 102 to adjust the control of machine 102 in order to improve the overall performance.

Report 110 can, in one embodiment, be loaded onto a device so it can be viewed in real time by operator 101, in the operating compartment of vehicle 102, or it can be viewed in real time by a farm manger or others, it can be stored for later access and viewing by operator 101 or other persons, or it can be transmitted (such as through electronic mail or other messaging transmission mechanisms) to a main office, to a farm manager, to the user's home computer, or it can be stored in cloud storage. In one embodiment, it can also be transmitted back to a manufacturer or other training center so that the training for operator 101 can be modified based on the performance reports, or it can be used in other ways as well. Further, the report format and content can be tailored to the intended audience and viewing conditions.

Figure 3:
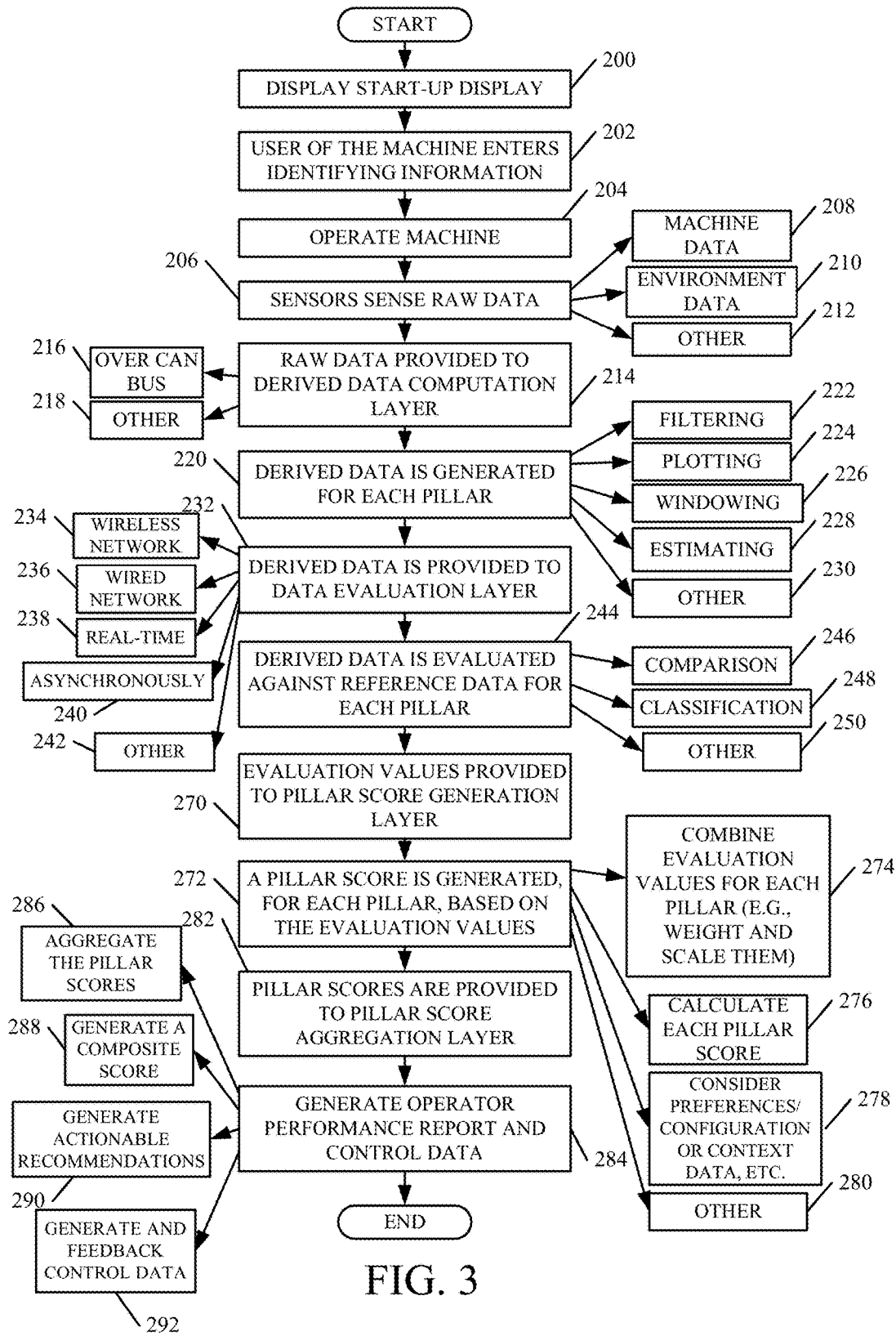
FIG. 3 is a flow diagram illustrating one embodiment of the operation of the architecture shown in FIGS. 1 and 2, in computing performance data indicative of an operator's performance.

FIG. 3 is a flow diagram illustrating one embodiment of the overall operation of the architecture shown in FIG. 2 in generating an operator performance report 110. FIG. 3 will now be described in conjunction with FIGS. 2 and 4. Then, FIGS. 5A-5G will be described to show a more detailed embodiment of portions of architecture 100 used to generate performance pillar scores.

In one embodiment, processor 140 first generates a startup display on user interface display device 141 to allow user 101 to start machine 102. Displaying the startup display is indicated by block 200 in FIG. 3. The user 101 then enters identifying information (such as authentication information or other information). This is indicated by block 202. User 101 then begins to operate machine 102. This is indicated by block 204.

As user 101 is operating the machine, the sensors in raw data sensing layer 116 sense the raw data and provide signals indicative of that data to derived data computation layer 118. This is indicated by block 206 in the flow diagram of FIG. 3. As briefly discussed above, the data can include machine data 208 sensed by machine sensors 130-132. It can also include environmental data 210 sensed by environment sensors 134-136, and it can include other data 212 provided by other machine data sources 138. Providing the raw data to derived data computation layer 118 is indicated by block 214 in FIG. 3. As discussed above, this can be over a CAN bus as indicated by block 216, or in other ways as indicated by block 218.

Derived data 120 is then generated by the components 144, 146 and 148 in layer 118. The derived data is illustratively derived so that data evaluation layer 104 can provide evaluation data used in generating the pillar scores. Deriving the data for each pillar is indicated by block 220 in FIG. 3. This can include a wide variety of computations, such as filtering 222, plotting 224, windowing 226, estimating 228 and other computations 230.

The derived data 120 is then provided to data evaluation layer 104 which employs comparison components 150 and the fuzzy logic classifier components 152. Providing the data to layer 104 is indicated by block 232 in FIG. 3. It can be provided using a wireless network 234, a wired network 236, it can be provided in real time as indicated by block 238, it can be saved and provided later (such as asynchronously) 240, or it can be provided in other ways 242 as well.

Data evaluation layer 104 then evaluates the derived data against reference data, to provide information for each pillar. This is indicated by block 244 in FIG. 3. The data can be evaluated using comparison 246, using classification 248, or using other mechanisms 250.

Figure 4:
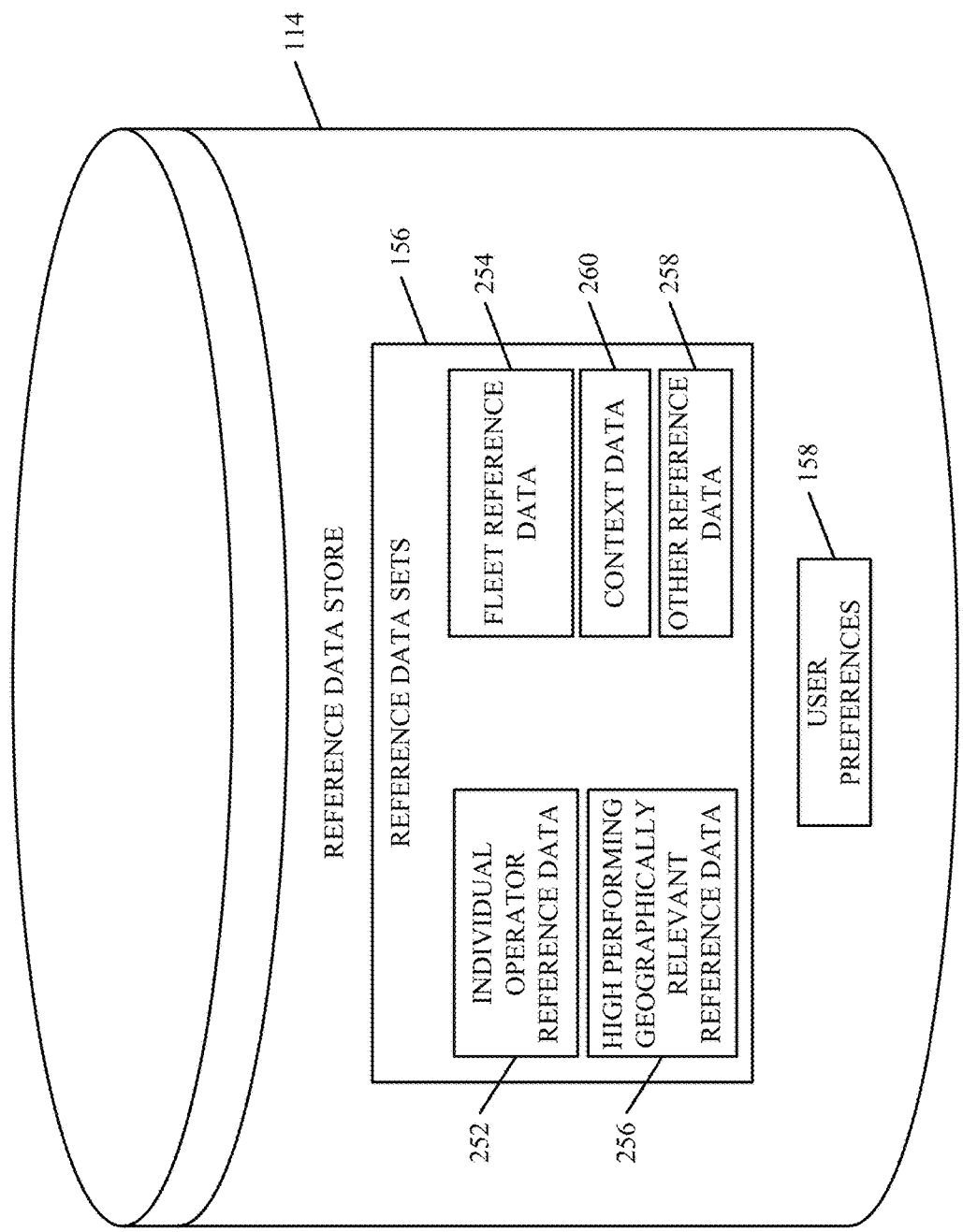
FIG. 4 shows one embodiment of a reference data store in greater detail.

In one embodiment, the comparison components 150 compare the derived data 120 for operator 101 against reference data. FIG. 4 shows a more detailed embodiment of reference data store 114. FIG. 4 shows that, in one embodiment, reference data sets 156 illustratively include individual operator reference data 252. Reference data 252 illustratively includes historical reference data for this specific operator 101. It can also include fleet reference data 254 which comprises reference data corresponding to all of the operators in the fleet to which operator 101 belongs. It can include high performing geographically relevant reference data 256 as well. This illustratively comprises reference data from other operators in a geographically relevant region (such as where the crop type, weather, soil type, field sizes, farming practices, etc. are similar to that where operator 101 resides). It can include performance data for different kinds or models of mobile machine, across various fleets, and the operators that generated the performance data can be identified or anonymous. To generate references for the fuzzy logic components, reference of data for medium and poor performing operations is used. However, comparisons can be made against only high performance data or other subsets of data as well. Also, the data can be for individual operators, or it can be aggregated into a single set of reference data (e.g., for all of the high performing operators in the geographically relevant region, etc.). Of course, it can include other reference data 258 as well.

Also, in the embodiment shown in FIG. 4, the reference data sets 156 illustratively include context data 260. The context data can define the context within which the reference data was gathered, such as the particular machine, the machine configuration, the crop type, the geographic location, the weather, machine states, other information generated by uptime information generator 176, or other information.

It will be noted that the reference data in store 114 can be captured and indexed in a wide variety of different ways. In one embodiment, the raw CAN data 142 can be stored along with the derived data 120, the evaluation values 122, user preferences 158, the pillar scores 124, context data and the recommendations. The data can be indexed by operator, by machine and machine head identifier, by farm, by field, by crop type, by machine state (that is, the state of the machine when the information was gathered, e.g., idle, idle while unloading, waiting to unload, harvesting, harvesting while unloading, field transport, road transport, headland turn, etc.), by settings state (that is, the adjustment settings in the machine including chop setting, drop settings, etc.), and by configuration state (that is, the hardware configuration of the machine). It can be indexed in other ways as well.

Once evaluation layer 104 performs the comparison against the reference data and classifies a measure of that comparison using fuzzy logic heuristics, the evaluation values 122 represent the results of the classification and are provided to pillar score generation layer 106. This is indicated by block 270 in FIG. 3. Pillar score generation layer 106 then generates a pillar score for each performance pillar (and the logistics supporting pillar), based on the plurality of evaluation values 122. This is indicated by block 272 in FIG. 3.

The pillar scores can be generated by combining the evaluation values for each individual pillar, and weighting and scaling them. Other methods like filtering or related data conditioning might be applied as well. This is indicated by block 274. A pillar score generator then calculates a pillar score for each performance pillar (e.g., each performance category) and supporting pillar (e.g., supporting performance category). This is indicated by block 276 in FIG. 3. In doing so, as discussed above, the pillar score generators can illustratively consider user preferences, machine configuration data, context data (e.g., the information generated by logistics information generator 176), or a wide variety of other context data or other data. This is indicated by block 278. The pillar scores can be generated in other ways 280 as well.

Pillar scores 124 are then provided to pillar score aggregation layer 108. This is indicated by block 282 in FIG. 3. Report generator component 188 then generates the operator performance reports 110 based upon the pillar scores, the composite scores, the underlying data, user preferences, context data and the recommendations, etc. Generating the report 110 and control data 112 is indicated by block 284. Doing this by aggregating the pillar scores is indicated by block 286, generating the composite score is indicated by block 288, generating actionable recommendations is indicated by block 290, and generating and feeding back the control data 112 is indicated by block 292.

Figure 4A:
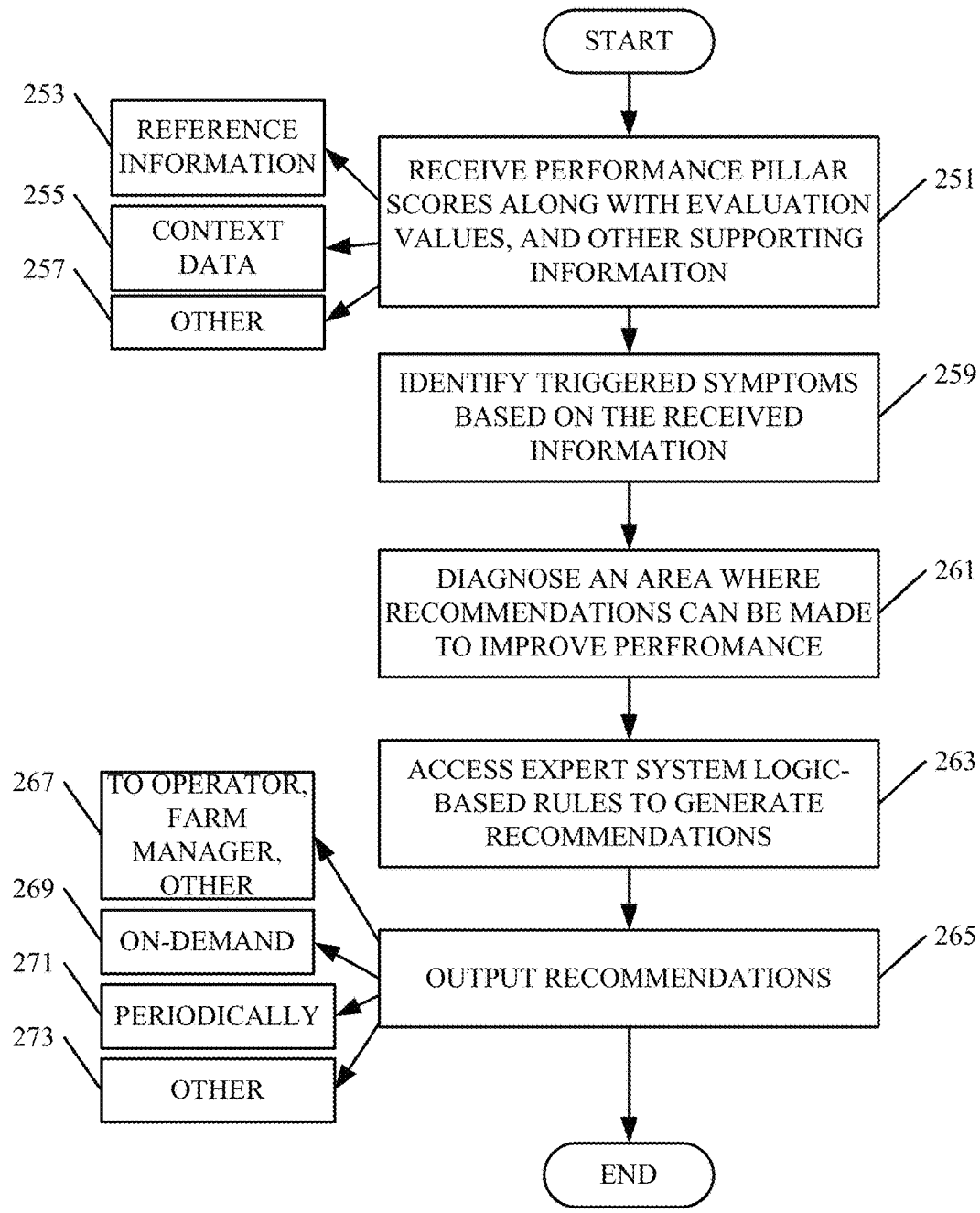
FIG. 4A is a flow diagram illustrating one exemplary embodiment of the operation of a recommendation engine.

Before discussing a more detailed implementation, the operation of recommendation engine 184 in generating recommendations will be described. FIG. 4A is a flow diagram showing one embodiment of this.

FIG. 4A shows a flow diagram illustrating one embodiment of the operation of recommendation engine 184 in FIG. 2. Recommendation engine 184 first receives the performance pillar scores 124, along with the evaluation values 122 and any other desired supporting information from the other parts of the system. This is indicated by block 251 in FIG. 4A. The other data can include reference information 253, context data 255, or a wide variety of other information 257.

Engine 184 then identifies symptoms that are triggered in expert system logic, based on all of the received information. This is indicated by block 259 shown in FIG. 4A.

The expert system logic then diagnoses various opportunities to improve performance based on the triggered symptoms. The diagnosis will illustratively identify areas where recommendations might be helpful in improving performance. This is indicated by block 261 in FIG. 4A.

Engine 184 then accesses expert system, logic-based rules 185 to generate recommendations. This is indicated by block 263. The rules 185 illustratively operate to generate the recommendations based on the diagnosis, the context information and any other desired information.

Engine 184 then outputs the recommendations as indicated by block 265. The recommendations can be output to farm managers or other persons, as indicated by block 267. They can be output on-demand, as indicated by block 269. They can be output intermittently or on a periodic basis (e.g., daily, weekly, etc.) as indicated by block 271, or they can be output in other ways as well, as indicated by block 273.

FIGS. 5A-5G show a more detailed implementation of architecture 100, in which machine 102 is a combine. FIGS. 5A-5G each show a processing channel in architecture 100 for generating a pillar score or a supporting pillar score. FIGS. 5A-5G will now be described as but one example of how architecture 100 can be implemented with a specific type of agricultural machine 102.

Figure 5A:
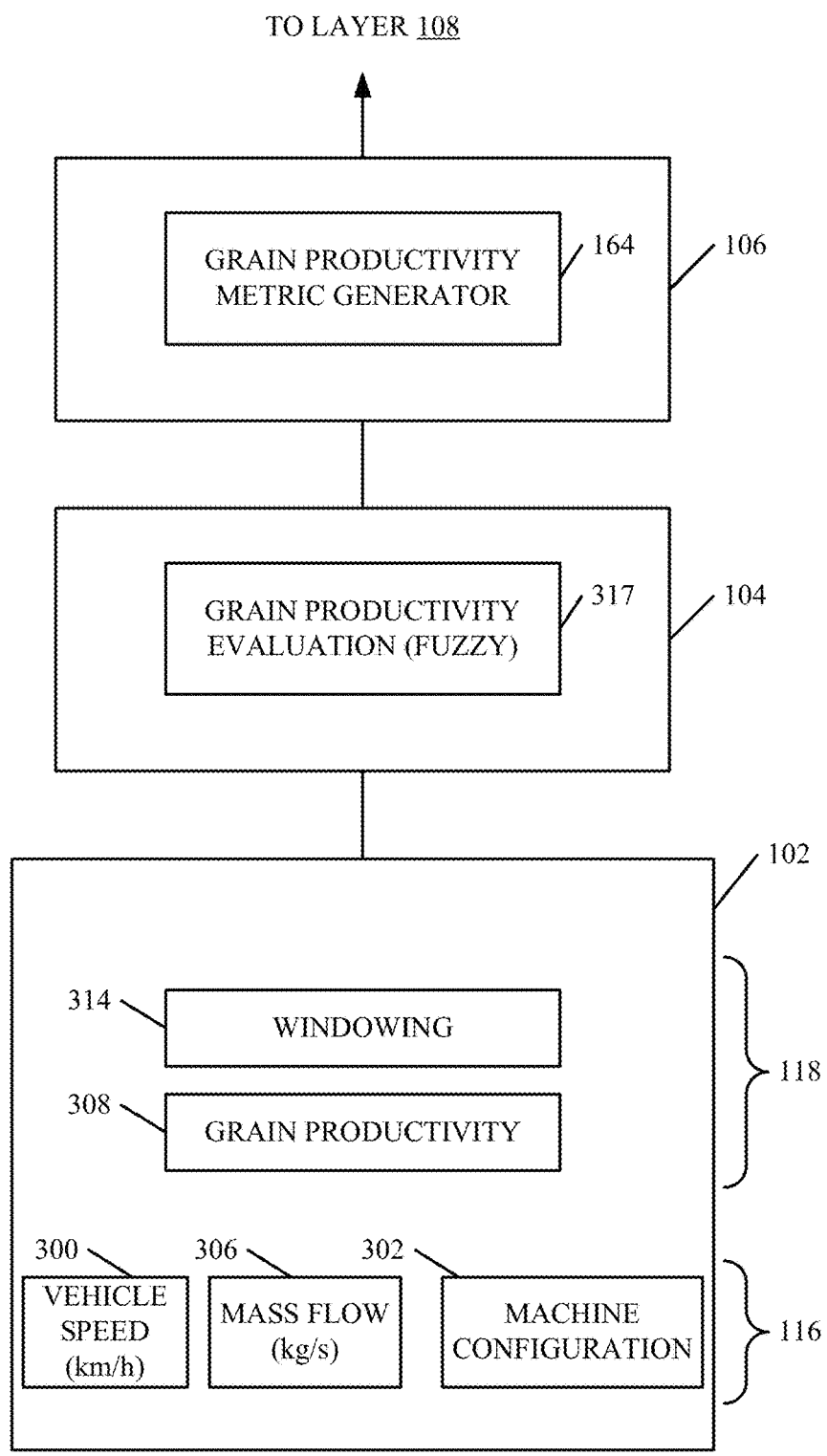
FIGS. 5A-5G are still more detailed block diagrams of different channels for generating different performance pillar scores.

FIG. 5A shows a processing channel in architecture 100 that can be used to generate the productivity pillar score. Some of the items shown in FIG. 5A are similar to those shown in FIG. 2, and they are similarly numbered. In the embodiment shown in FIG. 5A, machine sensors 130-132 in raw data sensing layer 116 illustratively include a vehicle speed sensor 300, a machine configuration identifier 302 and a crop sensor, such as a mass flow sensor 306 that measures mass flow of product through machine 102. The components in derived data computation layer 118 illustratively include components for generating derived data such as a productivity computation component 308 that calculates productivity that indicates the overall grain productivity of machine 102. This can be in tons per hour, tons per hectare or other units or a combination of such metrics. They also include a windowing component 314 that divides the data into temporal windows or time frames and provides it to layer 104.

Evaluation layer 104 illustratively includes a grain productivity fuzzy logic evaluation mechanism 317 that not only compares the output from layer 118 to the various reference data sets 156 in reference data store 114, but also classifies a measure of that comparison. In one embodiment, the output of layer 104 is illustratively a unitless number in a predefined range that indicates whether the operator performed in a good, average or poor range, relative to the reference data to which it was compared. Again, as mentioned above, the good, average or poor categories are exemplary only. Other outputs such as a continuous metric can be used or more, fewer, or different categories could be used as well.

FIG. 5A also shows that pillar score generation layer 106 illustratively includes a grain productivity metric generator that comprises the productivity score generator 164. Generator 164 receives the unitless output of layer 104 and generates a productivity pillar score 124 based on the input. The productivity score is indicative of the productivity performance of operator 101, based upon the current data. This information is provided to layer 108.

Figure 5B:
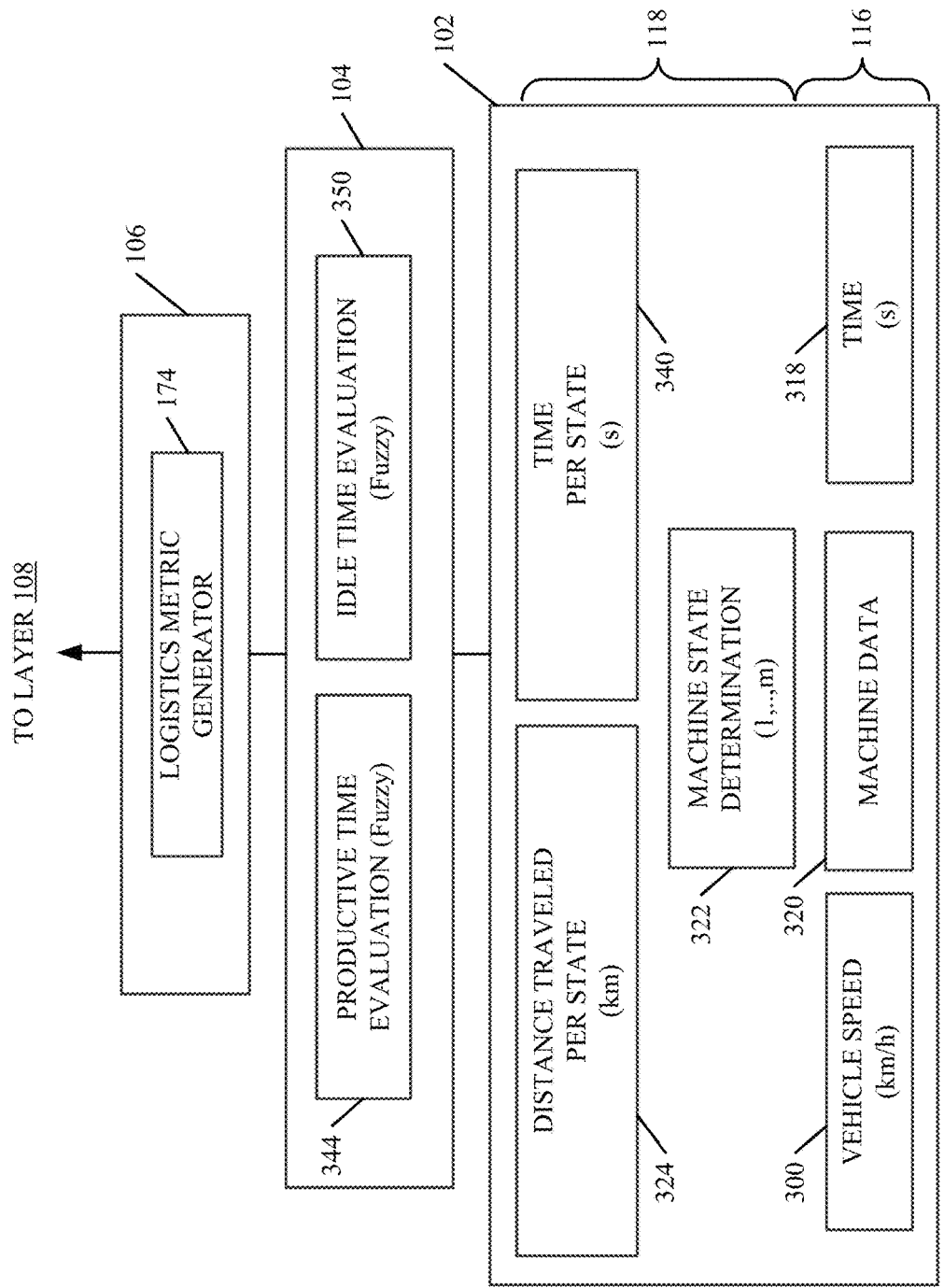

FIG. 5B shows one embodiment of a processing channel in architecture 100 that can be used to generate the logistics supporting pillar score. Some of the items shown in FIG. 5B are similar to those shown in FIG. 2, and they are similarly numbered. FIG. 5B shows that layer 116 includes a time sensor 318 that simply measures the time that machine 102 is running. It also includes a machine state data 320 that identifies when machine 102 is in each of a plurality of different states. A vehicle speed sensor 300 is also shown, although it is already described with respect to FIG. 5A. It can also be a separate vehicle speed sensor as well. Derived data computation layer 118 illustratively includes machine state determination component 322. Based on the machine state data received by sensor 320, component 322 identifies the particular machine state that machine 102 resides in, at any given time. The machine state can include idle, harvesting, harvesting while unloading, among a wide variety of others.

Components in layer 118 also illustratively include a plurality of additional components. Component 324 measures the distance machine 102 travels in each traveling state. Component 340 computes the time machine 102 is in each state. The times can illustratively computed in relative percentages or in units of time.

The output of components 324 and 340, are provided to fuzzy logic components 344 and 350 that compares the data provided by components 324 and 340 against reference data for productive time and idle time and evaluates it against that reference data. Again, in one embodiment, the output of the fuzzy logic components is a unitless value in a predetermined range that indicates whether the performance of operator 101 was good, average or poor relative to the reference data. Layer 104 can include other components for generating other outputs, and it can consider other information from layers 116 and 118 or from other sources.

Logistics metric generator 166 illustratively computes a logistics metric, in the embodiment shown in FIG. 5B, based upon all of the inputs illustrated. The logistics metric is a measure of the operator's logistics performance based on the various comparisons against the reference data sets, and it can be based on other things as well.

Figure 5C:
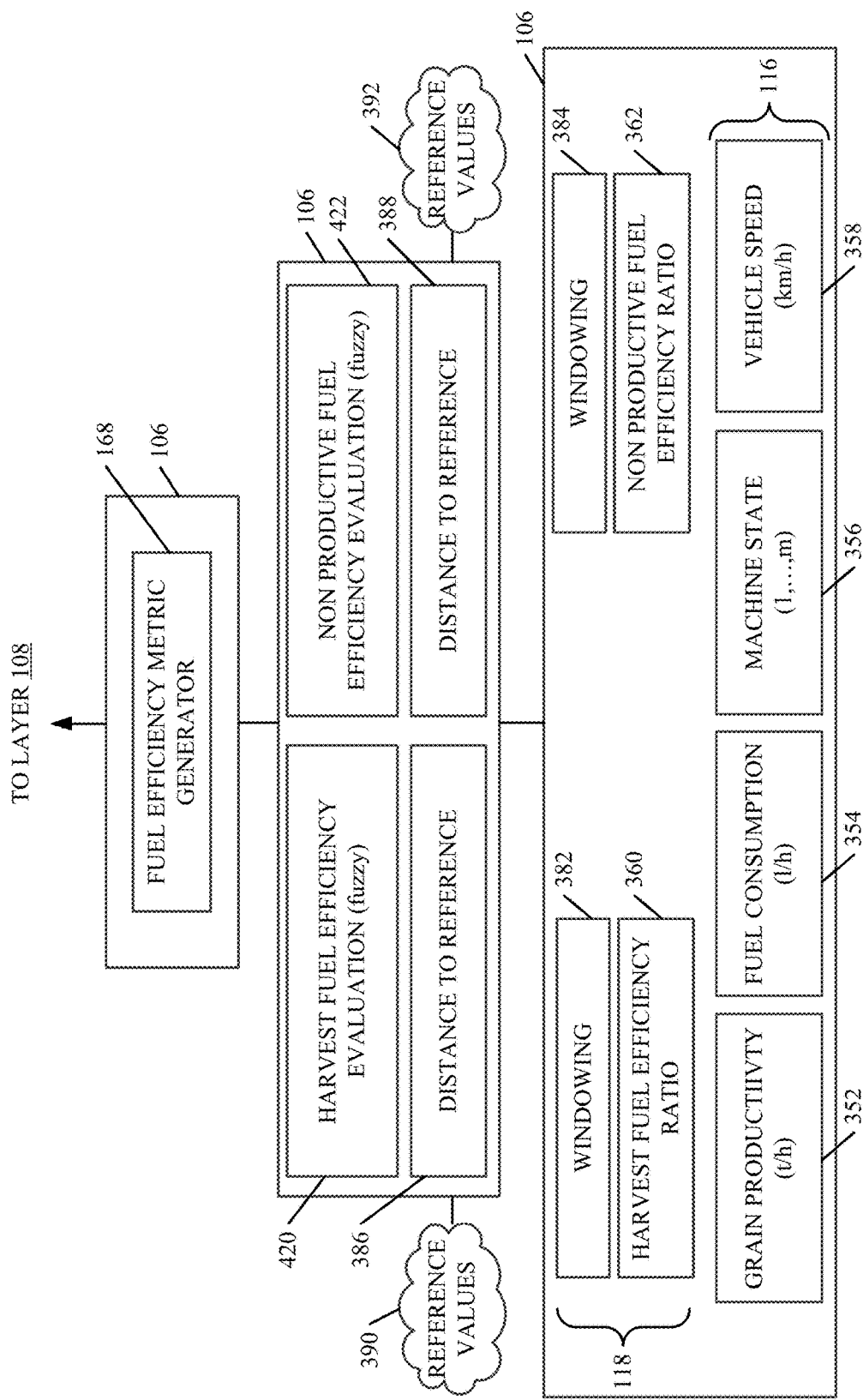

FIG. 5C shows a block diagram of one implementation of a computing channel in architecture 100 for calculating the fuel economy performance pillar score. In the embodiment shown in FIG. 5C, layer 116 illustratively includes a grain productivity sensor (or calculator) 352 that senses (or calculates) grain productivity for the combine (e.g., machine 102). It can be the same as component 308 in FIG. 5A or different. It can provide an output indicative of grain productivity in a variety of different measures or units. It also includes a fuel consumption sensor 354 that measures fuel consumption in units of volume per unit of time. It includes a machine state identifier 356 that identifies machine state (this can be the same as component 322 in FIG. 5B or different), a vehicle speed sensor 358 that measures vehicle speed (which can be the same as sensor 300 in FIG. 5A or different).

Layer 118 includes component 360 that calculates a harvest fuel efficiency ratio for harvesting states and component 362 calculates a non-productive fuel efficiency ratio for non-productive states.

Windowing components 382 and 384 break the data from components 360 and 362 into discrete timeframes. Layer 104 includes average distance components 386 and 388 which receive inputs from reference functions 390 and 392 and output an indication of the distance of the lines fit to the data output by components 382 and 384 from reference functions 390 and 392.

Layer 104 illustratively includes a harvest fuel efficiency evaluator 420, and a non-productive fuel efficiency evaluator 422. Component 420 receives the output from component 386 (and possibly other information) and compares it against reference data, evaluates the measure of that comparison and outputs a value that is indicative of the performance of operator 101 in terms of harvest fuel efficiency. Component 422 does the same thing for non-productive fuel efficiency.

Layer 106 in FIG. 5C illustratively includes a fuel economy metric generator as fuel economy score generator 168 (shown in FIG. 2). It receives the inputs from components 420 and 422 and can also receive other inputs and generates a fuel economy pillar score for operator 101. The fuel economy pillar score is indicative of the fuel economy performance of operator 101, based on the current data collected from machine 102, as evaluated against the reference data.

Figure 5D:
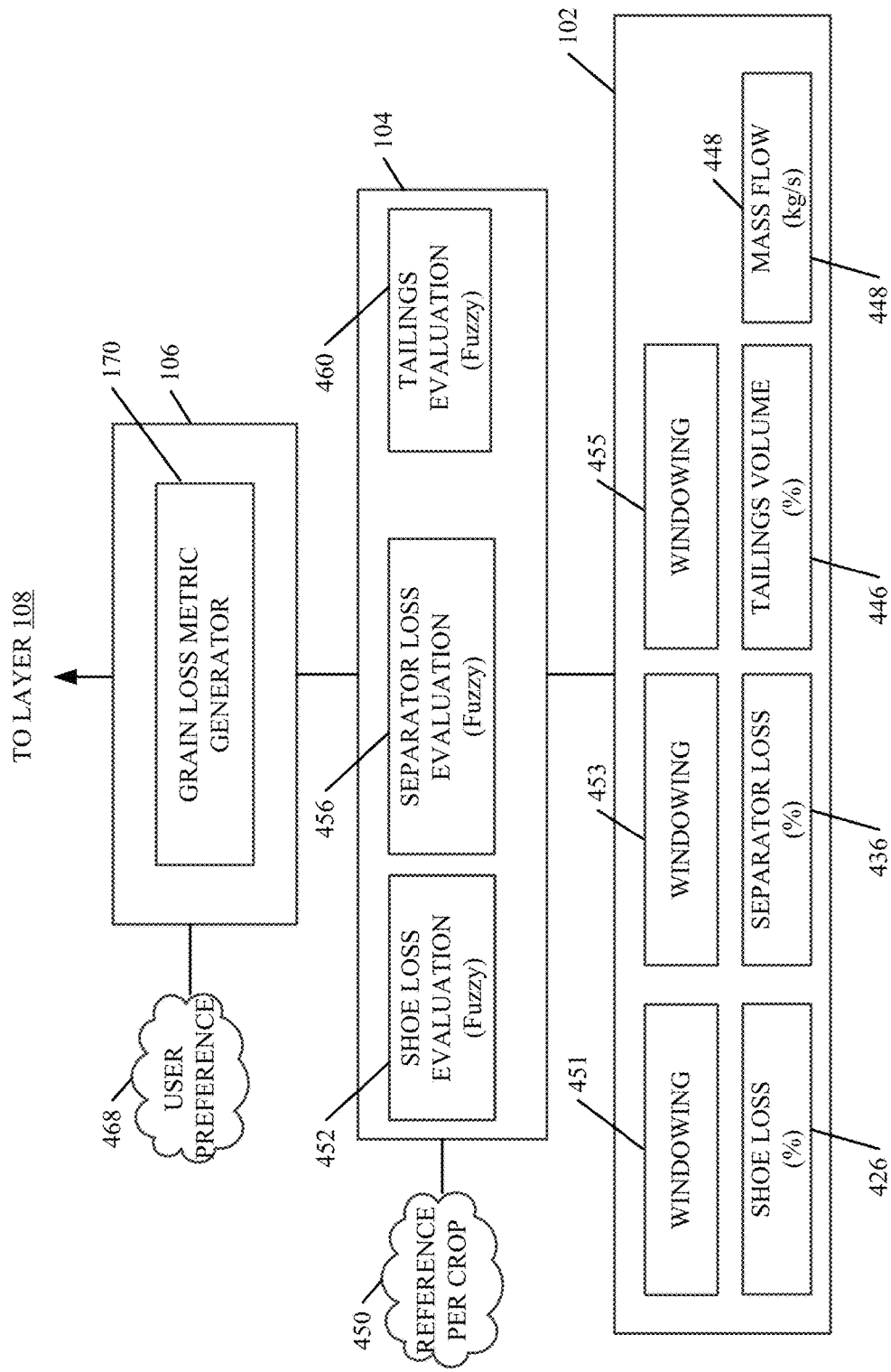

FIG. 5D shows one embodiment of a computing channel in architecture 100 shown in FIG. 2 for calculating the material loss performance pillar score. It can be seen that material loss score generator 170 (from FIG. 2) comprises grain loss metric generator 170 shown in FIG. 5D. In the embodiment shown in FIG. 5D, layer 116 includes a left hand shoe loss sensor component 426 that senses show loss and calculates a total percentage of shoe loss. It also includes separator loss sensor 436 that senses separator loss and computes a total percentage of separator loss, a tailings volume sensor 446 that senses a volume of tailings, and mass flow sensor 448. Sensor 448 can be the same as server 306 in FIG. 5A or different.

Windowing components 451, 453 and 455 receive inputs from components 426, 436 and 448 and break them into discrete time windows. These signals can be filtered and are provided to layer 104. Data evaluation layer 104 illustratively includes shoe total loss evaluator 452, separator total loss evaluator 456, and a tailings evaluator 460.

Total shoe loss evaluator 452 illustratively comprises a fuzzy logic component that receives the total shoe loss from component 451 in layer 118 and compares that against total shoe loss reference data from data store 114. It then evaluates the measure of that comparison to provide a unitless value indicative of whether the performance of operator 101, in terms of total shoe loss, is classified as good, average or poor.

Similarly, separator total loss evaluator 456 each comprises a fuzzy logic component that receives the total separator loss from component 453 and compares it against reference data for total separator loss, and then evaluates the measure of that comparison to determine whether the performance of operator 101, in terms of total separator loss, is classified as good, average or poor.

Tailings evaluator 460 is illustratively a fuzzy logic component that receives an input from component 455, that is indicative of tailings volume and perhaps productivity. It then compares those items against tailings reference data in data store 114 and classifies the measure of that comparison into a good, average or poor classification. Thus, component 460 outputs a unitless value indicative of whether the performance of operator 101, in terms of tailings evaluation, is good, average or poor.

It can also be seen in FIG. 5D that, in one embodiment, all of the evaluator components 452, 456 and 460 receive an input from crop type component 450. Component 450 illustratively informs components 452, 456 and 460 of the crop type currently being harvested. Thus, the evaluator components 452, 456 and 460 can consider this in making the comparisons and classifications, relative to reference data.

Grain loss metric generator 170 receives inputs from the various evaluator components in layer 104 and aggregates those values and computes a performance pillar score for material loss. In doing so, generator 170 illustratively considers user preferences 468 that are provided, relative to material loss. These can be provided in terms of a total percentage, or otherwise. They illustratively indicate the importance that the user places on the various aspects of this particular performance pillar. The output of generator 170 is thus an overall material loss performance score that indicates how operator 101 performed in terms of material loss.

Figure 5E:
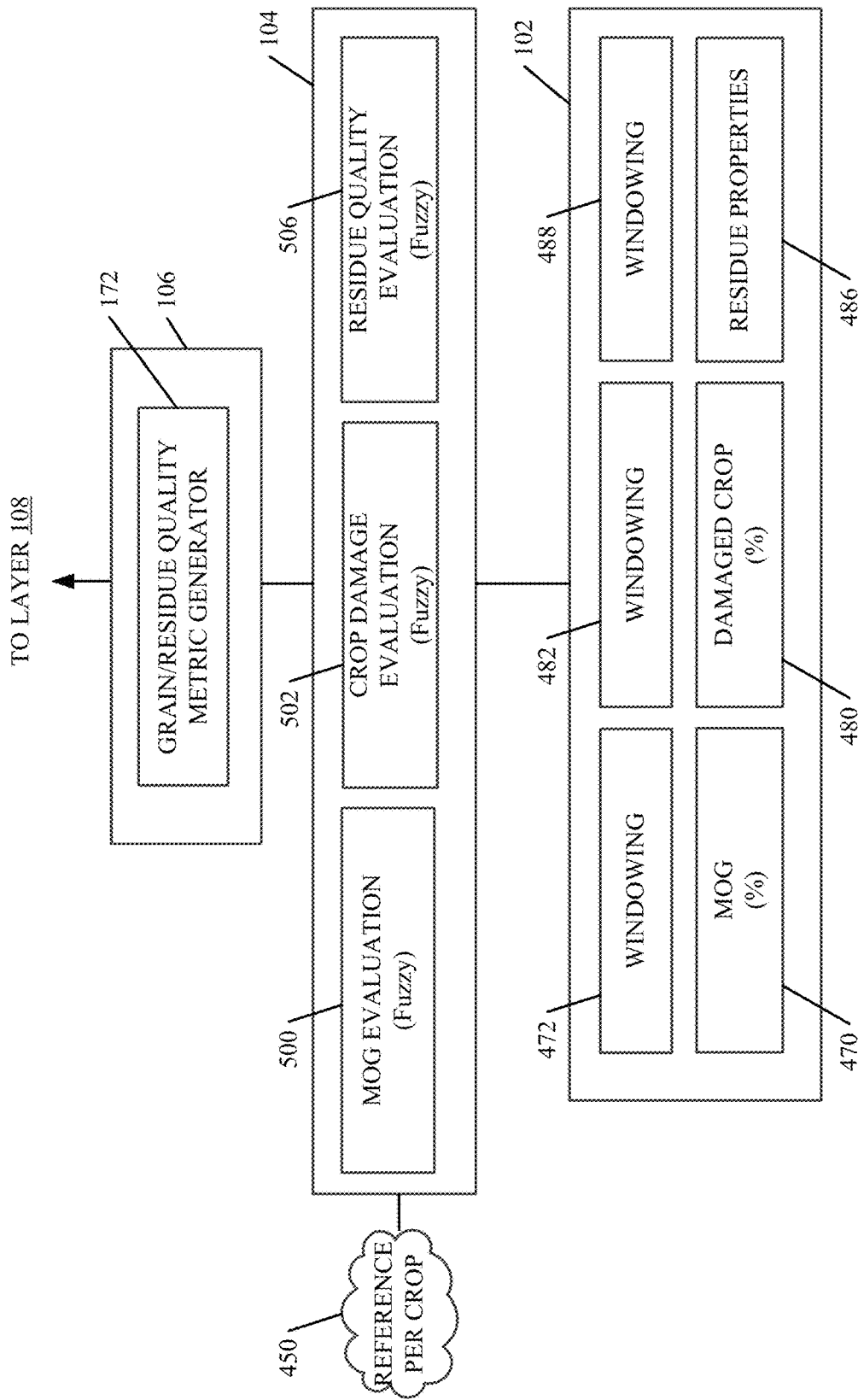

FIG. 5E is a more detailed block diagram showing one embodiment of a computing channel in architecture 100 to obtain a performance pillar score for material quality. Thus, it can be seen that material quality score generator 172 shown in FIG. 2 comprises grain/residue quality metric generator 172 shown in FIG. 5E. FIG. 5E shows that, in one embodiment, raw data sensing layer 116 includes sensor 470 that senses the types of material in the grain elevator. Sensor 470 illustratively senses the volume of material, other than grain, (such as chaff and cobs). Damaged crop sensor 480 illustratively senses the percent of material that is damaged (such as broken, crushed or cracked).

Residue properties sensor 486 can sense various properties of residue. The properties can be the same or different depending on whether the combine is set to chop or windrow.

FIG. 5E shows that derived data computation layer 118 illustratively includes components 472, 482 and 488 that filters the signals from sensors 470, 480 and 486. This can be breaking signals into temporal windows and calculating a representative value for each window or otherwise.

In the embodiment shown in FIG. 5E, data evaluation layer 104 illustratively includes a material other than grain evaluator 500, a crop damage evaluator 502, and a residue quality evaluator 506. It can be seen that components 500, 502 and 508 can all illustratively be informed by user preferences with respect to grain quality thresholds or by reference data 450 for the specific crop type.

In any case, evaluator 500 illustratively receives the input from component 472 in layer 118 and compares the filtered material other than grain value, for light material, against corresponding reference data in data store 114. It then classifies the result of that comparison into a good, average or poor class. The class is thus indicative of whether the performance of operator 101, in terms of material other than grain in the grain elevator, is good, average or poor.

Crop damage evaluator 502 receives the input from component 482 in layer 118 that is indicative of a percent of product in the grain elevator that is damaged. It compares that information against corresponding reference data from reference data store 114 and classifies the result of that comparison into a good, average or poor class. It thus provides a value indicative of whether the performance of operator 101, in terms of the product in the grain elevator being damaged, is good, average or poor.

Residue quality evaluator 506 receives inputs from component 488 in layer 116 and 118 and compares those inputs against corresponding reference data in reference data store 114. It then classifies the result of that comparison into a good, average or poor class. Thus, it provides an output indicative of whether the performance of operator 101, in terms of residue quality, is good, average or poor.

Grain/residue quality metric generator 172 receives inputs from the various components in layer 104 and uses them to calculate a grain/residue quality score for the material quality performance pillar. This score is indicative of the overall performance of operator 101, in operating machine 102, in terms of grain/residue quality. The score is illustratively provided to layer 108.

Figure 5F:
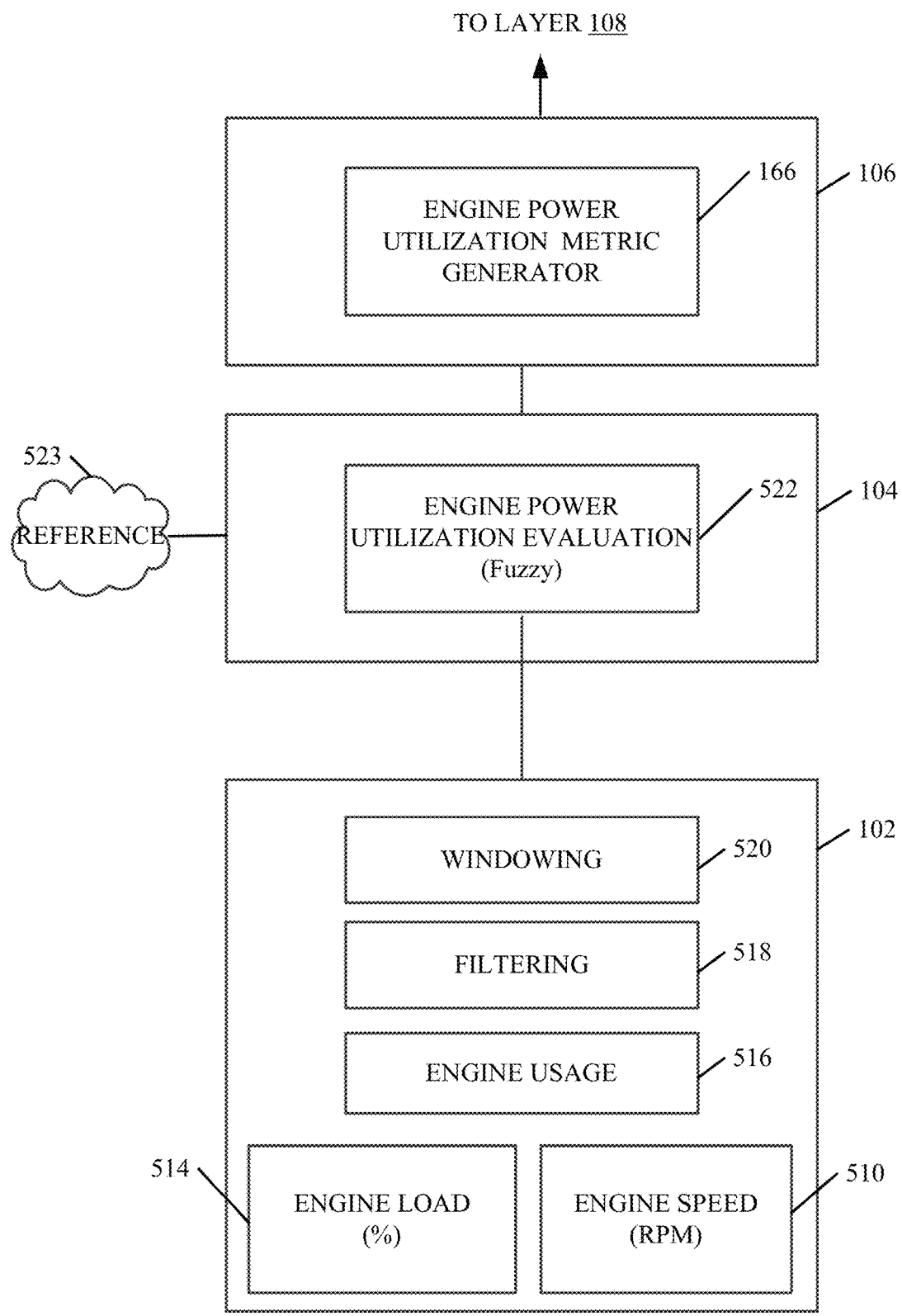

FIG. 5F shows one embodiment of a processing channel in architecture 100 shown in FIG. 2, to calculate the engine power utilization score for the power utilization pillar, on a combine. Thus, power utilization score generator 166 is shown in FIG. 5F. In the embodiment shown in FIG. 5F, raw data sensing layer 116 illustratively includes engine speed sensor 510, and an engine load sensor 514. Layer 118 illustratively includes an engine usage component 516 that receives the inputs from sensors 510 and 514 and calculates engine usage (such as power in kilowatts). Filtering component 518 filters the value from component 518. Windowing component 520 breaks the output from component 518 into discrete temporal windows.

The output from component 520 is provided to layer 104 which includes engine power utilization evaluator 522. Engine power utilization evaluator 522 is illustratively a fuzzy logic component that receives the output from component 520 in layer 118 and compares it against engine power utilization reference data 523 in reference data store 114. It then classifies the result of that comparison into a good, average or poor class. Thus, the output of component 522 is a unitless value that indicates whether the performance of operator 101, in terms of engine power utilization is good, average or poor.

Score generator 174 receives the output from evaluator 522 and calculates a performance pillar score for engine power utilization. The output from component 174 is thus a performance pillar score indicative of whether the overall performance of operator 101, in operating machine 102, is good, average or poor in terms of engine power utilization. The score is illustratively provided to layer 108.

Figure 5G:
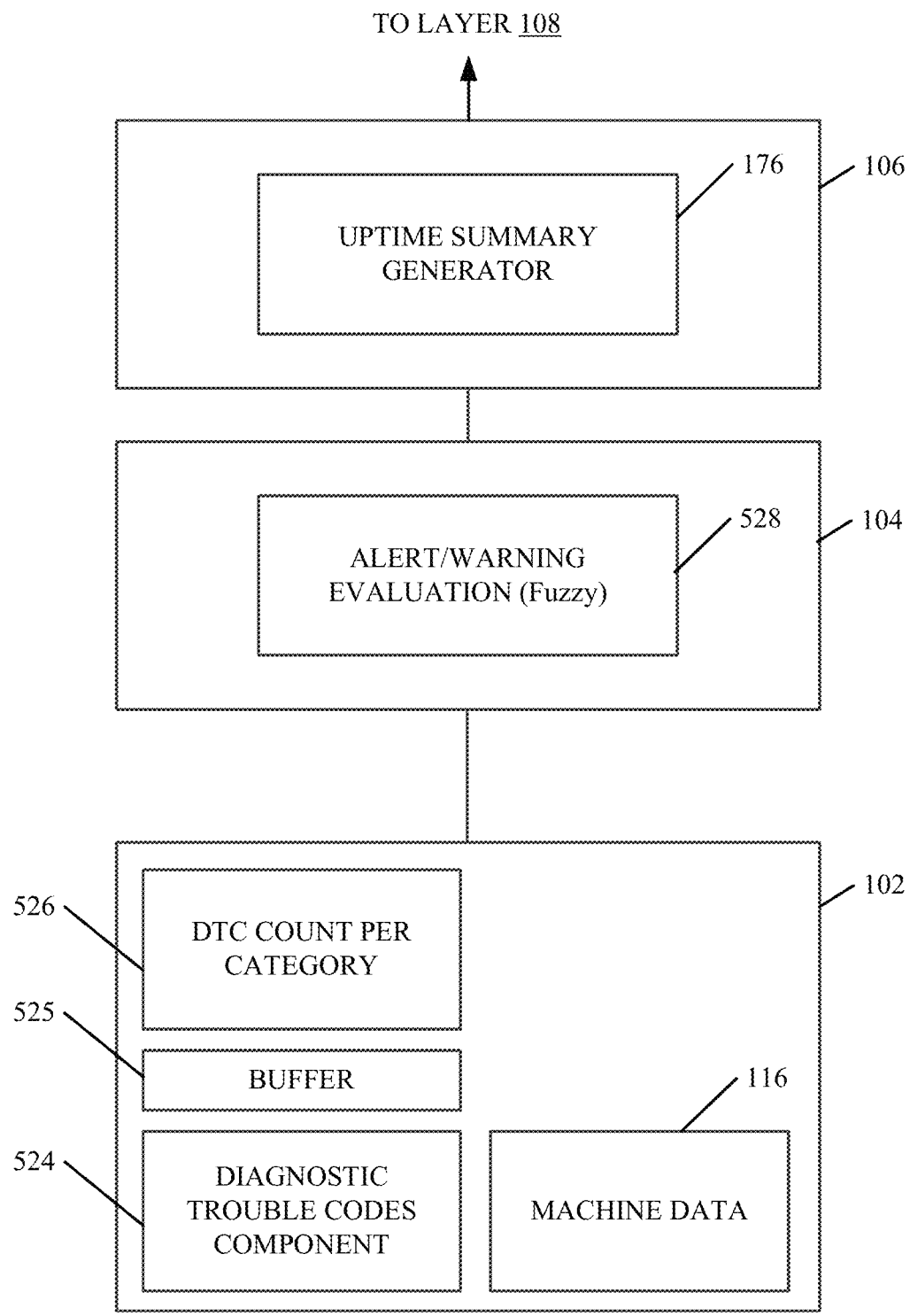

FIG. 5G is a more detailed block diagram showing one embodiment of the architecture 100 shown in FIG. 2 in generating the uptime summary. In the embodiment shown in FIG. 5G, layer 116 includes machine data sensor 116. Machine data sensor 116 illustratively senses a particular machine state that machine 102 is in, and the amount of time it is in a given state. It can also sense other things.

Layer 118 illustratively includes a diagnostic trouble code (DTC) component 524 that generates various diagnostic trouble codes, based upon different sensed occurrences in machine 102. They are buffered in buffer 525. DTC count component 526 calculates the number of DTC occurrences per category, and the number and frequency of occurrence of various alarms and warnings indicated by machine data 116. By way of example, component 526 may calculate the number of times the feeder house gets plugged or the number of other alarms or warnings that indicate that machine 102 is undergoing an abnormally high amount of wear. The alarms and warnings can be event based, time based (such as how many separator hours the machine has used), or based on other things.

Layer 104 includes alert/warning evaluator 528 that compares the various information from machine 102 against reference data to generate information indicative of the operator's performance. The information is provided to summary generator 176.

Uptime summary generator 176 in layer 106 receives the outputs from component 528 and uses them to generate uptime summary information indicative of the performance of operator 101, in operating machine 102, in terms of uptime. The uptime summary information can be provided to layer 108, or used by other parts of the system, or both.

It will be noted that the present discussion describes evaluating data using fuzzy logic. However, this is exemplary only and a variety of other evaluation mechanisms can be used instead. For instance, the data can be evaluated using clustering and cluster analysis, neural networks, supervised or unsupervised learning techniques, support vector machines, Bayesian methods, decision trees, Hidden Markov models, among others. Further, FIGS. 6A-6F below describe how to set up and use a fuzzy logic evaluator to generate recommendations. This is but one example of how the collected data can be evaluated to determine whether it fulfills any of a variety of actionable conditions for which a recommendation can be generated. The other evaluation techniques can be used to determine this as well.

Figure 6A:
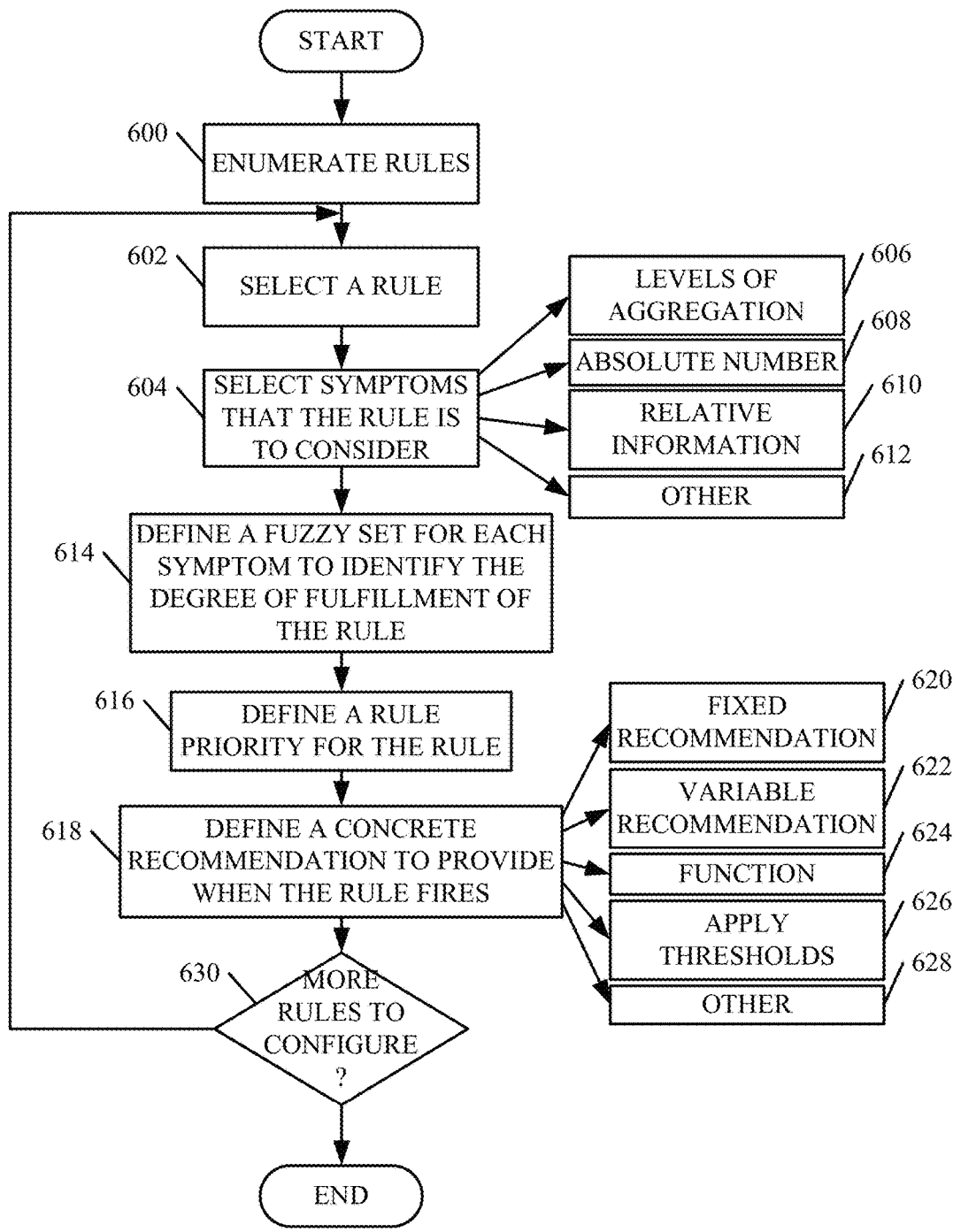
FIG. 6A is a flow diagram illustrating one way in which rules can be configured to generate recommendations.

FIG. 6A is a flow diagram illustrating one embodiment of how recommendation rules 185 can be configured so they can be used by recommendation engine 184 in generating recommendations 192. The rules represent actionable conditions. The collected and sensed data is evaluated against those conditions to see whether the conditions are fulfilled and, if so, the degree of fulfillment. When any of the conditions are met, corresponding recommendations can be output. The overall operation of configuring the rules will first be described with respect to FIG. 6A, and then a number of examples will be provided in order to enhance understanding.

In accordance with one embodiment, the rules that are to be used by recommendation engine 184 are first enumerated. This is indicated by block 600 in FIG. 6A. The rules can be a wide variety of different types of rules, and they can vary in number from a few rules, to tens or hundreds or even thousands of rules. The exact nature of a given rule will vary based upon application, and based upon the mobile machine for which the rule is generated.

Once the rules are enumerated, one of the rules is selected. This is indicated by block 602. For the selected rule, a number of symptoms that are to be considered for the rule are selected. The symptoms to be considered can be obtained from substantially any of the levels set out in FIG. 1, and for which examples were provided in FIGS. 5A-5G. Thus, they can include, for instance, CAN data 142, derived data 120, evaluation values 122, pillar scores 124, composite scores 190, or a host of other data. Selecting the symptoms to be considered by the selected rule is indicated by block 604 in FIG. 6A.

In selecting those symptoms, they can be obtained from different levels of aggregation, as indicated by block 606. They can be reflected by an absolute number 608 or by comparison to reference data 156. They can be compared to user preferences 158, or other information. This type of relative information is indicated by block 610 in FIG. 6A. Of course, the symptoms can be other items as well, and this is indicated by block 612.

Next, for each symptom selected for the current rule, a fuzzy set can be defined to identify the degree of fulfillment of the rule, based upon the various parameters. This is indicated by block 614.

A rule priority is then assigned to the selected rule. By way of example, some rules can be more important than others, in different applications. Thus, different rule priorities can be assigned to reflect importance of the rule in the given application. The rule priority can be an absolute number or it can be a category (such as high, medium, low, etc.). Assigning the rule priority is indicated by block 616 in FIG. 6A.

Finally, one or more concrete recommendations are defined for the selected rule. These are the recommendations that will be output to the user, when the rule fires. This is indicated by block 618 in FIG. 6A. The recommendations can take a wide variety of different forms. For instance, they can be fixed recommendations (such as "drive 3 km per hour faster"). This is indicated by block 620. They can be variable recommendations 622, that vary based on a wide variety of different things. They can vary based upon the degree of fulfillment, they can vary based on a combination of items, or they can vary according to a specified function 624. In addition, thresholds can be defined. The recommendation engine can apply the degree of fulfillment of a given rule to a threshold to determine whether the rule is triggered. Applying thresholds is indicated by block 626 in FIG. 6A. The concrete recommendations can be defined in other ways as well, and this is indicated by block 628.

In one exemplary embodiment, the process set out in FIG. 6A is repeated for each enumerated rule. This is indicated by block 630 in FIG. 6A. This completes the configuration of the rules.

A number of examples will now be provided. The following six rules will be discussed for the sake of example only. It will be noted that a great many additional rules or different rules could be enumerated as well.

Rule 1. Ground speed too slow for yield.
Rule 2. Driving too slow while unloading on the go.
Rule 3. Driving slower due to material handling disturbance and/or threat of plugging.
Rule 4. Down crop and cannot drive faster.
Rule 5. Excessive idle time due to grain logistics.
Rule 6. Frequent plugging of the feeder house.

The symptoms that affect each rule can be selected to focus on various pillars, or on various other sensed or derived inputs. By way of example, rule 1 above focuses on the grain productivity pillar. Rule 2 focuses on both the grain productivity and the logistics pillars. Thus, the focus of a given rule can be a single pillar, combinations of pillars, individual or combinations of sensed or derived parameters, or a wide variety of other things.

Selecting a set of symptoms that is to be considered in determining whether a rule is triggered will now be described for Rule 1. The symptoms can include, for instance, a consideration as to whether the grain productivity, as measured against a reference (such as a productivity reference value for the same crop and under the same conditions) is below a threshold level. It can also consider whether the available machine power is fully utilized, and whether the machine is loss limited (which can be indicated when the loss pillar score is high). The average speed in harvesting can also be considered. For instance, recommendation engine 184 may consider whether the average speed is below a reasonable upper threshold (such that the machine could actually go faster and still run with reasonable ride comfort, etc.).

Figure 6B:
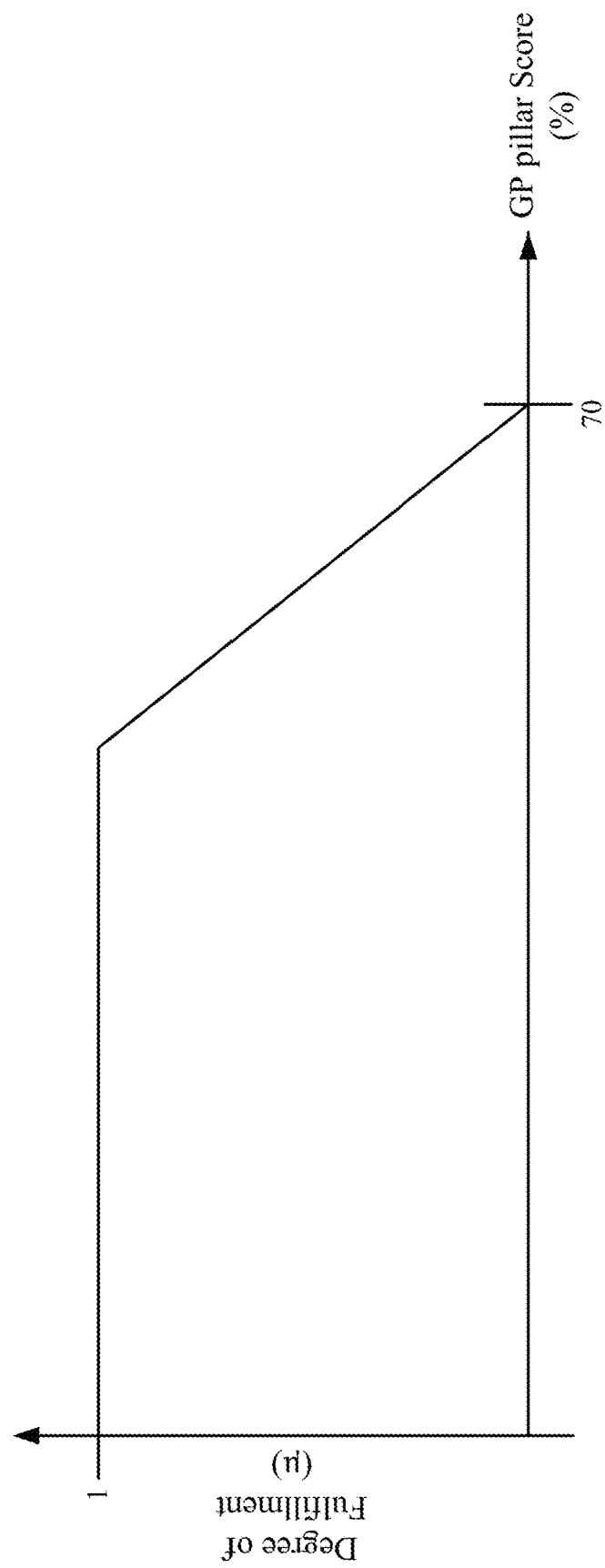
FIGS. 6B-6E are graphs plotting a degree of fulfillment of a parameter corresponding to a rule versus a parameter measurement.

For each of these symptoms, a fuzzy set can be defined that applies to the rule. In one embodiment, the fuzzy set is defined by a border function in a graph that plots degree of fulfillment against a measure of the parameter (or symptom). FIG. 6B, for instance, shows a plot of degree of fulfillment plotted against a grain productivity pillar score, as compared to a reference group. Thus, the percent on the x-axis of the graph shown in FIG. 6B indicates how the grain productivity score compares against the reference group.

Figure 6C:
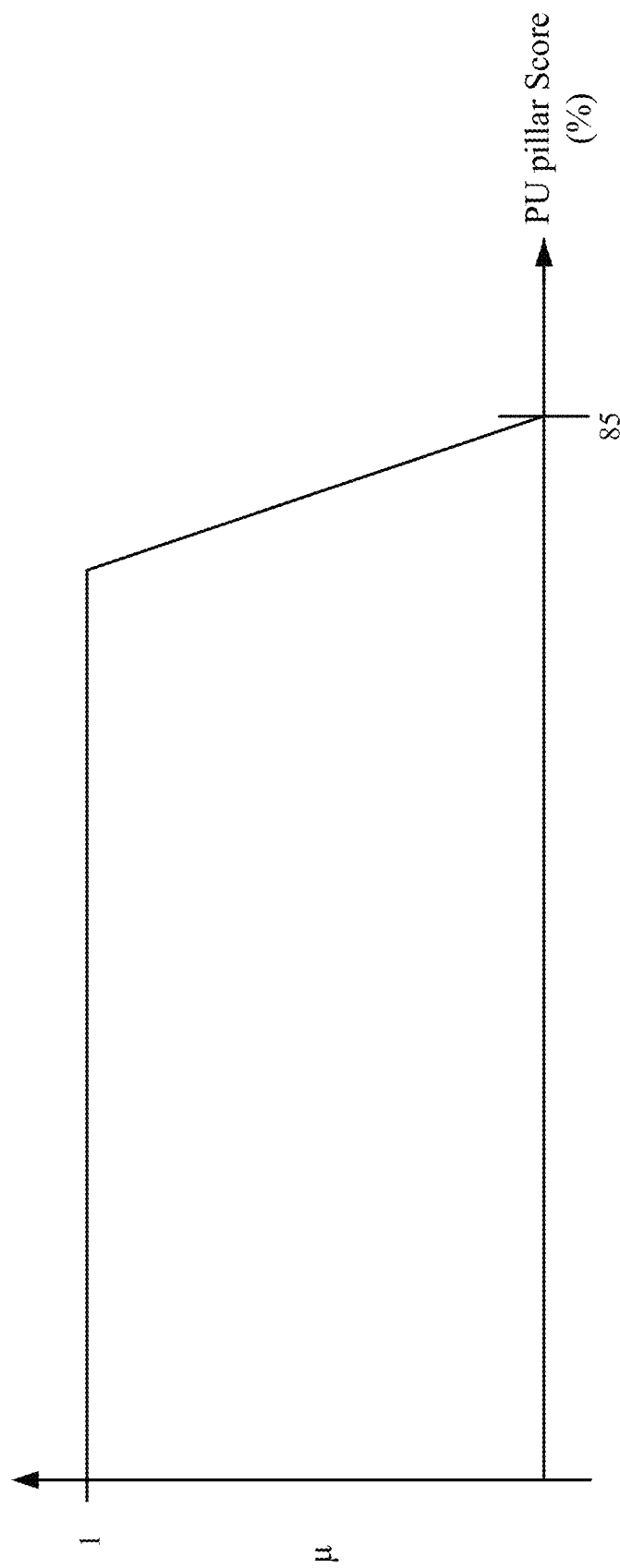
Figure 6D:
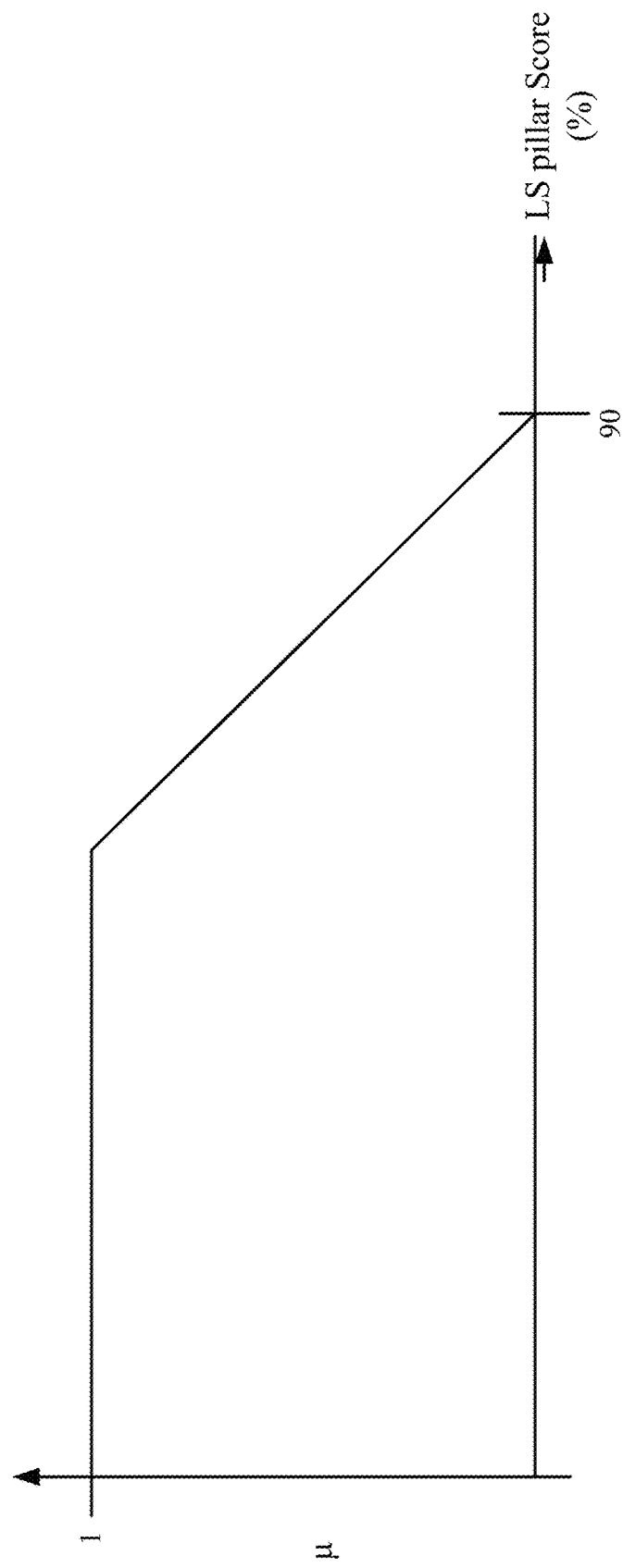
Figure 6E:
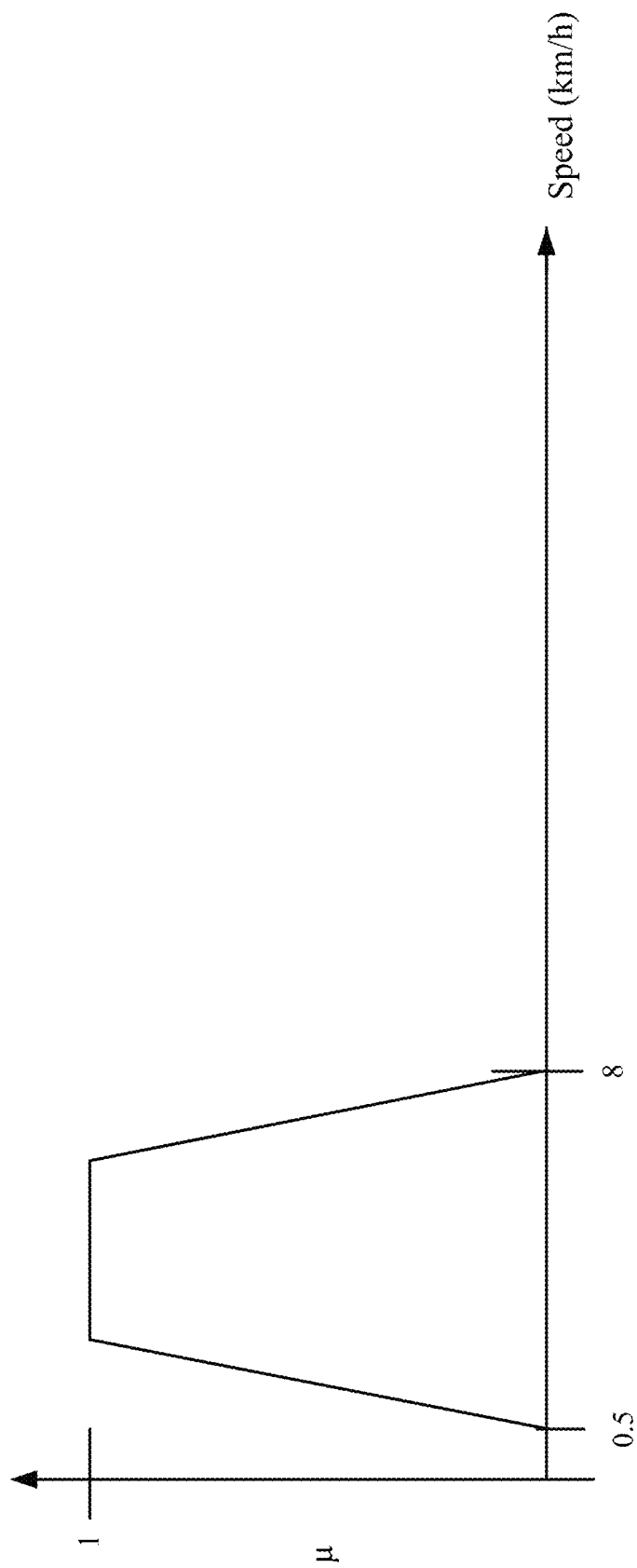

FIG. 6C plots degree of fulfillment against the absolute machine power utilization pillar score. FIG. 6D plots degree of fulfillment against the loss pillar score as measured against a user preference. For the average speed parameter, FIG. 6E plots a degree of fulfillment against the average vehicle speed during harvesting.

Having defined a fuzzy set for each parameter corresponding to rule 1, rule 1 is then assigned a priority. In one embodiment, the priority can be high, medium or low based on the importance of the rule in the given application. The rule priority can be defined in other ways as well.

Next, a concrete recommendation is defined for rule 1. That is, the recommendation defined for rule 1 will be that recommendation that is output by engine 184 if engine 184 determines that rule 1 triggers and that the corresponding recommendation is to be output. While only one recommendation for rule 1 is described, it will be noted that each rule can have a plurality of different recommendations that are selected based on the degree of fulfillment or based on other criteria. In another embodiment, each rule only has a single recommendation. Also, the recommendations can be fixed or variable. For instance, the recommendation for rule 1 may be to drive faster by x kilometers per hour. The x can be a fixed value, or it can be variable based on a wide variety of things. As an example, where x is a variable, it may depend on the distance that the average speed is from the upper speed threshold for the vehicle as set for the rule. It may vary based upon the degree of overall rule fulfillment, or it may vary based upon a combination of things. It can be based upon any other parameter or combination of parameters, or it can be based on a predefined function that is not affected by other parts of the rule.

The same process is then performed with respect to rules 2-6 above. For instance, for rule 2, one consideration may be whether the ratio of productivity (in tons per hour) while harvesting versus the productivity while harvesting and unloading is below average (relative to a reference group in the same crop under the same conditions). Another consideration may be whether the vehicle speed (such as an absolute number in kilometers per hour) is in a given range (such as in a range of 0.1-6 kilometers per hour) to ensure that the rule does not fire if the speed is already high. The degree of fulfillment functions are then defined for each parameter, the rule is assigned a priority, and the recommendation is defined. The recommendation for rule 2 may be, for instance, "speed up by y" where y is fixed or any form of parameter-dependent, or parameter-independent function or where y is scaled based on rule fulfillment, etc.

For rule 3 above, some symptoms to consider may include whether the change rate and/or change deviation of rotor drive pressure is above normal. This may provide content for a report conveying the conditions of the field. Fulfillment functions are defined, the rule is assigned a priority, and a recommendation is defined. For some rules (such as rule 3), there may be no recommendation defined. This rule may only trigger an entry in a report to show context. This can allow a farm manager or another person to interpret other results in the report appropriately. By way of example, the manager may be able to tell that the operator was driving more slowly because of a disturbance in material flow. This might be because of the field conditions, and not the operator. Thus, this context information is provided in the report when this rule fires, but no recommendation is output.

For rule 4 above, the parameters that are considered may be whether grain productivity (measured relative to a reference group) is medium to low, whether the reel position on a combine is down and extended, and whether the machine is harvesting, among others. The degree of fulfillment for each of these parameters can be defined, and the priority can be assigned to the rule. Again, as with rule 3, it may be that no recommendation is generated for rule 4. Instead, when rule 4 fires, it provides content for a report that conveys conditions to allow a person reading the report to interpret other results appropriately. By way of example, a down crop can be caused by heavy rainfall, heavy winds, or other conditions. When this condition exists, the operator may lower the vehicle speed, lower the rotor head, and place the reel down.

For rule 5, some of the parameters to consider can be whether, after one field is completed, the logistic score is below 90%. Another parameter may include whether after a field is completed, the percent of time in idle with a full grain tank (or one that is close to full) is above normal by a threshold amount, relative to a reference value in the same crop and under the same conditions. The degree of fulfillment can be defined for the rule, and it can be assigned a priority. The recommendation may be to investigate crop logistics.

For rule 6 above, some of the parameters to consider may be whether certain trouble codes were generated that indicate the feeder house is plugging. This can be indicated, for instance, by a count of the number of such feeder codes per unit time. If this ratio is above a predefined threshold or is high relative to a reference group, this can cause the rule to fire. The degree of fulfillment can be defined for the rule in other ways, and a priority is assigned to the rule. The recommendation may be to investigate the header setup and settings, because something is wrong that is leading to unusually frequent plugging.

Figure 6F:
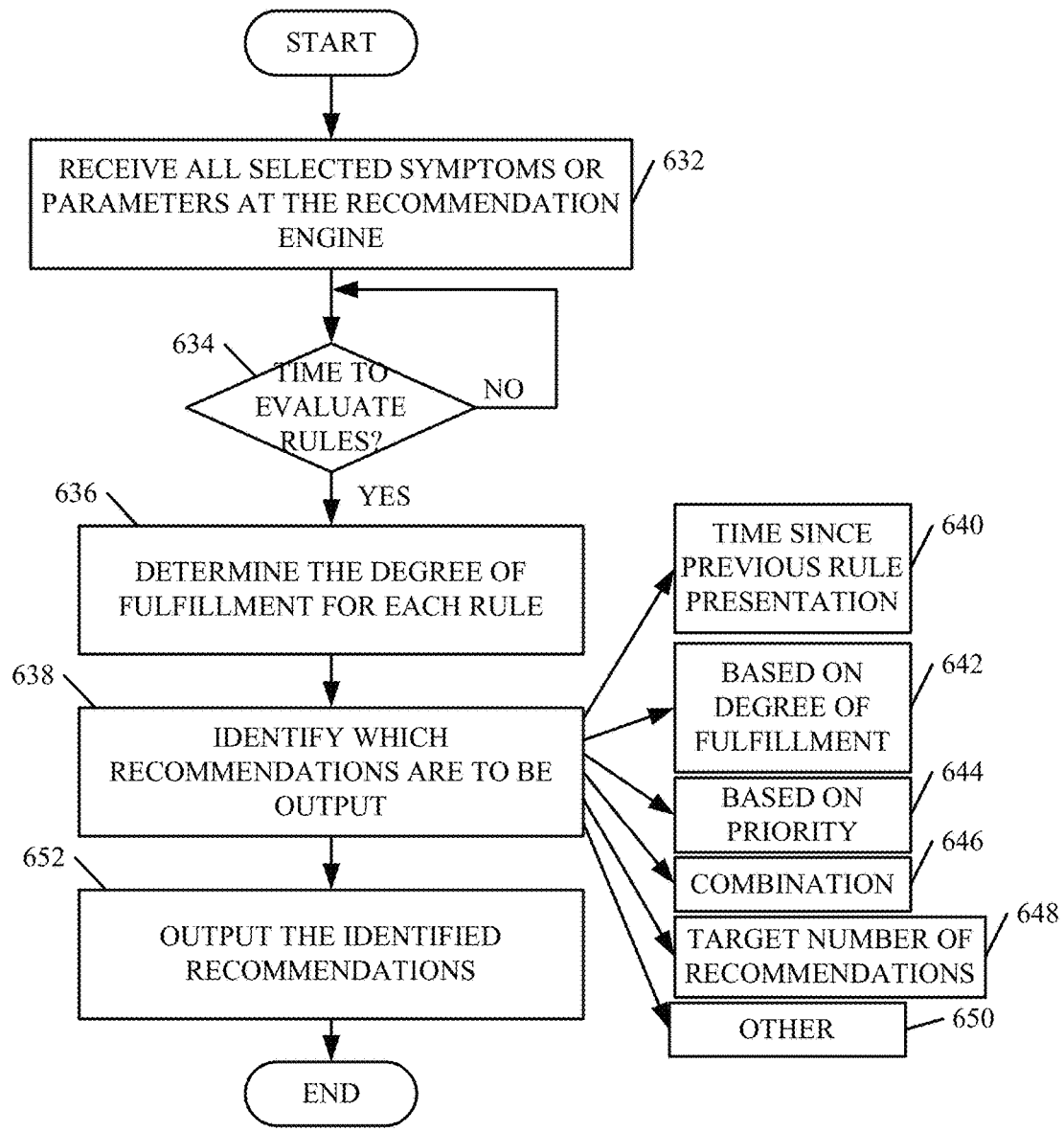
FIG. 6F is a flow diagram illustrating one embodiment of the operation of the recommendation engine in generating recommendations.

FIG. 6F is a flow diagram illustrating one embodiment of the operation of recommendation engine 184 in determining which rules are triggered, and when to present recommendations. Recommendation engine 184 first receives all of the selected symptoms or parameters, for all of the various rules, so they can be evaluated. This is indicated by block 632 in FIG. 6F.

Recommendation engine 184 then determines whether it is time to see if any of the rules are triggered. This is indicated by block 634. This can be done in a wide variety of different ways. For instance, recommendation engine 184 can evaluate the rules periodically. Further, the rule evaluation can be based on sensed conditions. For instance, if one rule is triggered, then other, related rules, may be immediately evaluated. In addition, if certain parameters or values are sensed or derived or are otherwise obtained, this may cause a rule or a subset of rules to be evaluated more often. In any case, recommendation engine 184 determines whether it is time to evaluate the rules.

Recommendation engine 184 then determines the degree of fulfillment for each of the rules that it is evaluating. This is indicated by block 636. This can also be done in a wide variety of different ways. By way of example, for rule 1, the degree of fulfillment for each parameter can be calculated. Then, the overall degree of fulfillment for the entire rule can be generated from the degrees of fulfillment for each parameter. As one example, the degree of fulfillment for the overall rule can be the same as the degree of fulfillment for the weakest parameter. In another embodiment, the degree of fulfillment of the overall rule can be based on a combination of degrees of fulfillment for each of the parameters. The degree of fulfillment can be obtained in other ways as well.

Once the degree of fulfillment of the rules is identified, recommendation engine 184 determines which specific recommendations to output to the operator. This is indicated by block 638 in FIG. 6F. Determining which specific recommendations to output can be based on a variety of different considerations as well.

For instance, if a recommendation was just recently output, recommendation engine 184 may bypass that recommendation for a predetermined time period. This may be done so that recommendation engine 184 is not repeatedly outputting the same recommendations too frequently. This is indicated by block 640 in FIG. 6F.

Determining that a recommendation is to be output can also be based on the degree of fulfillment of its rule. This is indicated by block 642. For example, if a given rule has a very high degree of fulfillment, its corresponding recommendation may be output before the recommendation corresponding to a rule that has a relatively low degree of fulfillment.

Determining whether to output a recommendation can also be based upon the priority assigned to the corresponding rule. This is indicated by block 644. For instance, if a plurality of recommendations are being output for high priority rules, then the recommendations for medium or low priority rules may be held until the high priority rules no longer fire. This is an example only.

Determining which recommendations to provide can be based on combinations of the rule priority, its degree of fulfillment, the time since the recommendation was last provided, or combinations of other things as well. This is indicated by block 646.

In addition, it should be noted that recommendation engine 184 may be configured to provide only a target number of recommendations at any given time. Thus, the highest priority recommendations can be output in descending order until the target number of recommendations is reached. This is indicated by block 648 in FIG. 6F. The recommendation engine 184 can determine which recommendations to output in other ways as well. This is indicated by block 650.

Further, in one embodiment, conflicting recommendations are identified and the conflicts are resolved before the recommendations are output. Conflicts can be resolved in a wide variety of different ways. For instance, when the recommendations are prioritized, the conflict can be resolved based on priority. Priority can be assigned anecdotally, heuristically, based on weights or underlying information or otherwise. Conflicts can also be resolved using a predetermined recommendation hierarchy that establishes a recommendation precedence. Conflicts can be resolved by accessing a set of conflict resolution rules. The rules can be static, context-dependent or dynamic. Conflicts can be resolved in other ways as well.

Once the recommendations that are to be output are identified, recommendation engine 184 outputs the identified recommendations. This is indicated by block 652 in FIG. 6F.

It should also be noted that the parameters considered for each rule need not be those generated from complex computation. Instead, they can be obtained from all levels of data aggregation in FIG. 1. Thus, some may be defined in engineering units, instead of other measures. By way of example, the parameters considered for rule 1 can be grain mass flow in tons per hectare, engine load factor in percent, loss sensor readings (for example, in shoe loss strikes), and ground speed in kilometers per hour. The parameter considered for rule 2 may be provided as the ratio of mass flow while the auger is off versus on (in tons perhour). The parameter considered for rule 3 may be provided as the rotor drive pressure change (in bar). The parameters considered for rule 4 can be the grain mass flow in tons per hour, the ground speed in kilometers per hour, reel position down and header position down. The parameters considered for rule 5 can be whether the grain tank fill level is constant and over 95% and not changing for at least a given time period (such as 30 seconds). The parameter considered for rule 6 can be the diagnostic trouble code count. Of course, other, more complex parameters can be used as well.

Figure 6G:
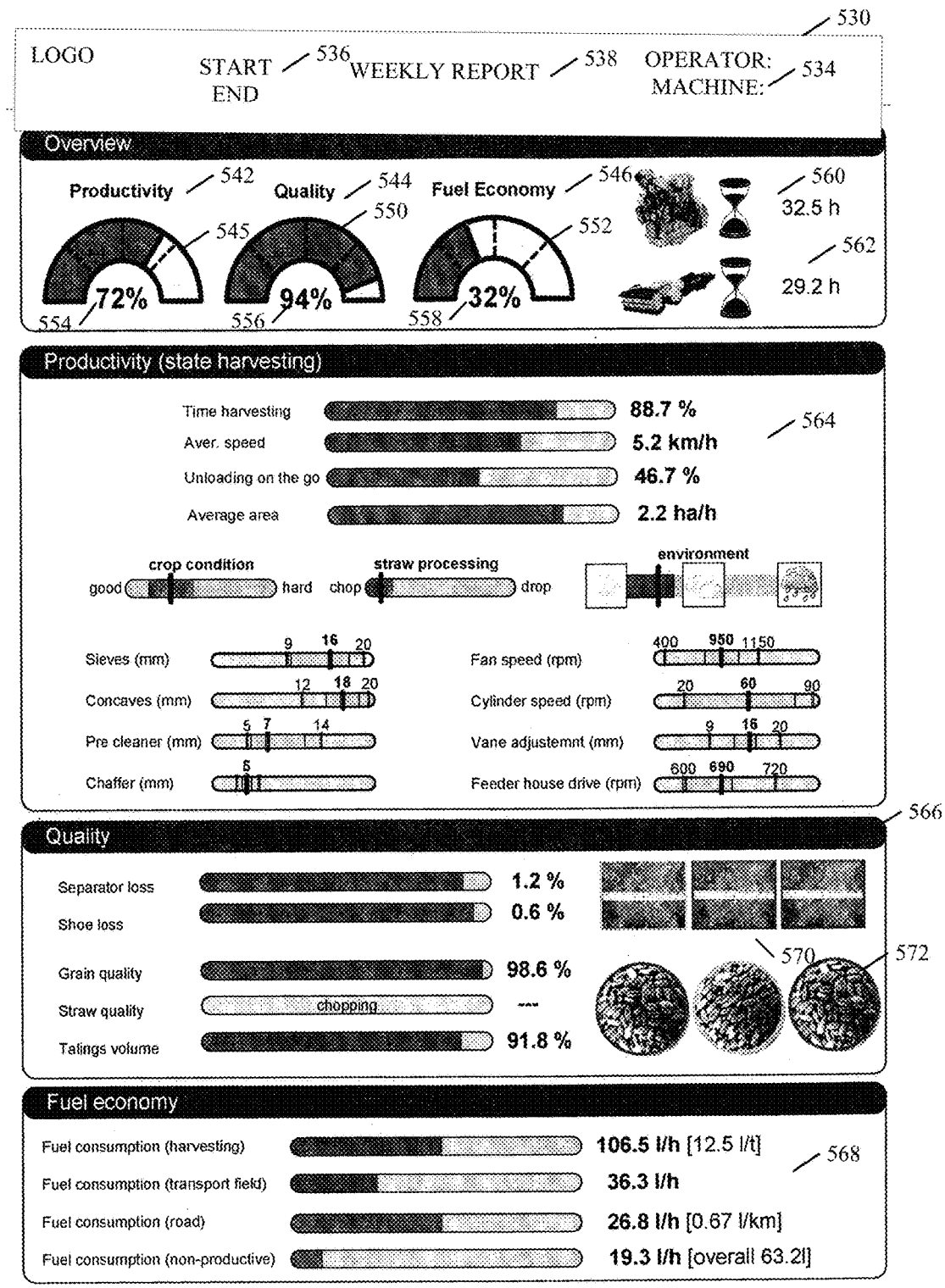
FIG. 6G is one exemplary user interface display that illustrates one exemplary operator performance report format.

FIG. 6G shows one embodiment of an example report format for an operator performance report 110. The report format shown FIG. 6G is an example only, and is indicated by number 530. Also, it will be appreciated that each of the sections in FIG. 6G can be modified either by the user, by an administrator or by other personnel, in order to show different information, as desired.

The report format 530 can illustratively include a user-branded, or manufacture-branded section 532. It may include operator and machine identifier section 534 that identifies the particular operator 101 and the particular machine 102 that the operator is operating. It can include a date range section 536 that shows the date range for the report, and a report frequency indicator 538 that indicates how frequently the report is generated. In the embodiment shown in FIG. 6G, report format 530 is only reporting information for three of the five performance pillar score categories described above. It is reporting information for the productivity performance pillar, the material quality performance pillar and the fuel consumption (or fuel economy) performance pillar. It will be appreciated, of course, that additional or fewer performance pillars can be included in the report format as well, and those shown are shown for exemplary purposes only.

FIG. 6G shows that the report format 530 includes an overview section 540. Overview section 540 illustratively includes a set of performance pillar score indicators 542, 544 and 546. The score indicators shown in FIG. 6G are shown as gauges 548, 550 and 552 with a corresponding numerical performance score indicator 554, 556 and 558. It will be appreciated that the particular displays shown in FIG. 6G are exemplary only and others could be used.

In the embodiment shown in FIG. 6G, overview section 540 also includes a set of hour indicators 560 and 562 that indicate the time of operation of components that are deemed of interest by the user. In one embodiment, for example, hour indicator 560 indicates the number of engine hours that operator 101 used, for the information in the current report. Other hour indicators can be used as well.

FIG. 6G also shows that, in one embodiment, for each pillar score shown in the overview section 540, a more detailed section is provided as well. For instance, FIG. 6G includes a productivity detail section 564, a quality detail section 566 and a fuel economy detail section 568.

Productivity detail section 564 includes detailed information about the various items sensed or computed in generating the overall productivity performance pillar score shown in the overview section 540. It thus includes information indicative of the time spent harvesting, the average speed, the percent of time that the operator was unloading on the go (such as while harvesting) and the average area per hour covered by the user. It can also provide indicators indicative of the crop condition, the relative amount of time spent chopping or dropping, and the overall environmental conditions. Further, it can include a machine settings section indicating what the machine settings were (such as for the sieves, the concaves, the pre-cleaner and chaffer, etc.) along with a sensing section indicative of various sensed parameters (such as fan speed, cylinder speed, vane adjustment and feeder house drive RPMs, etc.).

In the embodiment shown in FIG. 6G, quality detail section 566 illustratively includes more detailed information that was used in generating the quality performance pillar score. For instance, it can include detailed information regarding overall separator loss, shoe loss, grain quality, straw quality and tailings volume. It can also illustratively include images sections that show photographic images taken by the operator or otherwise. For instance, images section 570 shows images that were taken and that relate to separator and shoe loss. Images section 572 includes images that were taken and are relevant to grain quality.

In the embodiment shown in FIG. 6G, fuel economy detail section 568 includes detailed information that was used in generating the fuel economy performance pillar score shown in overview section 540. Therefore, it can include such things as overall fuel consumption while harvesting, while transporting within the field, while traveling on the road, and non-productive fuel consumption. Of course, it can include other information as well. It will be appreciated that this is only one embodiment of a report format. A wide variety of others can be used as well.

In another embodiment, the performance results can also be provided plotted over a field map generated from, for example, a satellite image of the field. For instance, a GPS sensor (or other position sensor) can sense the location of machine 102 as the other sensors are sensing things and as data is being calculated and derived. Mapping components can correlate the sensed location with the sensed and calculated data. The data can then be plotted over a geographical representation of the field for which the data was gathered and collected. The plotted results can include each metric (the five pillar scores) and the composite score. The plot can show (at the same time or selectively) other information as well. This will thus show how the operator performed at different locations in the field, for different data.

FIGS. 6H-6T show a plurality of different examples of user interface displays that can be generated by report generation component 188. As discussed above, it will be appreciated that the user interface displays can be generated and provided as a user experience to an operator in an operator's compartment of mobile machine 102. The operator can then use the information on the displays to alter the operation of the machine, or to change the settings on the machine, or to perform other tasks. In addition, the operator can see, in near real time, how he or she is performing against reference groups. The reference groups may be historical data for the operator himself or herself, other operators in the fleet, other high performing operators using a similar machine in a similar geographic region on a similar crop, or still other reference groups. Further, the user interface displays can be provided in near real time to a remote farm manager. The farm manager may be provided with access to additional information that an individual operator does not have access to, or they can both have access to the same information. Similarly, the information can be stored for later use, such as at the end of a season, where it can be analyzed to determine operational and financial performance opportunities so the operational and financial performance of the machine, operator or fleet can be improved.

Figure 6H:
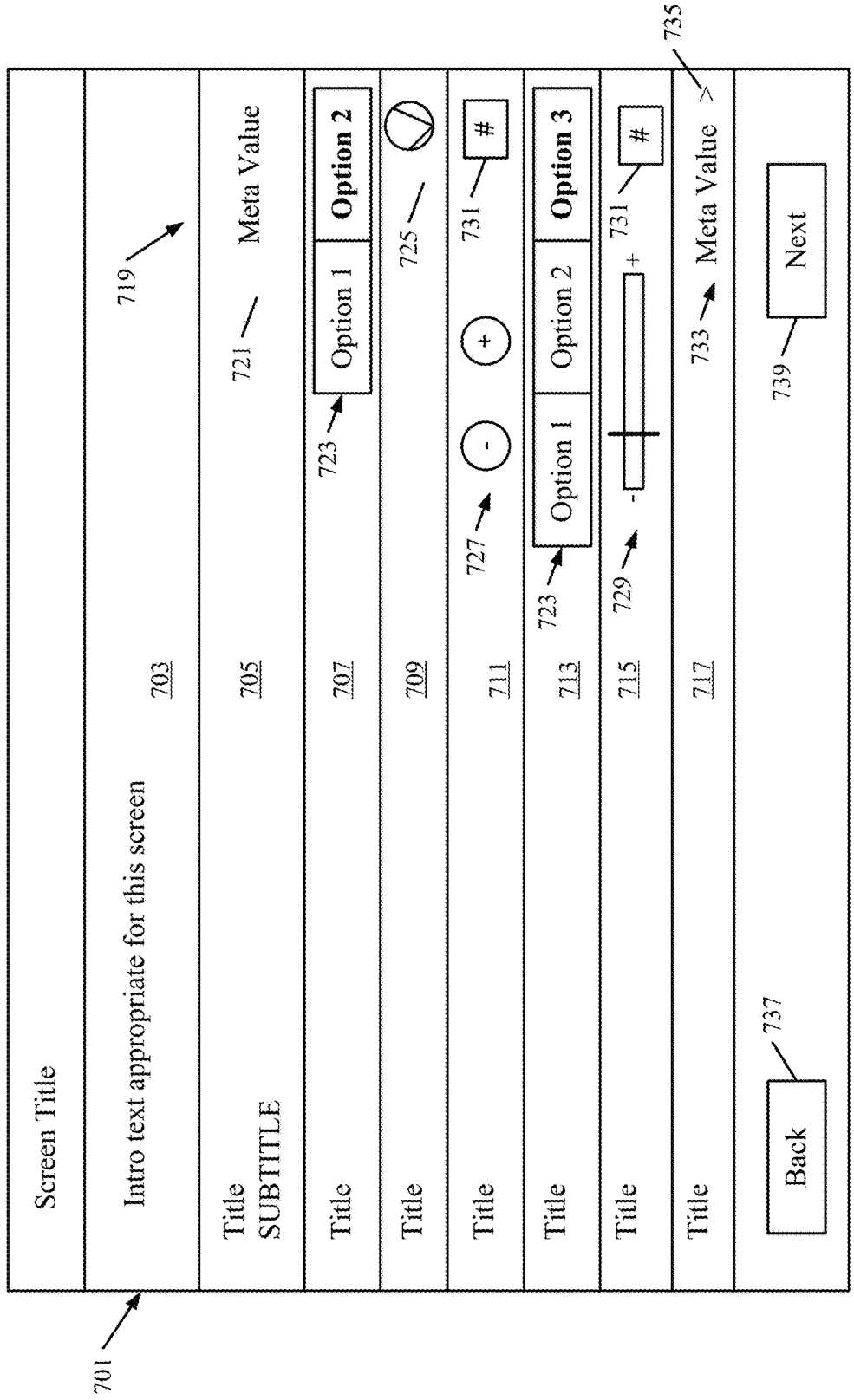

FIG. 6H shows one example of a landing screen 701. Landing screen 701 can include an introductory text portion 703 that contains introductory text. It can then include a plurality of preference setting portions (or crop setting portions) 705-717. Each portion 705-717 will illustratively have a title identifier that identifies a title and one or more sets of setting functionality (shown generally at 719). The setting functionality allows the operator to change operational or machine settings for machine 102. The types of setting functionality 719 may vary with each section 705-717, based upon the particular setting being made.

For instance, the setting functionality may be a metadata value mechanism 721 that allows the user to enter a value. The functionality may be an option selection mechanism 723 that allows the user to identify a setting or a group of settings by choosing an option. The functionality may include on/off mechanism 725 that allows the user to turn a feature on or off. The setting functionality may include push button or slider mechanisms 727 and 729, respectively. This functionality allows the user to set a value generally indicated at a value display section 731 by either actuating plus and minus actuators or by sliding a slider along a continuous scale. Similarly, where a meta-value is set, it may be set using a pop-up or drop down menu mechanism 733. When the user actuates a suitable user input mechanism, such as arrow 735, a pop-up display of various options or values can be generated to allow the user to select one.

In the example shown in FIG. 6H, the user can return to a previous screen (such as a login screen or another screen) by actuating a back actuator 737, and the user can advance to a next screen by actuating a next actuator 739. The particular screen that is displayed in response to the operator actuating either the back actuator 737 or the next actuator 739 may be controlled by report generation component 188, based upon the identity or role of the user. For instance, if the user has logged in as an operator, then component 188 may generate a set of operator user interface displays. On the other hand, if the user has logged in using a different identity (such as a manager identity), then component 188 may generate a set of manager user interface displays.

FIGS. 6I-6M show examples of user interface displays that can be generated for an operator. For instance, if the user actuates the next button 739 on user interface display 701, report generation component 188 can generate an operator runtime user interface display, such as display 741 shown in FIG. 6I. In the example shown in FIG. 6I, display 741 includes title section 699, an overall performance score display mechanism 743 along with a set of individual performance pillar score display mechanisms 745, 747, 749 and 751. In the specific example shown in FIG. 6I (and it is just one example), field identifier section 699 identifies the field that the operator is currently operating in and each of the score display mechanisms 743-751 have a display meter section 753 and a digital display readout section 755. Meter section 753 displays the corresponding metric (such as the overall performance score for mechanism 743, the grain productivity score for mechanism 745, the fuel economy score for mechanism 747, etc.) in meter fashion. That is, as the score increases, the shaded area of the meter section 753 increases vertically. As the score decreases, the shaded area decreases vertically. A numerical readout is also shown in the digital readout section 755. It will be noted, of course, that this is just one type of display mechanism. The display mechanism could include a dial meter, another type of gauge or other display mechanisms as well.

Display 741 shows that each mechanism also includes a comparison. It displays an indicator that marks the individual operator's score, along the meter section 753, on one side of the meter section 753, and it displays an indicator that marks the reference group score on the opposite side. For example, in FIG. 6I, the individual operator score is marked by display element 757 (which in the illustrated example is a hash mark on one side of meter section 753, but could also be another indicator) and the reference group score is marked by display element 759 (which, again, is shown as a hash mark but it could be another indicator). Thus, for the overall performance score and each of the individual performance pillar scores, the operator can easily see not only his or her own score, in real time, but the operator can see how his or her own score compares to the selected reference group. It will be noted that, in one example, different reference groups can be selected for each different performance pillar. Therefore, in one example, the user can choose as a reference group for the overall performance score, the other operators in his or her fleet. However, the user can choose as a reference group for the grain productivity metric the top performing operators in the same geographical region. Similarly, the reference group can be chosen as historical information for the user himself or herself. These are examples only.

In one example, the user can quickly change the displayed reference group by selecting one of the reference group selectors 769 and 771. When the user actuates the reference group selector 769, the reference group indicator 759 for each of the performance display metrics is the average for the current operator. For instance, when the user actuates user input mechanism 769, the fuel economy display mechanism 747 will display the user's current score (represented by display element 757) as compared to the user's average fuel economy score (as indicated by display element 759). Likewise, when the user actuates mechanism 771, then report generation component 188 switches the reference group so that it displays the operator's score against the average fleet scores for other operators in the fleet. It will be noted, however, that the fleet scores can be for only the top performing operators, or for other groups within the fleet. These are examples only.

Figure 6I:
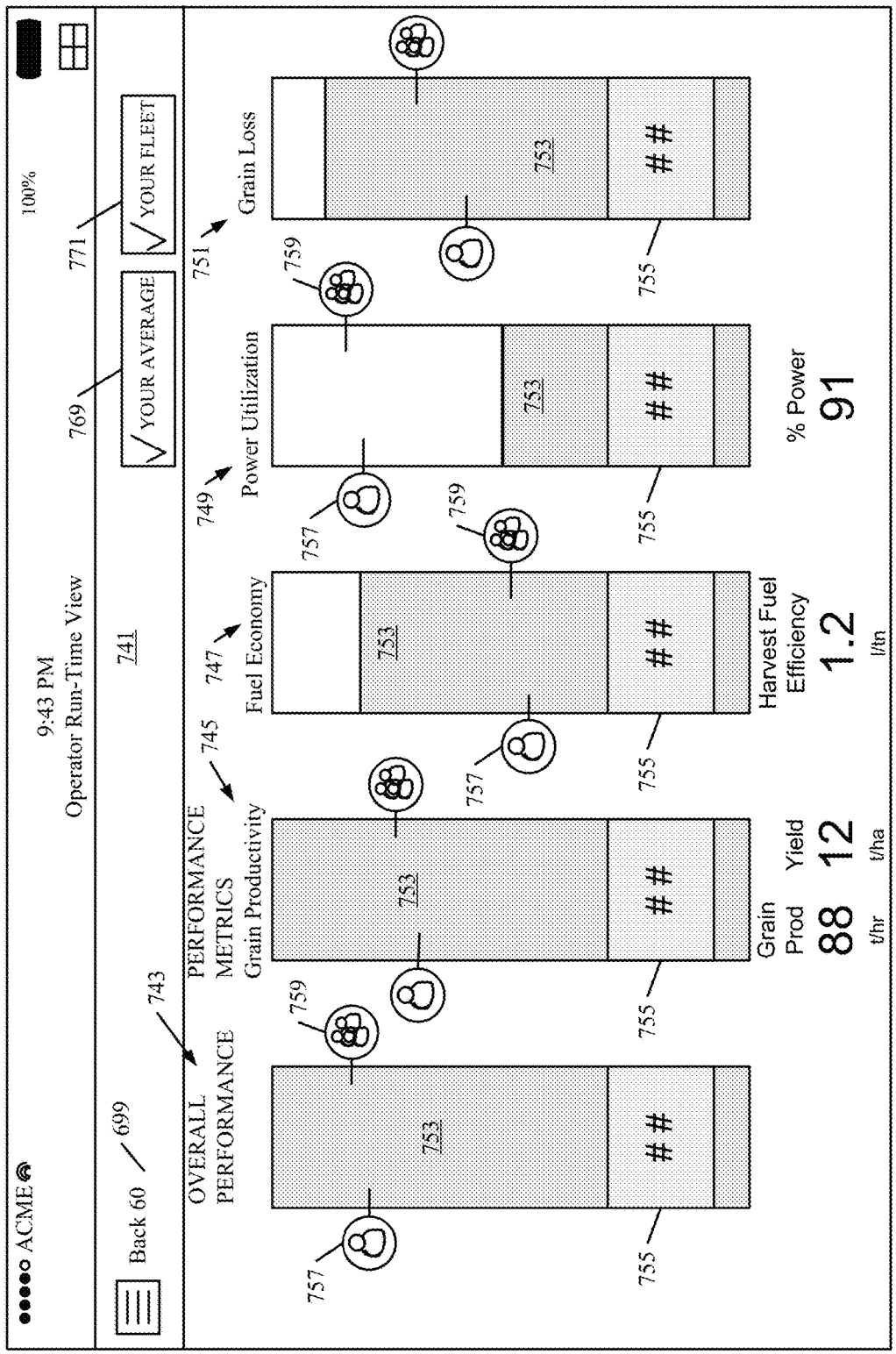

FIG. 6I also shows that, where a performance pillar score is based on a plurality of different measured metrics, the values for those metrics (that are used to make up the overall performance pillar score) can be displayed as well. For instance, it can be seen in FIG. 6I that the grain productivity display mechanism 745 indicates that the overall grain productivity pillar score is based on sensed grain productivity and yield. The sensed grain productivity (e.g., in tons per hour) is displayed at 761, and the sensed yield value (e.g., in tons per hectare) is displayed at 763. The operator can thus quickly see which primary metrics are contributing to his or her performance pillar score (in this case the grain productivity score).

FIG. 6I also shows that, in one example, report generation component 188 can show additional information as well. For instance, the meter section 753 and digital read out section 755 can show the instantaneous value for a given metric, but the display mechanism can show an average over a recent time period as well. For instance, fuel economy display mechanism 747 can display, in the display meter section 753 and the digital read out section 755, an instantaneous fuel economy score in liters per ton of harvested product. However, it can also include an average or aggregate score display section 765 that displays the average (over some predetermined period of time) for the fuel economy score, or an aggregated, overall fuel economy score for the entire season, or for this field, or for some other characteristic for this operator. The same is shown with respect to the power utilization display mechanism 749. It can be see that the meter section 753 and the digital read out section 755 can display an instantaneous value for power utilization. However, display section 767 can display an average power utilization over a predetermined period of time, for this field, for this season, etc.

Figure 6J:
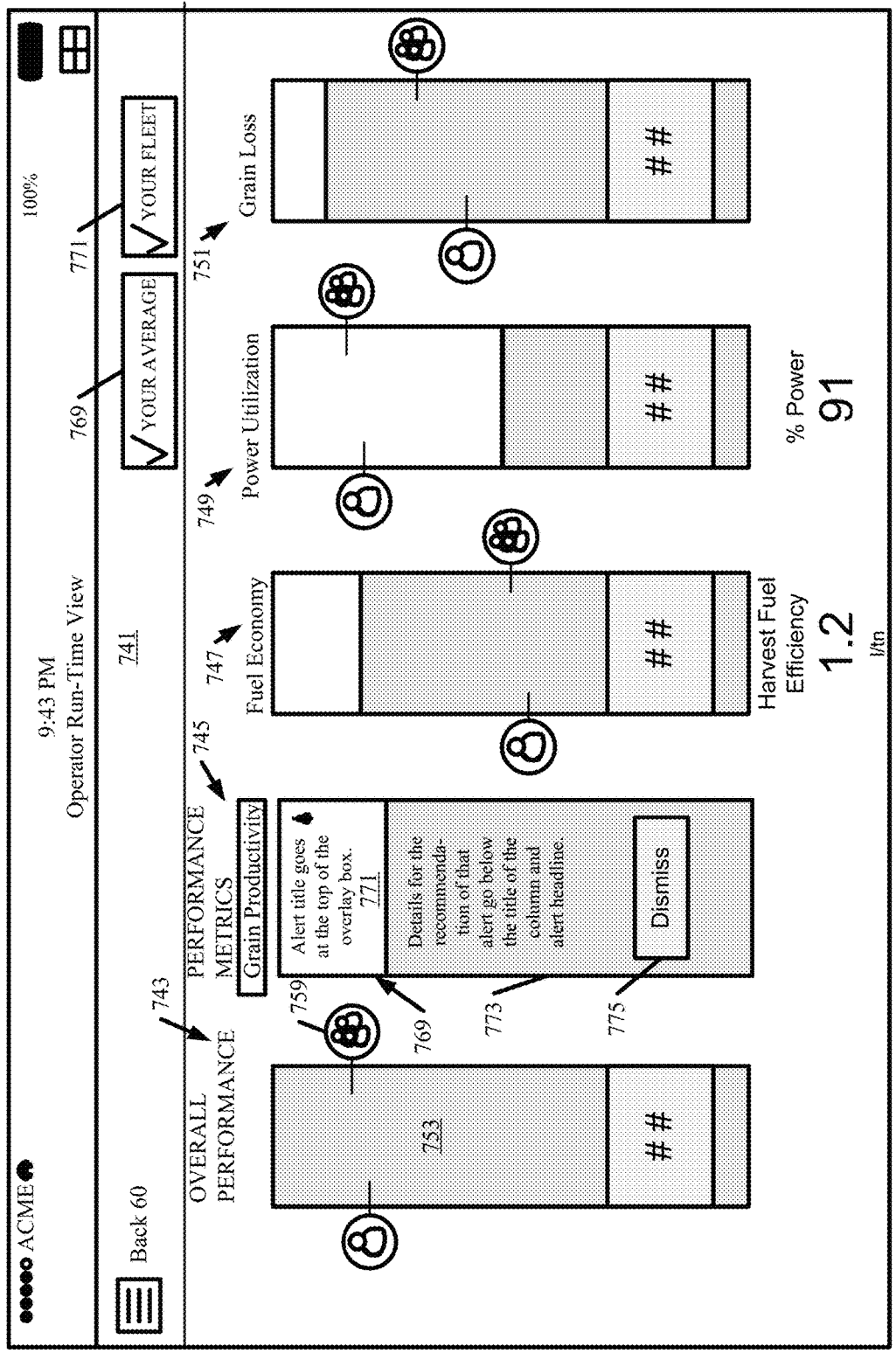

FIG. 6J shows another example of a user interface display 741. A number of the items in FIG. 6J are similar to those shown in FIG. 6I, and they are similarly numbered. However, it can be seen in FIG. 6J that the machine 102 has generated an alert. For instance, it may be that where a given performance pillar score deviates outside of an acceptable range, report generation component 188 generates an alert indicating that, and recommendation engine 184 generates a recommendation indicating how to bring the given score back within the acceptable range. In the example shown in FIG. 6J, the grain productivity display mechanism 745 has generated an alert. The alert display element 769 includes an alert title section 771 that displays a title and descriptive information about the alert. Recommendation section 773 displays details regarding a recommendation of operational changes that the operator can make to the machine or the machine settings, etc., in order to bring the score back to within the acceptable range. The user interface display element 745 also includes a dismiss mechanism 775 that can be actuated by the user to dismiss the alert. In one example, however, report generation component 188 logs the alert so that it can be reviewed later, either by the operator, by the farm manager, or by others.

Figure 6K:
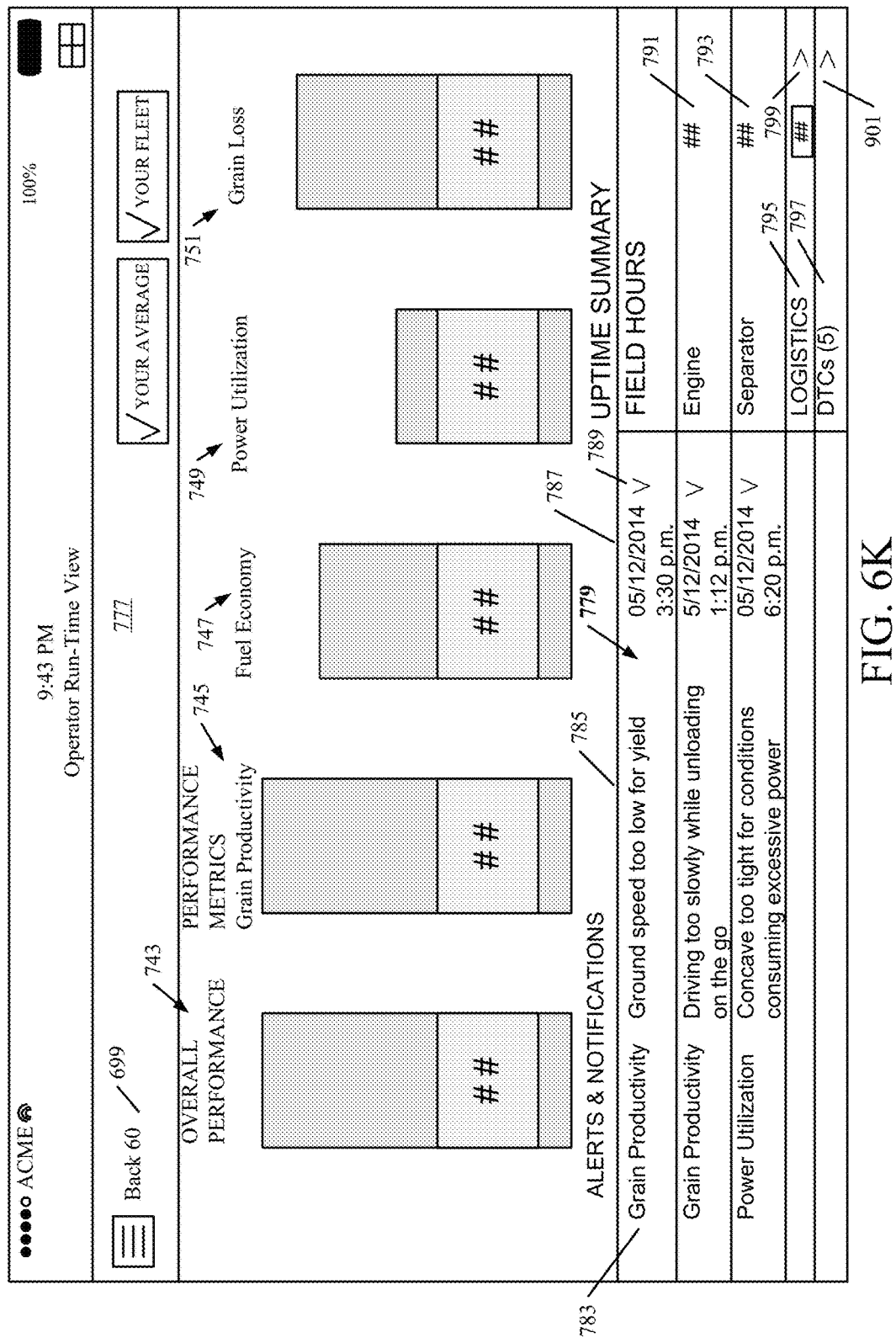

FIG. 6K shows another example of a field report user interface display 777 that can be generated for an operator. Display 777 illustratively displays information about the operator's performance in a given field. Again, the field is identified by field identifier 699. Also, the overall performance score as well the performance pillar scores (shown in FIGS. 6I and 6J) are also displayed in FIG. 6K. The field report display 777 can be displayed either after the operator is finished with the field, or during operation within the field. In the example shown in FIG. 6K, the operator has finished harvesting the field, and therefore the information on field report display 777 shows the results for the entire field. Again, it includes the overall performance score display mechanism 743 and the performance pillar display mechanisms 745-751. Each of these display elements illustratively show the operator's scores for the identified field.

Display 777 also illustratively includes an alerts and notifications display section 779, as well as an uptime summary display section 781. Section 779 allows the user to view (and scroll through) a list of alerts and notifications that were generated during harvesting of the field. Section 779 includes a pillar identifier 783 that identifies the particular performance pillar to which the alert or notification was associated. It also includes a description section 785 that describes the alert or notification, and it includes a date identifier 787 that indicates when the alert or notification was generated. A drill down mechanism 789 can be actuated by the user in order to drill down to see additional details about the alert or notification. When the user does this, report generation component 188 retrieves the details of the previously recorded alert or notification and displays those to the user.

Uptime summary display section 781 displays information regarding the supporting pillars. It includes time sections that display the engine time 791 and the separator time 793 that were utilized in harvesting the field. It also includes a logistics section 795 and a diagnostic trouble code (DTC) section 797. Logistics section 795 includes a drill mechanism 799 that allows the user to view additional details about logistics information. DTC section 797 also includes a drill indicator 901 that allows the user to view additional information regarding the diagnostic trouble codes that were generated during harvesting of the field.

Figure 6L:
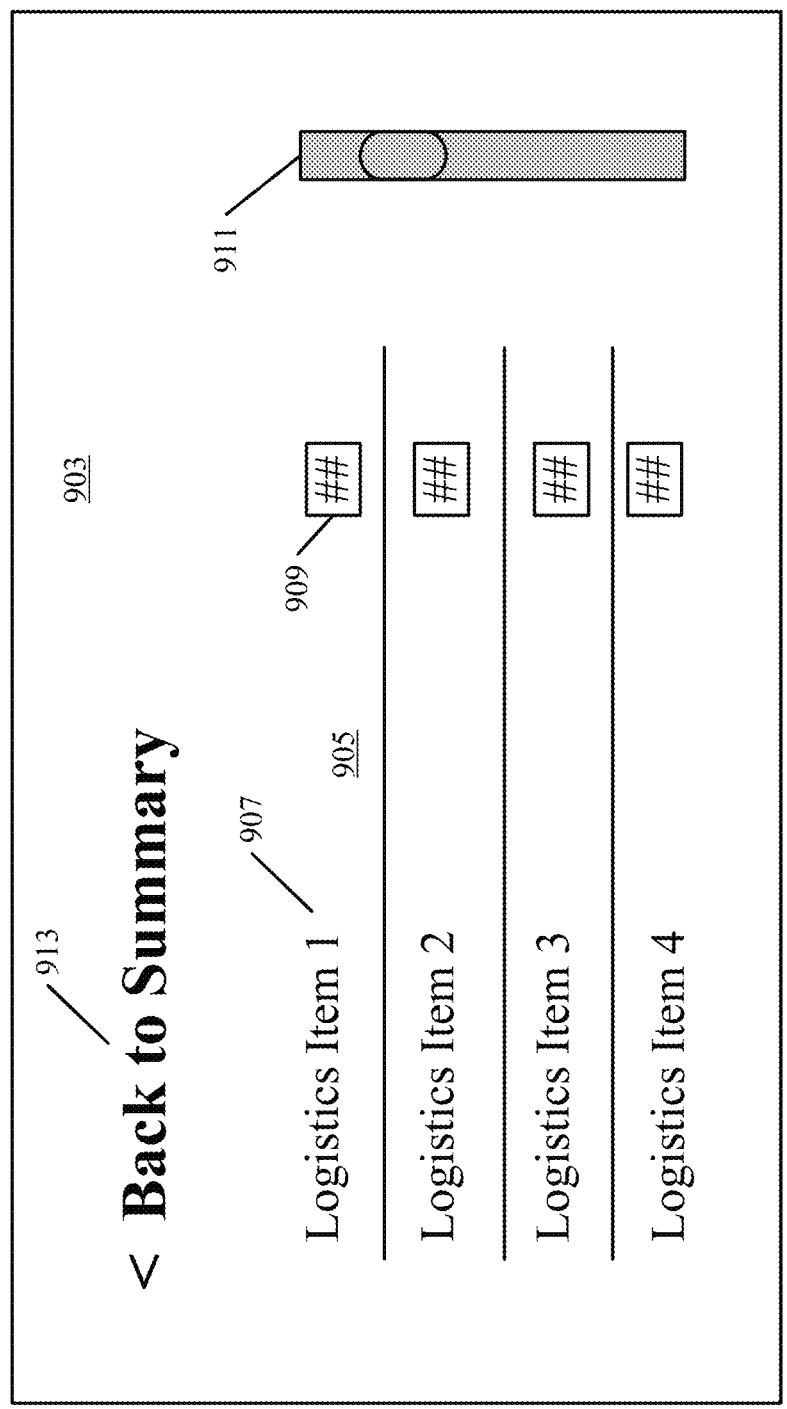

FIG. 6L shows one example of a user interface display 903 that can be generated when the user drills into the logistics information by actuating mechanism 799. In that case, report generation component 188 accesses stored logistics information and displays it in display 903. The logistics information can be divided out into separate sections for each logistics item, each of which includes a numeric or other value. For instance, section 905 identifies a first logistics item using a title 907 and identifies a particular value 909 corresponding to that logistics item. The same can be true for a plurality of logistics items shown in FIG. 6L, and the list can be scrolled, such as using a scroll bar 911. The user can return to the summary page shown in FIG. 6K by actuating the navigation element 913.

Figure 6M:
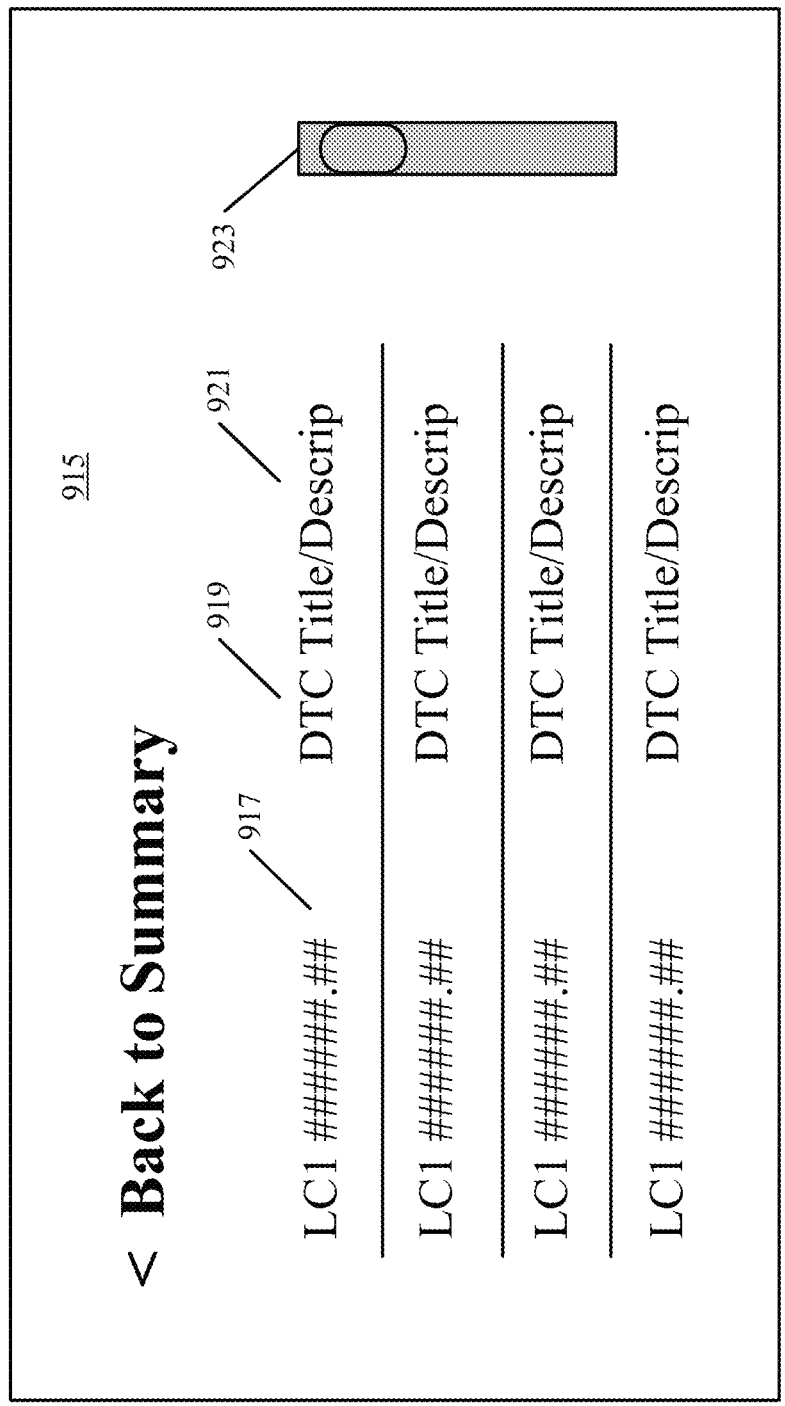

FIG. 6M is one example of a user interface display 915 that can be generated when the user actuates drill mechanism 901 in FIG. 6K. User interface display 915 includes a diagnostic trouble code numerical identifier 917 for each DTC that was generated while the user was harvesting the field. It can also include a DTC title 919 and description 921, that serve to further identify the particular diagnostic trouble code. Again, the list of diagnostic trouble codes can be scrolled using any suitable user input mechanism, such as scroll bar 923.

Figure 6N:
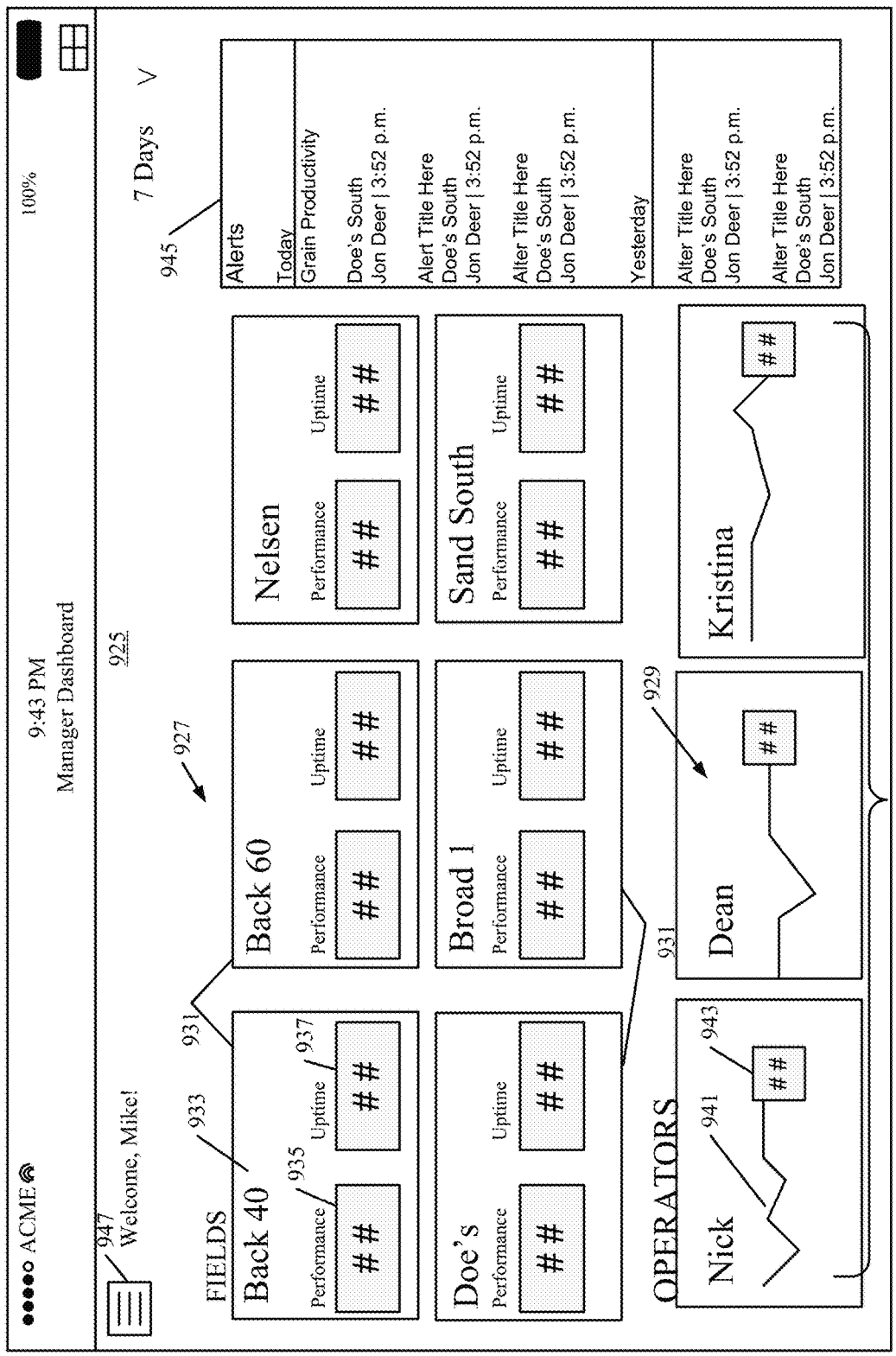
Figure 60:
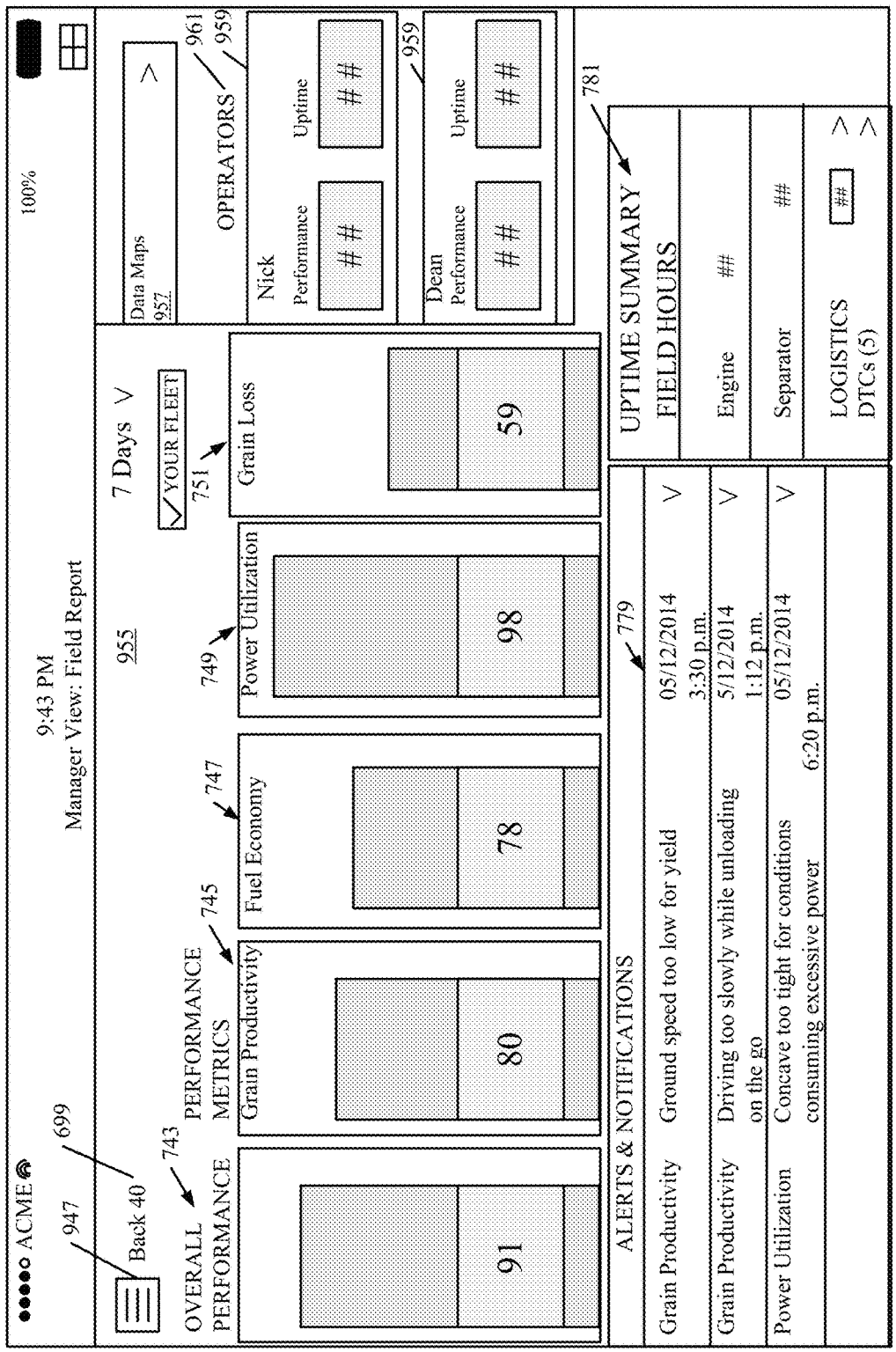

Returning to the user interface display shown in FIG. 6H, it is now assumed that the user has logged in as a manager. If the user actuates the next mechanism 739, the user can be navigated by report generation component 188 to a set of manager user interface displays. FIG. 6N shows one example of a manager dashboard display 925. Dashboard display 925 includes a fields section 927 and an operators section 919. The fields section 927 includes a set of navigable links 931 each corresponding to a separate field that is being managed by the manager. Each of the links 931 illustratively includes a field identifier 933, an overall performance score indicator 935 and a supporting pillar (e.g., uptime) score indicator 937. Thus, the manager can quickly see whether the performance scores or uptime scores for any given field are out of the ordinary. When the manager actuates one of the actuatable elements 931, the manager is navigated by report generation component 188 to a more detailed display for that particular field.

Operator display section 929 includes a set of navigable links 939 each of which correspond to a different operator. Each navigable link illustratively includes a time-based chart section 941 and a numerical indicator section 943. The time-based chart section 941 shows one or more performance pillar scores for the identified operator, over a recent period of time. The numerical indicator section 943 shows a current value for that performance pillar score, for the identified operator. In one example, the manager can select which performance pillar scores to show for each operator and for each field. In another example, the manager can select multiple different performance pillar scores to show for each operator and for each field on dashboard 925. When the manager actuates one of the links 939, the manager is navigated to a more detailed display of information corresponding to the identified operator.

FIG. 6N also shows that, in one example, the dashboard display 925 includes an alerts section 945. The alerts section 945 lists alerts that were generated on a current day, as well as those in the recent past. Each alert may illustratively have a title that indicates the particular performance pillar that it affects, as well as a field identifier, an operator identifier, and a time indicator indicating the time when the alert was generated. Again, each of the alerts in the list may be a navigable link so that when it is actuated by the manager, the manager is navigated to more detailed information corresponding to the underlying alert.

FIG. 6O shows a manager field report user interface display 955. Display 955 can be generated, for example, when the manager has actuated the field display element 931 corresponding to the "Back 40" field. When the manager does this, report generation component 188 illustratively generates a more detailed display showing information corresponding to that field, and as is indicated by display 955. It can be seen that some of the items in FIG. 6O are similar to those shown in FIG. 6K (which is shown to the operator as opposed to the manager) and they are similarly numbered. However, display 955 also illustratively includes a maps actuator 957 and a set of operator actuators 959. Each of the operator actuators 959 identify a particular operator and give one or more performance pillar scores (or the overall score) for that operator, as well as an uptime score for that operator. Elements 959 are actuatable elements so that when the manager actuates one of them, the manager is navigated to more detailed information corresponding to that operator's performance in the identified field. Also, the entire operator display field 961 is also associated with an actuatable link. When the manager actuates that link, the manager will be navigated to a more detailed display showing more detailed information for all of the operators that operated in the identified field.

Display 955 also, in one example, includes a slide-in actuator 947. Slide-in actuator 947 can be actuated by the manager in order to slide in a side panel from the side (in this example, the left side) of the user interface display. This can be done in order to provide the manager with more options to navigate through various items.

Figure 6P:
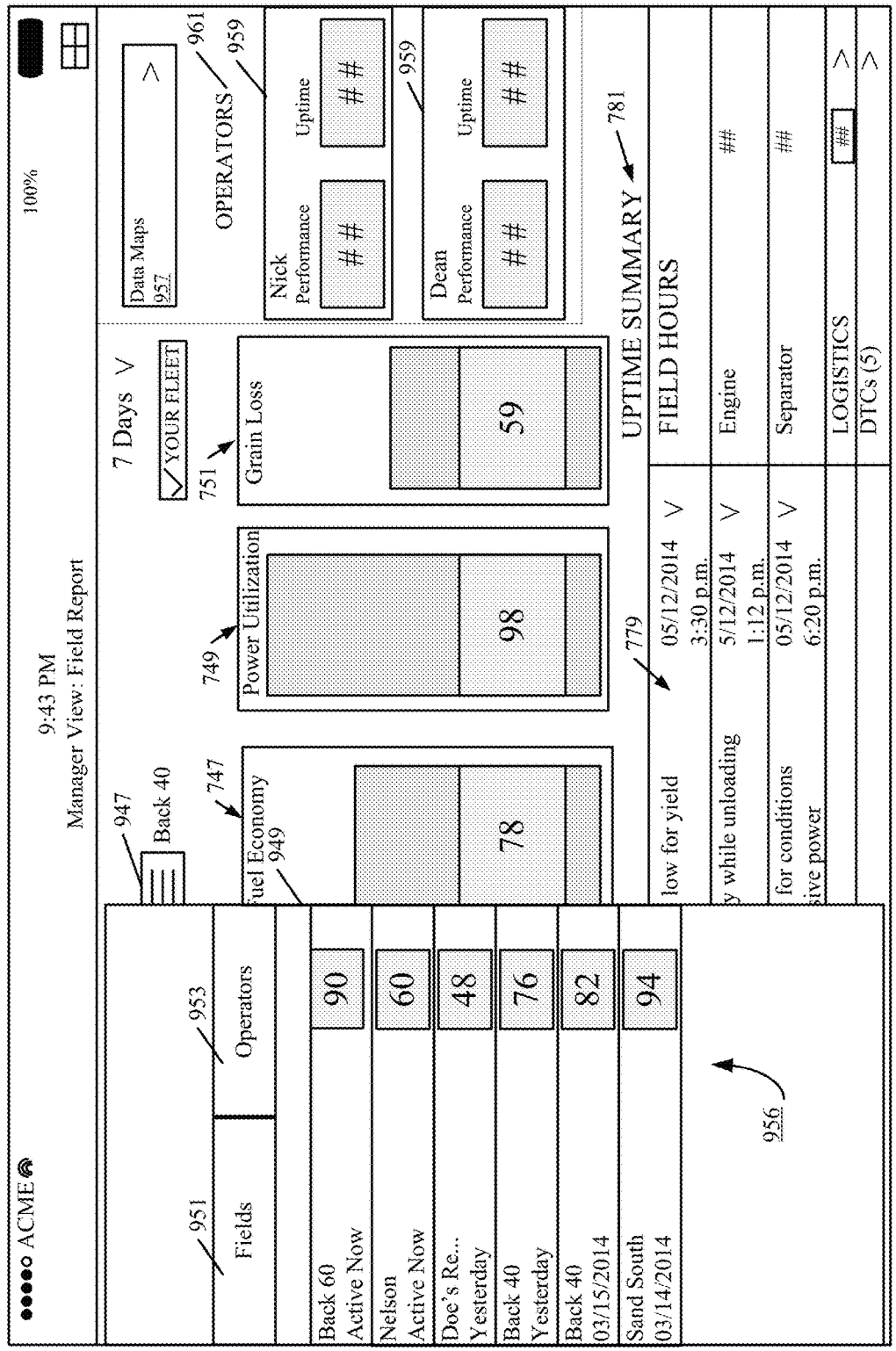

FIG. 6P shows one example where the manager has actuated mechanism 947. It can be seen in FIG. 6P that a panel 949 has now slid onto the manager's field report display (shown in FIG. 6O). Panel 949 illustratively includes a fields actuator 951 and an operators actuator 953. It can be seen that the manager has actuated the field actuator 951. Thus, report generation component 188 generates a list of other fields shown generally at 956. Each item in the list illustratively includes an identifying section that identifies the field, an indicator as to whether the field is active currently or was active on some previous date, and an overall performance score for all operators that worked in that field. By actuating one of the list items in list 956, report generation component 188 navigates the manager to more detailed information corresponding to that field.

If, on the other hand, the manager actuates operator's button 953, then a list of operators is displayed. The list of operators will include an identifying portion identifying the operator, whether the operator is currently working, and an overall score associated with that operator. Again, if the manager actuates an operator list item, the manager is navigated to a more detailed display showing more detailed information for the corresponding operator.

Figure 6Q:
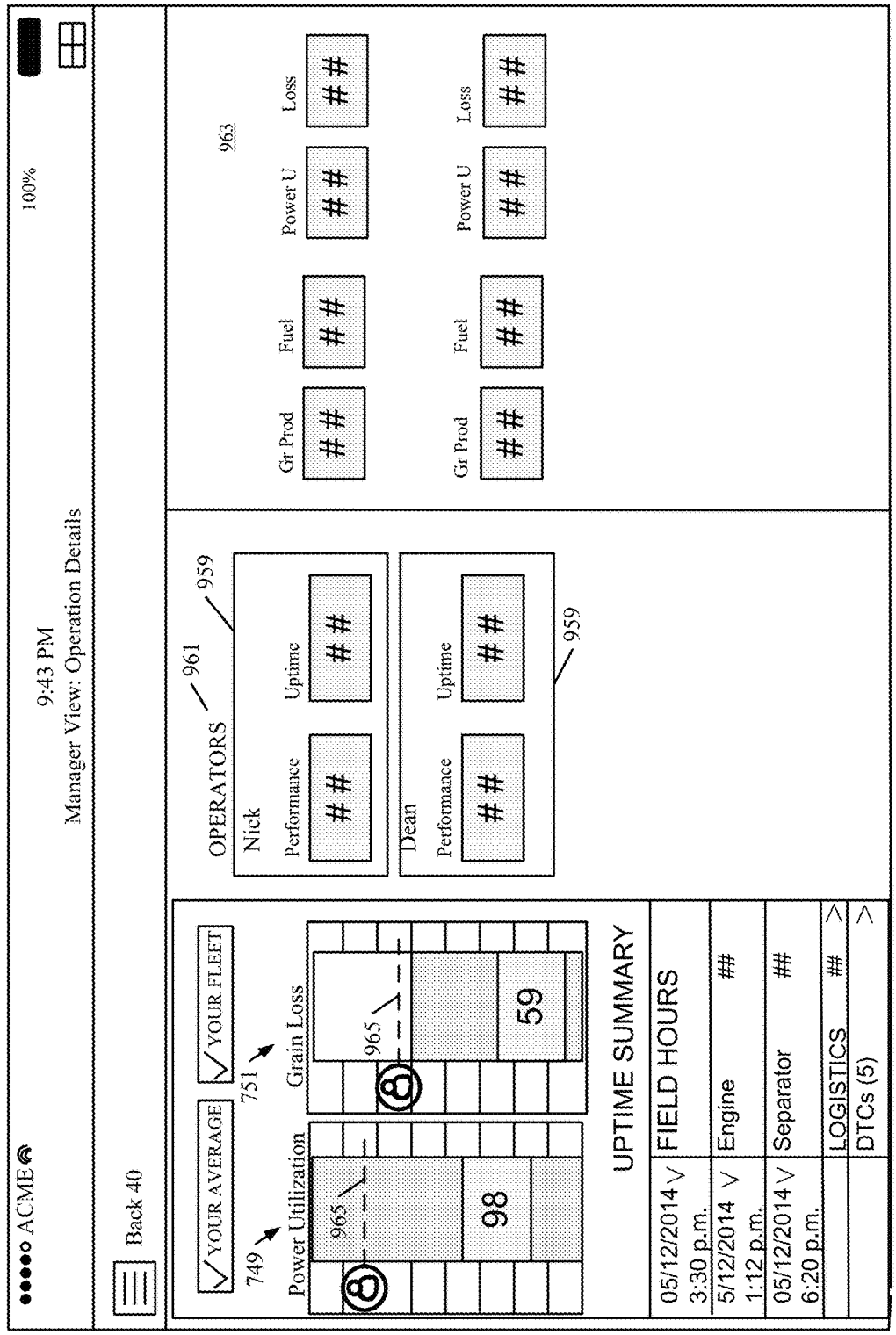

By way of example, FIG. 6Q shows that, in one example, the manager has actuated the link corresponding to the operator display field 961. This causes report generation component 188 to retrieve more detailed information corresponding to each of the operators for the identified field and to display a more detailed display panel 963 showing the various performance pillar scores for each of the operators. Also, where the manager selects one of the operators by actuating one of elements 959, report generation component 188 retrieves the information corresponding to that operator and displays it (such as with displays elements 965) on the performance pillar score display mechanisms 743-751. Therefore, the manager can easily see how the selected operator performed in comparison to the average performance for that field. For instance, display mechanism 751 includes display element 965. This shows that the operator "Nick" performed slightly above the average for the field in terms of the grain loss performance pillar. For the power utilization performance pillar, display element 965 shows that he performed slightly lower than average. Again, each of the display elements on the display shown in FIG. 6Q is illustratively a navigable link. Therefore, when the manager actuates one of them, the manager can drill into the more detailed information that was used to generate that particular display element.

Figure 6R:
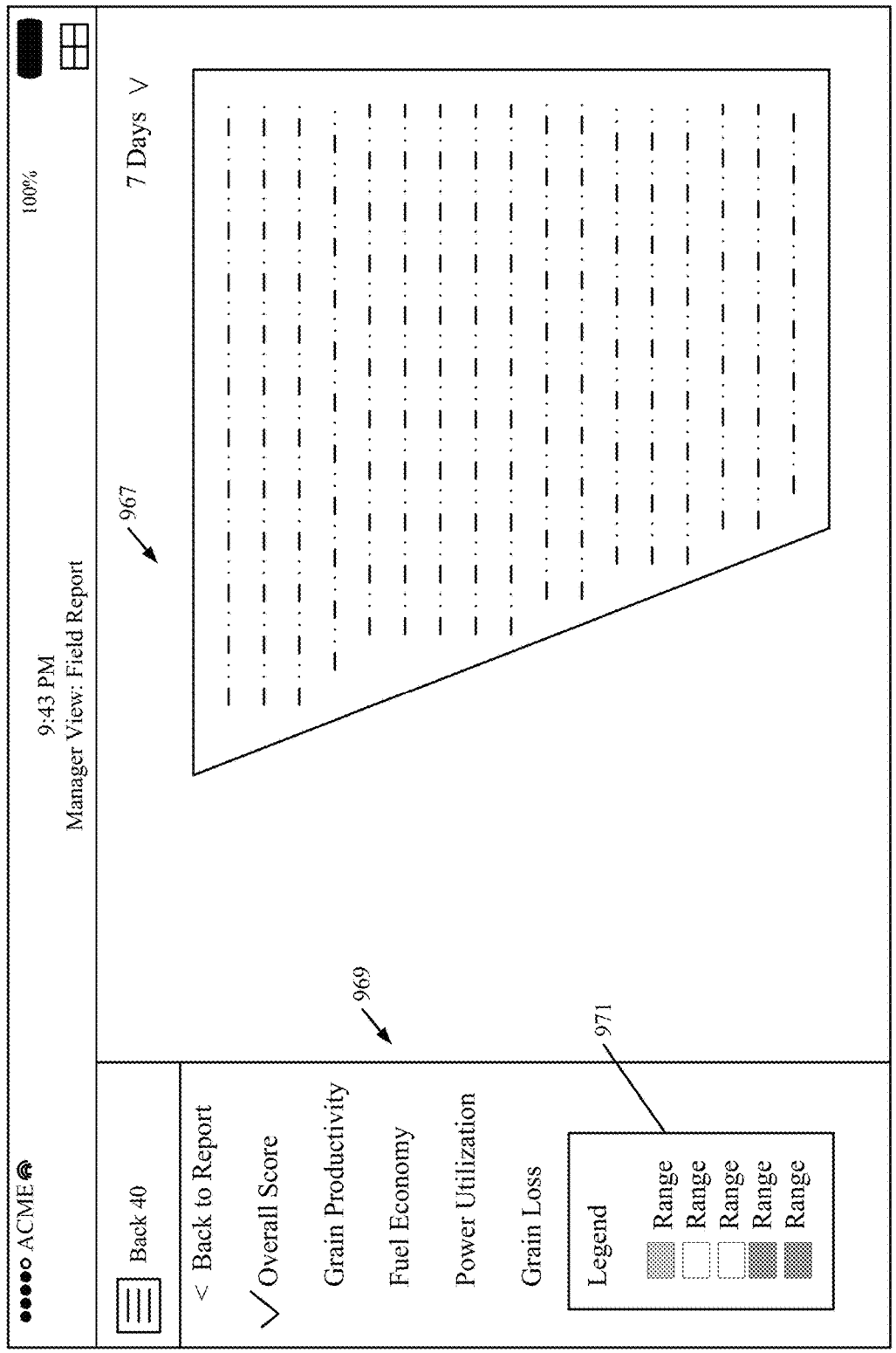

Returning again to the display shown in FIG. 6O, the manager can actuate the data maps mechanism 957. When the manager does that, report generation component 188 illustratively generates a more detailed map view of the field. FIG. 6R shows one example of this. It can be seen in FIG. 6R that a geographical image of the field "Back 40" is generated and displayed generally at 967. Report generation component 188 correlates a given performance pillar metric to the geographic locations in the field displayed at 967 and displays indicia that indicate the value of the performance pillar metric, at that specific location. In the example shown in FIG. 6R, the display includes a performance pillar metric selector section 969. This allows the manager to select one of the performance pillar metrics to overlay on the geographic representation of the map shown at 967. It can be seen that the manager has selected the selected metric (in this case, the overall score). A legend 971 can be color-coded or otherwise visually indicate different ranges of the overall score. Therefore, when those colors appear on the geographic representation of the field at 967, the manager can see approximately what the overall score was at each geographic location in the field. As the color deviates over the geographical representation 967, the manager can easily see how the selected performance metric varied over the field. Thus, in the example shown in FIG. 6R, as the color varies over the geographic representation, the manager can easily see how the overall performance score varied over the field. If the manager were to select the grain productivity performance pillar, for example, then report generation component 188 would correlate the grain productivity scores to the geographic locations in the field (as sensed by a GPS or other position sensor) and display indicia on the geographic representation of the field 967, indicating how the grain productivity score varied across the field.

Figure 6S:
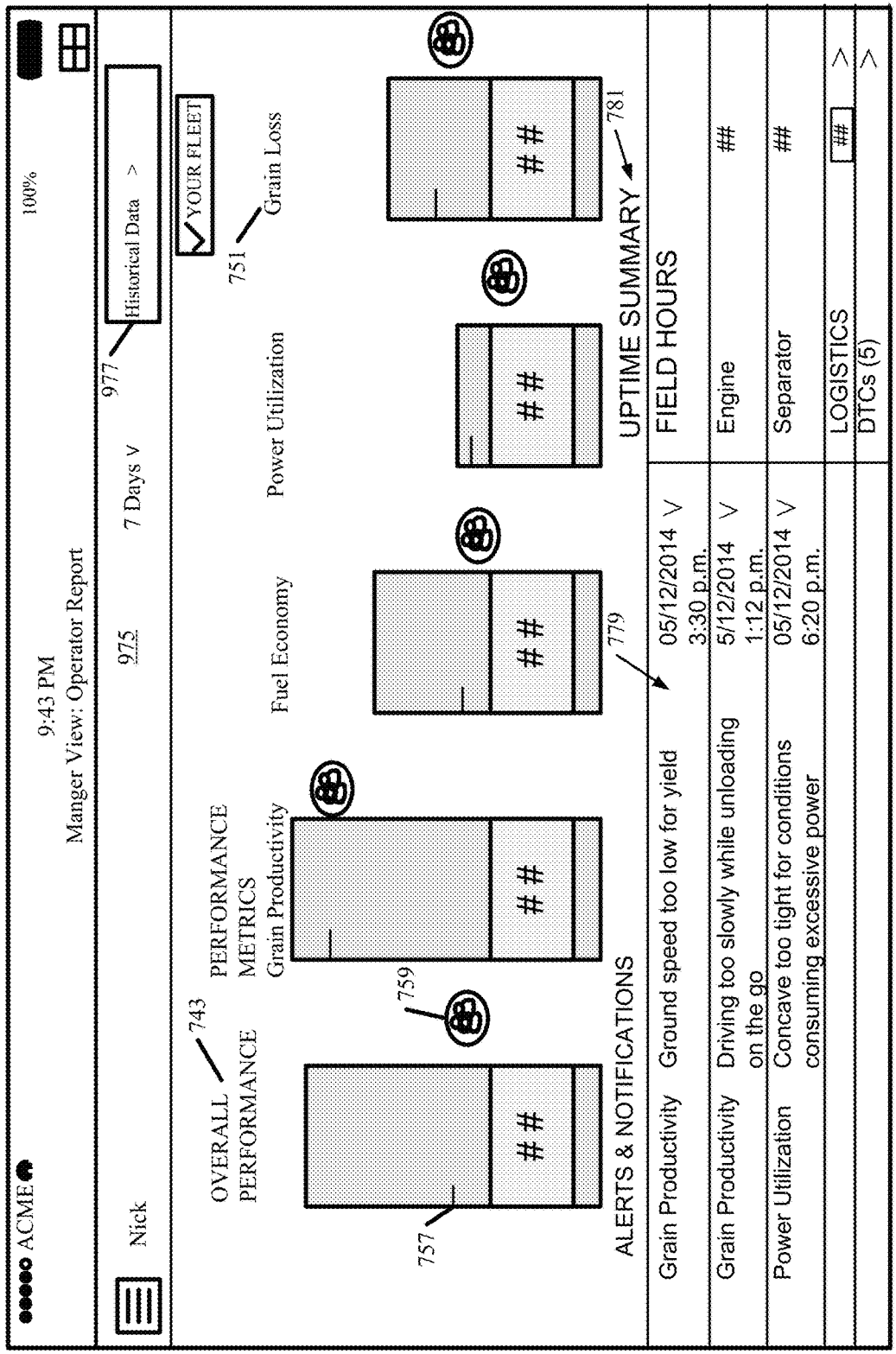

Referring again to the display shown in FIG. 6P, if the manager actuates the operators button 953 and then selects an operator from the displayed list, report generation component 188 generates a display showing more detailed information corresponding to the selected operator. The same is true if the manager actuates one of the operator display elements 959. FIG. 6S shows one example of a user interface display 975 that can be generated when the manager does this. FIG. 6S shows some of the items that are similar to those shown to the manager in FIG. 6O and those items are similarly numbered. However, instead of being aggregated data for a given field (as is the case with the information shown in FIG. 6O) the information shown in FIG. 6S is information for a specific operator (Nick). Thus, each of the display mechanisms 743-751 shows the performance of the selected operator (Nick) indicated by display elements 757 compared to the reference group indicated by display elements 759. In the illustrated example, the reference group is the other operators in the fleet. The alerts and notifications section 779 are those alerts and notifications that were generated for the selected operator (Nick). The uptime summary information is that information corresponding to the selected operator (Nick) as well.

Figure 6T:
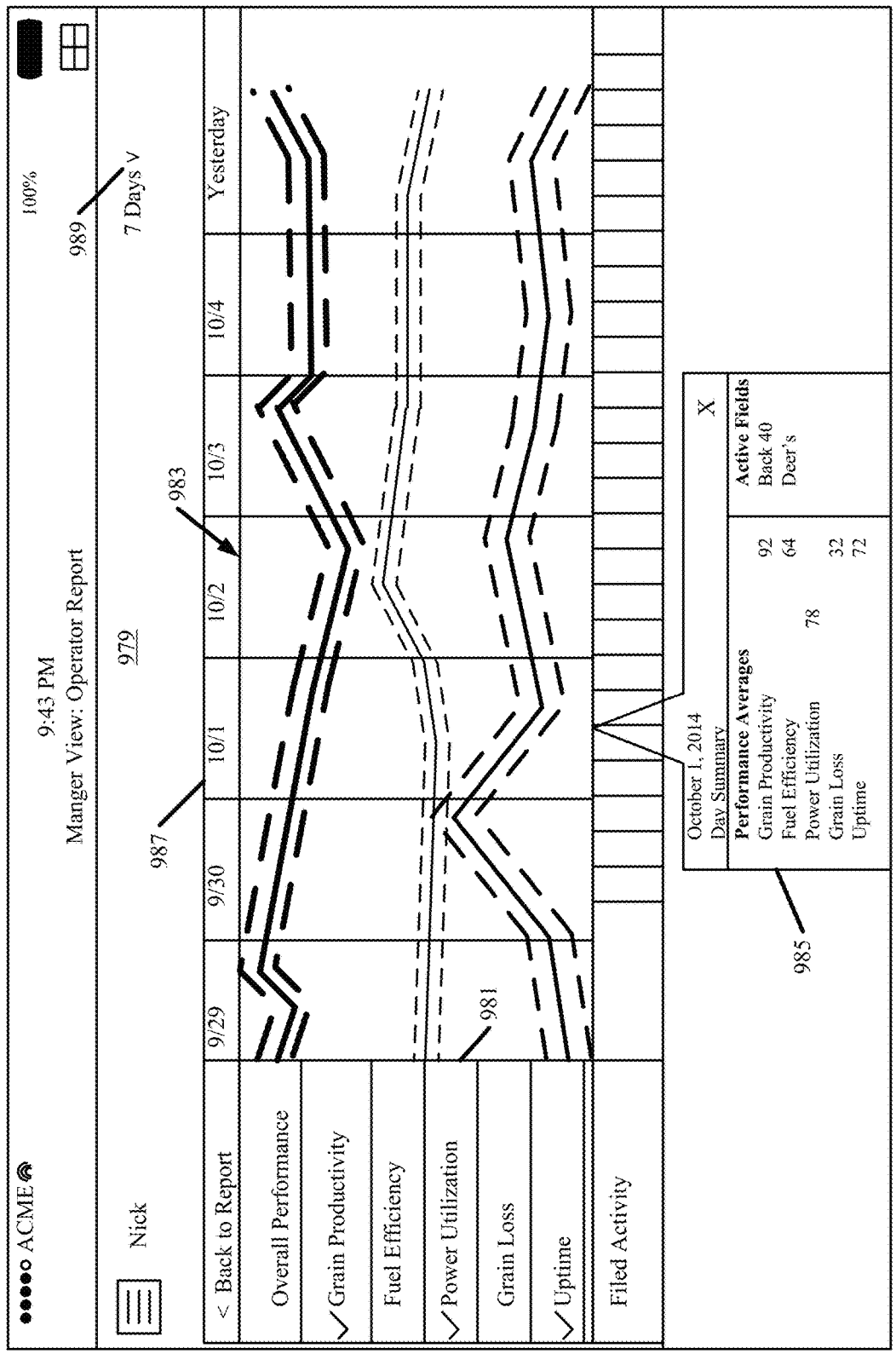

Display 975 also includes a historical data actuator 977. When the manager actuates actuator 977, report generation component 188 illustratively generates a display of historical data for the selected operator (Nick). FIG. 6T shows one example of such a user interface display.

FIG. 6T shows user interface display 979. Display 979 illustratively includes a metric selector panel 981 that allows the manager to select one or more performance metrics that are then graphed on a historical display graph 983. It can be seen in the example shown in FIG. 6T that the manager has selected the grain productivity, power utilization, and uptime performance metrics for display on display portion 983. Those items are separately displayed as indicated by visually distinguishable lines. Each line has an associated window displayed thereabout (illustrated by the dashed area around each line) that indicates an accepted window for the corresponding metric. This allows the manager to quickly see whether the particular metric deviated outside of the acceptable window.

In the example shown in FIG. 6T, report generation component 188 also shows a summary pane 985. Summary pane 985 displays summary information for a selected time period. The summary information in the example shown in FIG. 6T is shown for a selected day. For example, the manager can actuate the day identifier 987 for October $1^{st}$. When that happens, the report generation component 188 generates the summary display in pane 985 that summarizes the performance metric scores and the active fields information for the operator Nick on October $1^{st}$. When the manager actuates a plurality of different day identifiers 987 (such as by using click and drag actuation, touch and drag, etc.), the report generation component 188 will summarize the information for the multiple different days that have been selected. If the manager touches a different day, the report generation component 188 generates the same type of summary display, except that it is generated for the other day that has been selected by the manager.

In one example, when the manager actuates the period selector 989, a drop down menu or other mechanism is displayed that allows the manager to change the period of time for which the historical information is displayed. Where a drop down menu is displayed, the manager can illustratively select one week, two weeks, one month, or a variety of other time periods. Where a different type of period mechanism is displayed, the manager can select a different period of time in other ways as well. When this occurs, report generation component 188 displays the time chart section 983 with information for the newly selected period of time.

The user interface displays, with the user input mechanisms, operate to surface relevant information for the various users of the information in real time or near real time. This greatly enhances the operation of the machine. By having access to the information, the various users can adjust machine operation, training or other parameters to achieve significant performance enhancements. In addition, by surfacing relevant information more quickly, it improves performance of the computing system. It reduces the need for a user to query or otherwise navigate through the system to find the relevant information. This reduces processing overhead and memory usage, thus improving performance.

Figure 7:
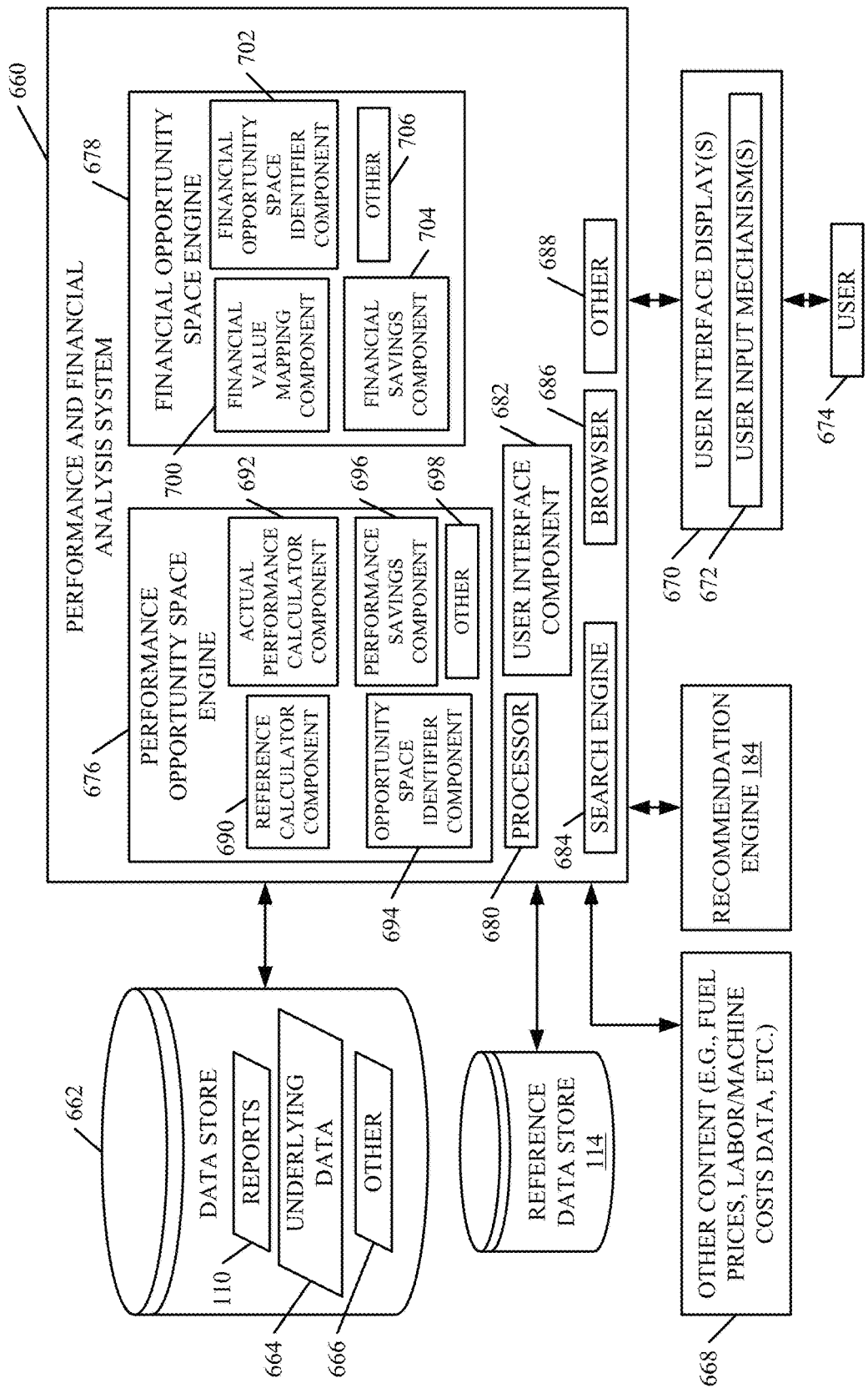
FIG. 7 is a block diagram of one example of a performance and financial analysis system.

FIG. 7 shows that, in one example, the information used by performance report generation architecture 100 can also be provided to a performance and financial analysis system for further analysis. FIG. 7 is a block diagram showing one example of a performance and financial analysis system 660. System 660 can have access to data in data store 662. Data store 662 can, for instance, store operator performance reports 110, any of the underlying data used by architecture 100 (e.g., the data sensed or otherwise gathered by architecture 100, the reference data, or any of a wide variety of other information used in architecture 100). This data is indicated by 664. It can include other data 666 as well. Also, in the example shown in FIG. 7, system 660 can have access to reference data store 114 and recommendation engine 184. Further, it will be noted that system 660 can access other content 668, which can include, as examples, fuel price information indicative of fuel prices, labor and machine cost data, mapping components that can map sensed or calculated data to a given location in a field, and a wide variety of other information.

FIG. 7 shows that, in one example, system 660 generates user interface displays 670 with user input mechanisms 672 for interaction by user 674. User 674 can interact with user input mechanisms 672 to control and manipulate system 660. In one example, user 674 is a person who is analyzing the performance data of various operators, machines, or a fleet as a whole, or even a group of fleets. Thus, user 674 may be a farm manager, a financial analyst, or a wide variety of other individuals who may be interested in such information. User 674 illustratively uses system 660 to identify a performance opportunity space where improvements in performance are available. User 674 also illustratively uses system 660 to identify a financial opportunity space, corresponding to the performance opportunity space, where financial improvements can be made.

System 660, in one example, includes performance opportunity space engine 676 and financial opportunity space engine 678. It can also include processor 680, user interface component 682, search engine 684, browser 686, and other items 688.

Performance opportunity space engine 676 can include reference calculator component 690, actual performance calculator component 692, opportunity space identifier component 694, performance savings component 696 and it can include other items 698. Financial opportunity space engine 678 can include financial value mapping component 700, financial opportunity space identifier component 702, financial savings component 704, and it can include other items 706 as well.

Before describing the operation of system 660 in more detail, a brief overview will first be provided. Performance opportunity space engine 676, in one example, uses reference calculator component 690 to calculate a variety of different reference performance values across a plurality of different performance categories. For instance, it can calculate a theoretical performance optimum, across the categories, for each machine in the fleet being analyzed. This can be based on the machine configuration, the automation level of the machine, and any or all of the other information used by architecture 100 or still other information (such as information obtained from content 668 using search engine 684 or browser 686). Component 692 can also calculate actual performance data corresponding to the actual performance of the various operators, across the plurality of different categories. Opportunity space identifier component 694 then compares the actual performance data against the reference performance data (e.g., against the operator's own historical data, against other operators, such as leading operators in the fleet, against high performing operators in the same crop, geographic region, conditions, etc. as operator 101 but across multiple fleets) to obtain an opportunity space for improving performance. Performance savings component 696 generates performance savings values that quantify the performance opportunity so that user 674 can better understand it. Financial opportunity space engine 676 uses financial value mapping component 700 to map financial values onto the performance savings values identified by component 696. Based on this mapping, financial opportunity space identifier component 702 identifies the financial opportunity space indicating areas where financial improvements can be obtained, based upon improvements in performance. Financial savings component 704 calculates monetary values that quantify the financial opportunities available. System 660 can also invoke recommendation engine 184 to generate actionable recommendations to user 674 so that user 674 can make performance improvements, and thus financial improvements.

It can thus be seen that the opportunities are calculated using relative data instead of absolute data. Relative data considers the conditions, geography, crop type, etc. while absolute measures would not.

In one example, the same metrics are not used to identify multiple different opportunity spaces. This would have the affect of double counting the opportunity corresponding to the metric, causing the opportunity space to appear artificially high. For instance, if a power utilization opportunity is identified, that opportunity overlaps, at least to some extent, with grain productivity. By way of example, assume that power utilization is at 80 percent meaning that there is a 20 percent power utilization opportunity. If power utilization were increased, this would cause the harvest to be completed more quickly. However, this would also increase grain productivity, because the harvest will be completed more quickly. The system thus does not cumulatively identify both the power utilization and the grain productivity opportunities because this would have the affect of double counting the financial or performance savings achieved by increasing power utilization. The system thus, in one example, avoids this type of double counting.

Figure 7A:
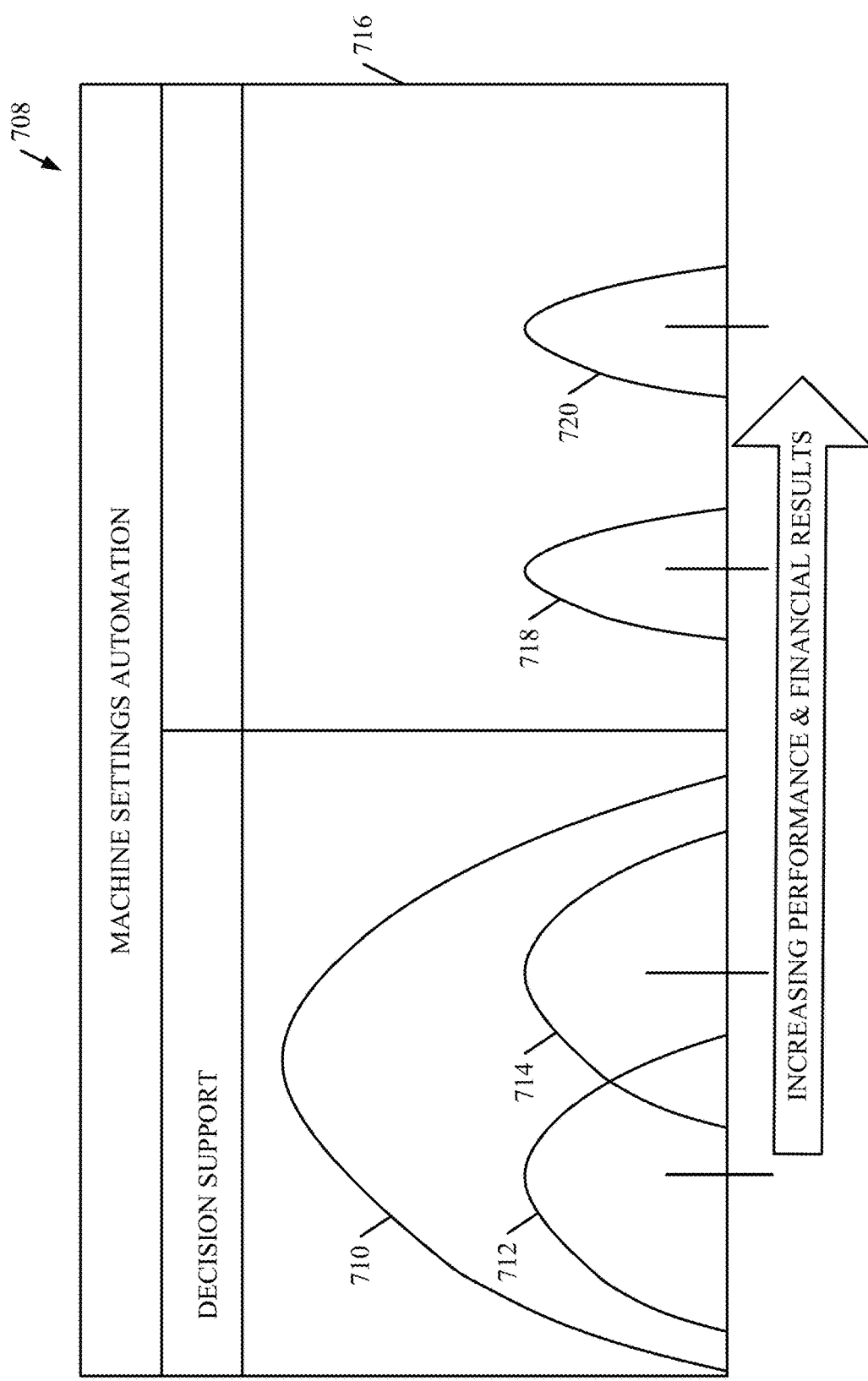
FIG. 7A shows one example of a graphical illustration of a performance and financial opportunity space continuum.

FIG. 7A graphically illustrates a number of the items mentioned above. FIG. 7A includes a chart 708 that plots both actual and theoretical performance distributions along a performance and financial opportunity space continuum indicated by the x-axis of chart 708. Chart 708 graphically illustrates a sustainable performance envelope 710 that characterizes a sustainable performance for the population of operators within the context of their crop and geography and other contextual information. For example, in certain geographies, using certain machines, with certain operators and under certain circumstances (such as weather circumstances, terrain, etc.) it may only be possible to sustain performance within a given range. This is indicated by envelope 710.

Distribution 712 shows the performance distribution of all operators in a given fleet, across selected performance categories, where the performance of those operators lagged behind a leading operator in the specific categories. Distribution 714 shows the distribution of the leading operator (in terms of each performance category) in the fleet. The extreme upper end 716 of the continuum represents a theoretical optimum performance, in the context of the fleet. For example, the theoretical optimum performance represented by upper end 716 can be calculated based on the assumption that all machines are upgraded to the maximum technology packages, that they are run at power limit, and that the harvested crop quality remains on target. In the example shown in FIG. 7A, chart 708 also shows two other theoretical performance optima 718 and 720. Theoretical optimum 718 is calculated assuming that the machines have a first level of automation, and optimum 720 is calculated assuming the machines have a second, higher level of automation. The items shown in FIG. 7A are only examples, and other performance information can be used as well. For instance, a distribution can be identified to represent the performance of highest performing operators in the same crop and geography. Other examples can be used as well.

Figure 8:
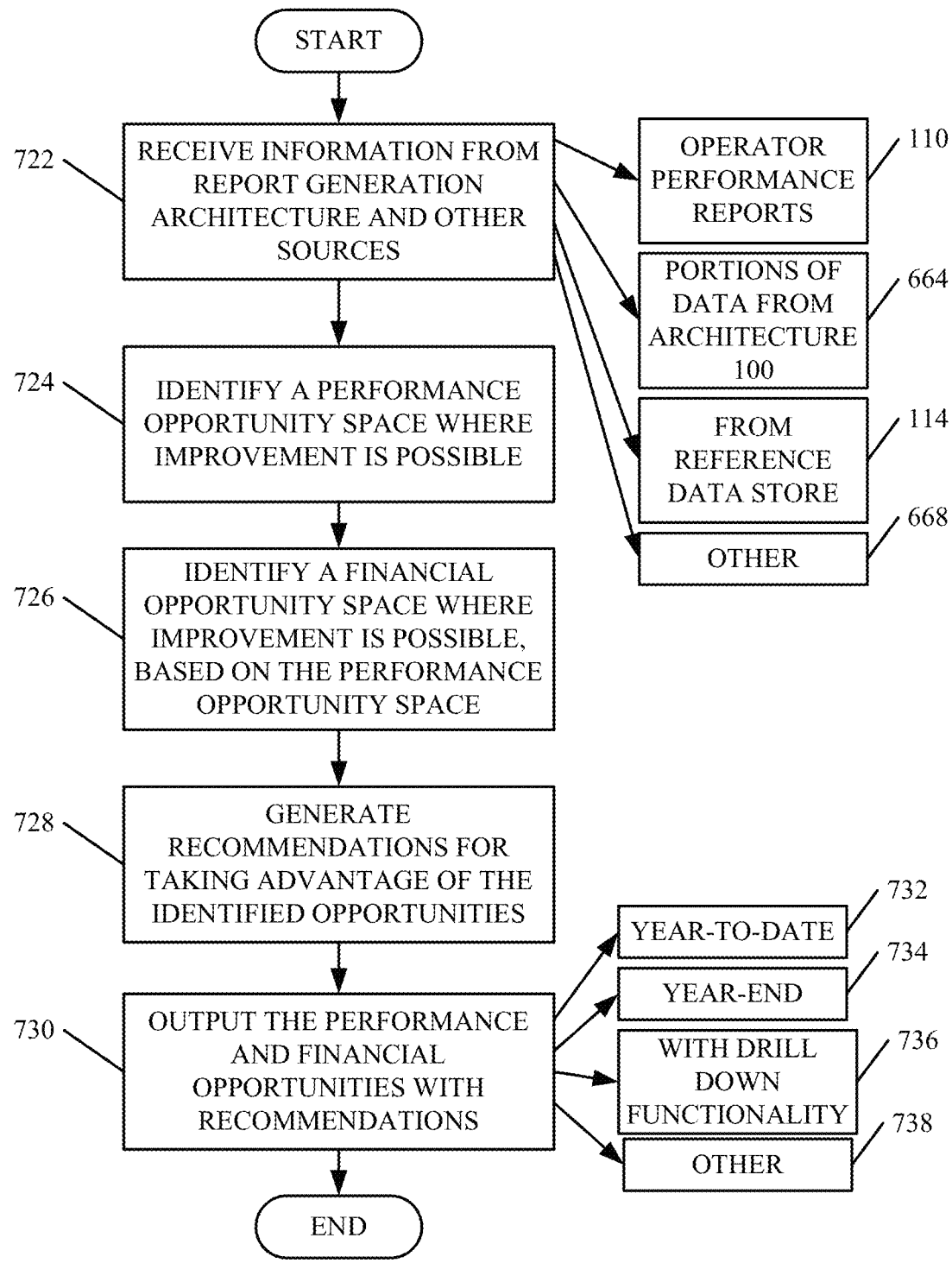
FIG. 8 is a flow diagram illustrating one example of the operation of the system shown in FIG. 7.

FIG. 8 is a flow diagram illustrating one example of the operation of system 660 in more detail. FIG. 8 will be described with reference to FIGS. 7 and 7A. System 660 first receives information from the report generation architecture 100 and it can receive information from other sources as well. This is indicated by block 722 in FIG. 8. As briefly mentioned above, this can include operator performance reports 110, portions of other data from architecture 100 (and indicated by 664), the data from reference data store 114, and other content 668.

Performance opportunity space engine 676 then identifies a performance opportunity space where improvement in performance is possible. This is indicated by block 724 in FIG. 8 and it is described in greater detail below with respect to FIGS. 9 and 10. Briefly, however, performance opportunity space engine 676 can identify that a performance improvement is available if all the lagging operators represented by the lagging distribution 712 (shown in FIG. 7A) were able to improve their performance to match the leading operators indicated by distribution 714. This is just one opportunity space where improvement is available. Similarly, the sustainable performance envelope 710 can be moved upwardly to match distribution 718 if the machine has an upgraded technology package. This is yet another performance opportunity where improvement is possible. The same is true if the technology is upgraded to match that indicated by distribution 720. In addition, performance can theoretically be improved to the theoretical optimum performance 716. Another opportunity may be identified by comparing the leading performer in a fleet against other highest performers in the same crop and geographic region, across different fleets. In any case, performance opportunity space engine 676 identifies areas where performance improvement is possible.

Financial opportunity space engine 678 then identifies a financial opportunity space where improvement is possible, based on the performance opportunity space. This is indicated by block 726 in FIG. 8. This is described in greater detail below with respect FIGS. 9 and 11. Briefly, however, engine 678 assigns financial values to the improvements in performance that are identified in the performance opportunity space. It thus provides a financial savings output that identifies potential financial savings that can be obtained by improving performance.

System 660 can also illustratively invoke recommendation engine 184 to generate recommendations for taking advantage of the identified performance and financial opportunities. This is indicated by block 728 in FIG. 8.

System 660 then outputs the performance and financial opportunities along with the recommendations. This is indicated by block 730. This can also take a wide variety of different forms. For instance, these items can be output during an agricultural season and reflect the year-to-date opportunities and potential savings. This is indicated by block 732. It can be done at the end of an agricultural season and indicate year end values 734. It can be provided with drill down functionality 736 so the user 674 can review more detailed information corresponding to, for example, individual operators, individual machines, certain times of the year, etc. It can also be provided in other ways 738.

Figure 9:
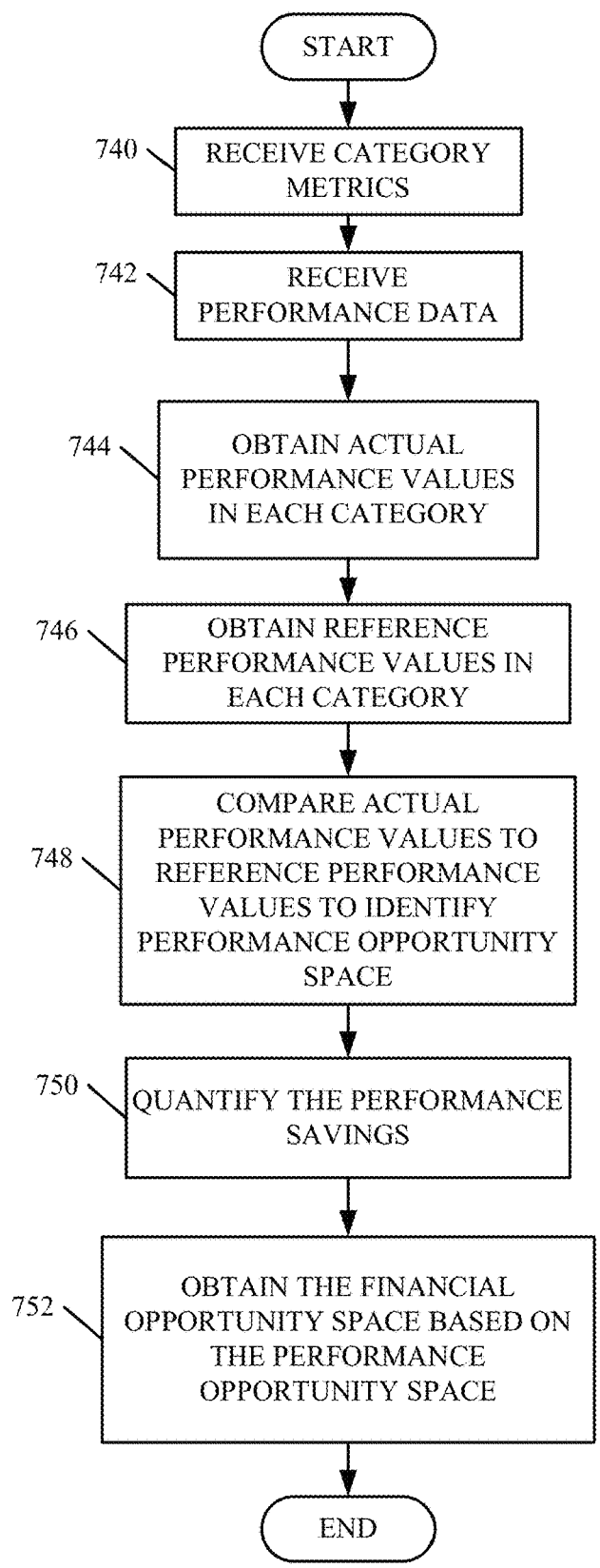
FIG. 9 is a flow diagram illustrating one example of the operation of the performance and financial analysis system in FIG. 7, in more detail.

FIG. 9 is a flow diagram illustrating one example of the operation of system 660 in identifying performance and financial opportunity spaces, in more detail. In the example shown in FIG. 9, performance opportunity space engine 676 first receives a set of category metrics identifying categories for which performance and financial opportunity spaces are to be identified. This is indicated by block 740 in FIG. 9.

These category metrics can be received in a variety of different ways. For instance, they can be predefined category identifiers that identify a set of predefined categories. They can also be user configurable categories so that the user can define his or her own categories. Of course, they can be provided in other ways as well. Once the categories are identified, system 660 provides values indicative of the performance and financial opportunity space according to those categories. By way of example, a first set of categories for defining performance and financial opportunities may be in terms of removing grain from the field more quickly. Another set of categories may be to increase the quality of the job. Another set of categories may be to minimize unproductive fuel consumption and another set of categories may be to minimize unproductive time usage. Each of these categories may be defined by metrics, and one example of this is described in greater detail below with respect to FIG. 10A.

Returning again to FIG. 9, once the categories are identified, performance opportunity space engine 676 receives the performance data for the fleet under analysis. This is indicated by block 742. Actual performance calculator component 692 then obtains actual performance values that quantify actual performance in each of the categories. It can do this by simply accessing them, if those values have already been calculated, or it can calculate them if they are derived values that are yet to be derived from the data received by component 692. Obtaining the actual performance values in each category is indicated by block 744 in FIG. 9. They identify how the various operators and machines in the fleet under analysis actually performed in terms of the specified categories.

Reference calculator component 690 then obtains reference performance values in each category. Again, it can simply access those metrics where they have already been calculated, or it can calculate them if they are yet to be derived. Obtaining the reference performance metrics in each category is indicated by block 746. This information represents various references against which the actual performance data can be compared to identify opportunity spaces. In the example discussed above with respect to FIG. 7A, the reference performance values can correspond to the performance values represented by the leading operator distribution 714, or the theoretical optima represented by distributions 718 and 720 or upper end 716. The reference values can correspond to leading performers across multiple fleets, in the same crop and geographic region, or other reference values.

Opportunity space identifier component 694 then compares the actual performance values to the reference performance values to identify the performance opportunity space. This is indicated by block 748. For example, component 694 can compare the lagging performance data for the lagging operators in each category (represented by distribution 712 in FIG. 7A) against the leading performance data for the leading operators in each category (and represented by distribution 714). The difference between those two can quantify a performance opportunity where performance can be improved if the lagging operators increase their performance to correspond to that of the leading operators. This is but one opportunity space. Component 694 can also compare the actual performance data for the fleet under analysis to the theoretical optima represented by distributions 718 and 720 and upper end 716 as well. Component 694 can compare fleet-specific data to data from other fleets or across a plurality of different fleets in the same crop or crops and in the same geographic region. Component 694 can compare the actual performance data to other references, in order to identify other performance opportunity spaces as well.

Once the performance opportunity spaces are identified, performance savings component 696 can calculate or access information to identify the savings (in terms of performance) that can be obtained by taking advantage of each of the identified opportunities. For instance, it can identify the number of gallons or liters of fuel that can be saved, the time in hours that can be saved, or other units of savings that can be obtained by taking advantage of the performance opportunities identified. Quantifying the performance savings is indicated by block 750 in FIG. 9. The quantifications can be made in English imperial units, metric units or other units.

Financial opportunity space engine 678 then uses financial value mapping component 700 to assign financial values to the various performance savings values generated at block 750. Component 702 identifies the financial opportunity space based upon the assigned values and financial savings component 704 calculates savings (in any desired currency) that can be obtained by taking advantage of the financial opportunities (which, themselves, can be obtained by taking advantage of the performance opportunities). Determining the financial opportunity space based on the performance opportunity space is indicated by block 752 in FIG. 9.

Figure 10:
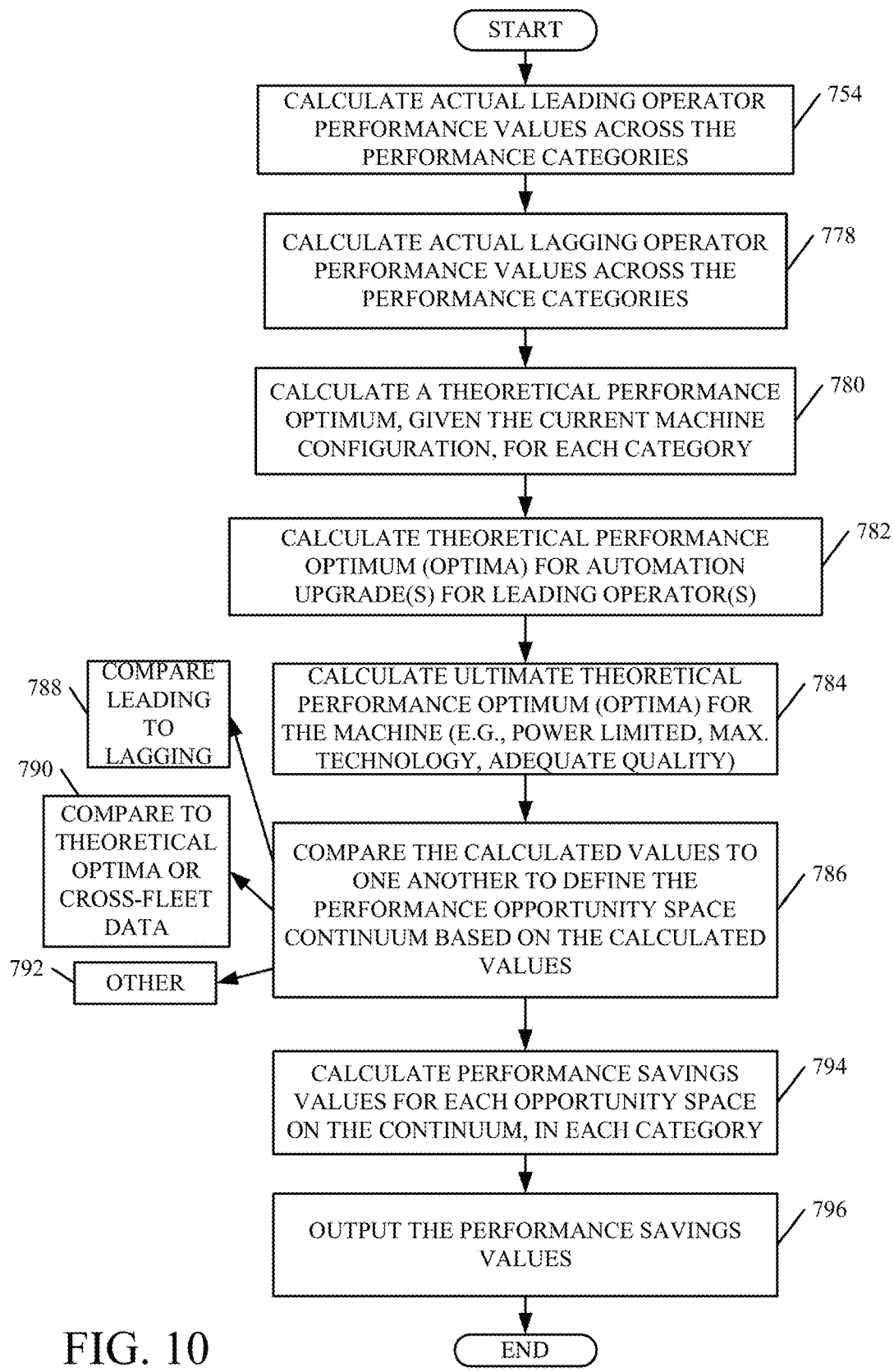
FIG. 10 is a flow diagram illustrating one example of the operation of the system shown in FIG. 7 in identifying a performance opportunity space.

FIG. 10 is a flow diagram illustrating one example of the operation of performance opportunity space engine 676 in more detail. FIG. 10A shows one example of a user interface display that illustrates performance opportunity data in tabular form. It will be appreciated that FIG. 10A shows only one example of a user interface display and a variety of others could be used as well. The information could be shown in chart form, or other diagram form, or in a wide variety of other ways. FIGS. 10 and 10A will now be described in conjunction with one another.

In the example described with respect to FIGS. 10 and 10A, the performance opportunities to be identified are the opportunities reflected as the difference between the leading performing operators in each category and the lagging performing operators. For example, there is a performance opportunity if the lagging operators could be trained or otherwise educated to increase their performance to match the leading operators in each category. Another performance opportunity is identified as the difference between the actual performance data and the theoretical optima with various technology upgrades to the machine, and with respect to the ultimate theoretical optimum. Still other performance opportunities can be identified by comparing other fleet-specific data to corresponding data across fleets (such as comparing the top performing operator in this fleet to the highest performers across other fleets). These are only examples of opportunities that can be calculated, and others can be calculated as well.

Actual performance calculator component 692 calculates the actual performance values that will be used to identify opportunities. For instance, where leading operator performance will be used, component 692 calculates leading operator performance values across the performance categories identified. This is indicated by block 754 in FIG. 10A. One example of this is shown in table 756 in FIG. 10A. It can be seen in table 756 that the categories arranged in sets are identified in column 758. Each of those sets includes a plurality of different, individual categories identified in column 760. Each of the categories in column 760 can be represented by performance values in specific units as indicated by column 762. The actual performance values are shown in the remainder of table 756. As an example, column 764 shows the performance values for the worst day of the season, across some of the categories. Column 766 shows the average values for all of the lagging operators, across the categories. Column 768 shows the average value of the leading operator, across the categories. Column 770 shows the values for the best day. Column 772 shows the optimum values within the context of the fleet being analyzed, and column 774 shows comments. Information ribbon 776 can include other information as well, such as notes and context information. It will also be noted that the information contained in chart 756 is only one example of the information that can be calculated. Different, additional, or less information can be calculated as well. For instance, cross-fleet data can be calculated or retrieved. Also, in this example the grain loss quality metrics were not included, but these metrics can be included as well within the framework of the approach. As an example, if the grain quality data shows that there is a relatively high level of grain damage, this may result in an elevator not accepting the grain, without penalty. In addition, if the grain loss data shows losses in excess of typical when compared to reference data, this can have a financial affect as well. Thus, grain quality and grain loss data can be included. The same is true of residue data.

In any case, block 754 indicates that actual performance calculator 692 calculates the actual performance values, across the different categories, for the leading operators in each category as shown in column 768, or other groups or individuals that will be used as a basis for comparison to identify opportunities. Actual performance calculator component 692 can also calculate the actual performance values, across the various performance categories, for still other fleet-specific groups or individuals that are to be used in identifying opportunities. In one example, actual performance data is also calculated for lagging operators. This is indicated by block 778 and is shown generally in column 776 of chart 756.

Reference calculator component 690 then calculates a variety of different reference values against which the actual performance values can be compared to identify the performance opportunity space. One reference value is a theoretical performance optimum, given the current machine configuration. This is indicated by block 780. One example of this is illustrated in column 772 in FIG. 10A. Component 690 can also calculate the theoretical performance optima corresponding to the machines in the fleet under analysis, assuming they had automation upgrades. This is indicated by block 782. This can also be used as a reference value. Component 690 can also calculate the ultimate theoretical performance optimum for the machines, assuming that they are power limited, have maximum technology upgrades, and are producing adequate quality product. This is indicated by block 784. Of course, other reference data can be calculated or obtained as well, such as data for leading operators across other fleets, in the same crop or crops and in a similar geographic region, or other data.

Opportunity space identifier component 694 then compares the actual performance data against the calculated reference values to identify a performance opportunity space continuum. This is indicated by block 786. For instance, component 694 can compare the leading operator in each category to the average of the lagging operators to identify an opportunity space. This is indicated by block 788. It can compare the average of all operators (or the leading or lagging operators) to any of the theoretical optima that were calculated or the cross-fleet data. This is indicated by block 790. It can identify the opportunity space continuum in other ways as well and this is indicated by block 792.

Performance savings component 696 then calculates performance savings values that quantify the performance savings that can be obtained for each opportunity space on the continuum, in each category. This is indicated by block 794. It then outputs the performance savings values as indicated by block 796.

Figure 10B:
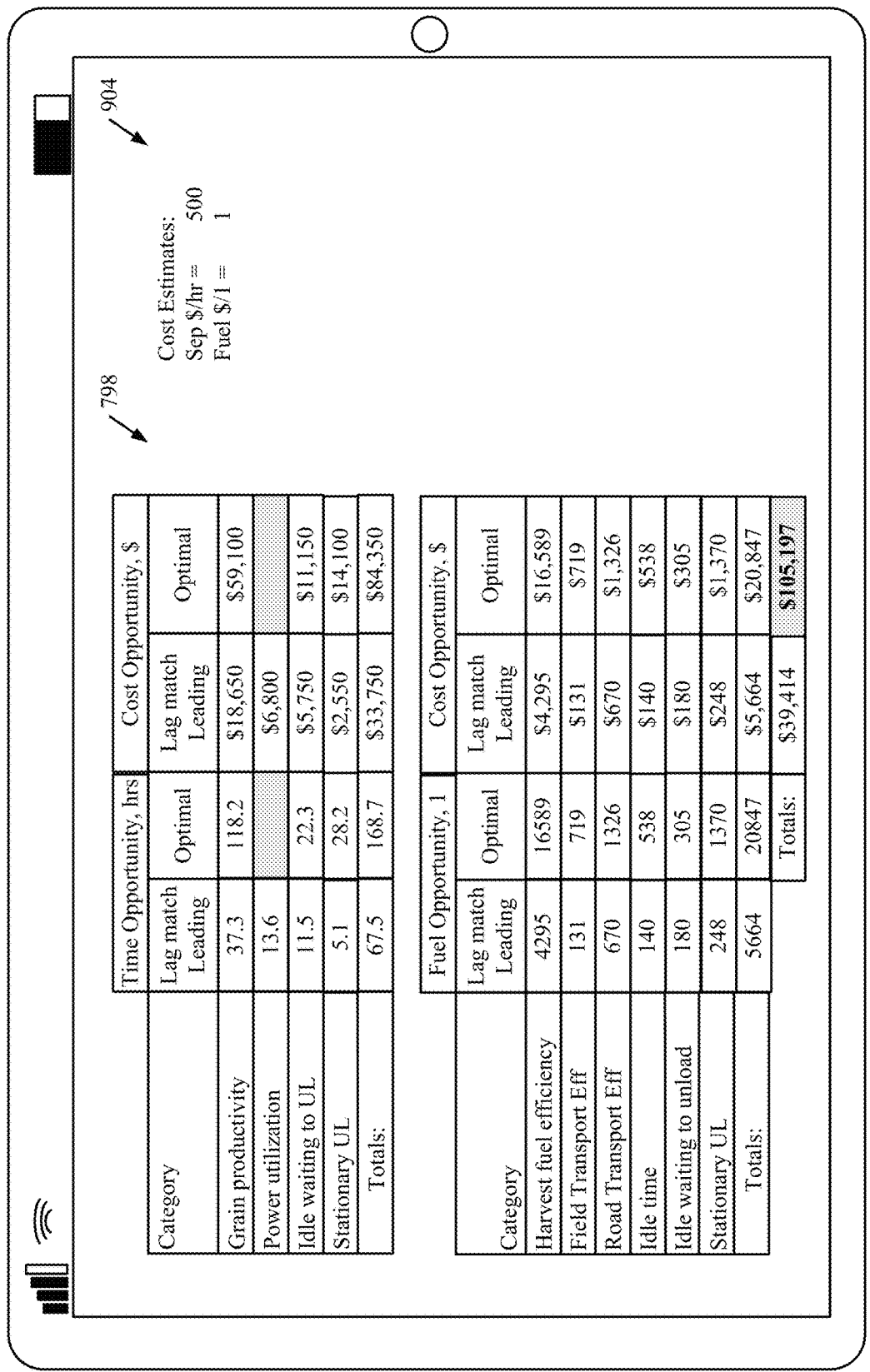
FIG. 10B is one example of a user interface display.

FIG. 10B shows one example of a user interface display 798 that illustrates this. It can be seen in FIG. 10B that the performance opportunity across some categories is quantified in hours saved and the performance opportunity in other categories is quantified in liters of fuel saved. For instance, by comparing the leading performers to the lagging performers in the grain productivity category, it can be seen that the fleet could have saved 37.3 hours if the performance of the lagging operators matched the performance of the leading operators. If the entire fleet of operators matched one of the optimal reference values that was calculated, the savings would have been 118.2 hours. Again, it will be noted that these values are, in one example, relative instead of absolute. This adjusts for factors outside of the control of the manager or operator (such as average field size, crop yields in the region, etc.).

Similarly, if the lagging operators had matched the leading operators in terms of power utilization, the fleet could have saved 13.6 hours. If the lagging operators matched the leading operators in terms of idle time waiting to unload, the fleet could have saved 11.5 hours, and if all operators performed at the optimum level, the fleet could have saved 22.3 hours. In addition, if the lagging operators matched the leading operators in terms of stationary unloading time, the fleet would have saved 5.1 hours. If all operators performed optimally in that category, the fleet would have saved 28.2 hours.

The same types of opportunities are identified with respect to fuel use. For instance, if the lagging operators had matched the leading operators in terms of harvest fuel efficiency, the fleet would have saved 4,295 liters of fuel. If all operators had performed at the optimum level, the fleet would have saved 16,589 liters of fuel. These numbers are calculated, in the example shown in FIG. 10B, for the categories of fuel transport efficiency, road transport efficiency, idle time, idle waiting to unload, and stationary unloading as well. It can thus be seen that performance opportunity space engine 676 has now identified various performance opportunities that can be taken advantage of, across a plurality of different performance categories. It has also quantified the savings (in understandable units, such as liters of fuel and time in hours) that can be obtained by taking advantage of each opportunity.

As mentioned above, a wide variety of other opportunities can be identified as well, such as deviation from a quality target for sensed grain damage (sensed on the machine or as measured by the elevator) and actual grain loss sensed by the machine and measured against the operator's grain loss preference target (if set by the operator or manger). These are examples only.

Figure 11:
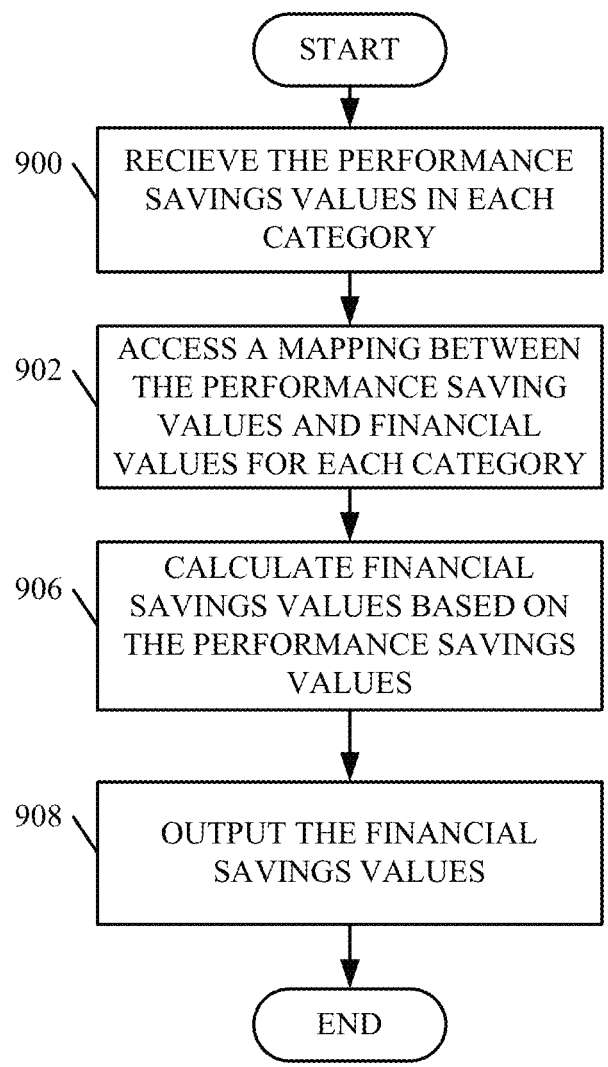
FIG. 11 is a flow diagram illustrating one example of the operation of the system shown in FIG. 7 in identifying a financial opportunity space.

Financial opportunity space engine 678 assigns a financial value to each opportunity. FIG. 11 is a flow diagram illustrating one example of the operation of engine 678 in more detail. Engine 678 first receives the performance savings values in each category, that were calculated by performance savings component 696. Receiving this information is indicated by block 900 in FIG. 11. By way of example, engine 678 will receive the hours of saving calculated for each opportunity shown in FIG. 10B. It will also illustratively receive the liters of fuel calculated for each opportunity shown in FIG. 10B.

Financial value mapping component 700 then accesses a mapping between the performance savings values and financial values for each category. This is indicated by block 902. By way of example, mapping component 700 illustratively identifies a financial value in terms of currency per hour (such as dollars per hour). By way of example, it may be that running a separator costs approximately $500.00 per hour (which can be calculated in any desired way, such as by using machine value depreciation). These values are shown illustratively at 904 in FIG. 10B. Mapping component 700 also illustratively identifies a currency value to assign to each liter of fuel. In the example shown in FIG. 10B, component 700 assigns a value of $1.00 per liter of fuel.

Once the financial values are assigned to each of the performance saving values in each category, then financial opportunity space identifier 702 identifies the financial opportunity space by calculating a financial amount that could be saved by taking advantage of each of the performance opportunities. These amounts correspond to the various financial opportunities.

For example, again referring to FIG. 10B, financial opportunity space identifier component 702 indicates that, if the lagging operators matched the leading operators in the grain productivity category, then the fleet would have saved $18,650.00. This is obtained by multiplying the 37.3 hour performance opportunity by $500.00 per hour. Component 702 calculates these financial opportunities for each category shown in FIG. 10B.

It does the same for the fuel opportunity. Thus, it assigns one dollar per liter of fuel that could be saved, multiplies that by the number of liters that could be saved in each opportunity and identifies this savings value as the corresponding financial opportunity.

Financial savings component 704 then calculates the ultimate savings that could be obtained by increasing performance across the various categories. It can be seen in FIG. 7B that if the lagging operators improved their performance to match the leading operators across all categories, the fleet would save $39,414.00. If all operators were operating at an optimal level, in all categories, the fleet would save $105,197.00. This information is output for viewing or for other use or analysis by user 674. Calculating the financial savings values based upon the performance saving values and outputting the financial savings values is indicated by blocks 906 and 908 in FIG. 11.

In one example, the financial and performance opportunities can be used to identify performance enhancing items as well. For instance, a training facility can have a catalog of training classes that map to the performance opportunities identified. Engine 676 can access the mapping to identify training classes that most directly map to the performance opportunities identified. As an example, a certain training class may have a strong mapping to increasing an operator's performance in power utilization. Another may be strongly mapped to another performance pillar, such as grain productivity Based on the performance opportunities, engine 676 can identify the corresponding classes and send them to recommendation engine 184 where they can be included in recommendations. The same can be done to recommend technology upgrades. System 660 can extrapolate savings that will be seen with the purchase of upgrades packages and send that to recommendation engine 184 where it can be presented to the user, along with an estimated return on investment. The information can be used for other sales recommendations as well.

The performance and financial analysis features not only greatly improve the performance of an operator, farm manager, or other consumer of the information, but it greatly enhances performance of the agricultural or other mobile machine. The information can be used by an operator to make adjustments to the operation of the mobile machine to improve performance, and other consumers of the information can make better decisions, more accurately, and more quickly regarding operation of the fleet. These features also improve the performance of the computing system in which they are deployed. By surfacing this information more quickly, the user need not burden the system with additional navigational and searching operations. This decreases the computational overhead of the system and thus improves its performance.

Figure 12:
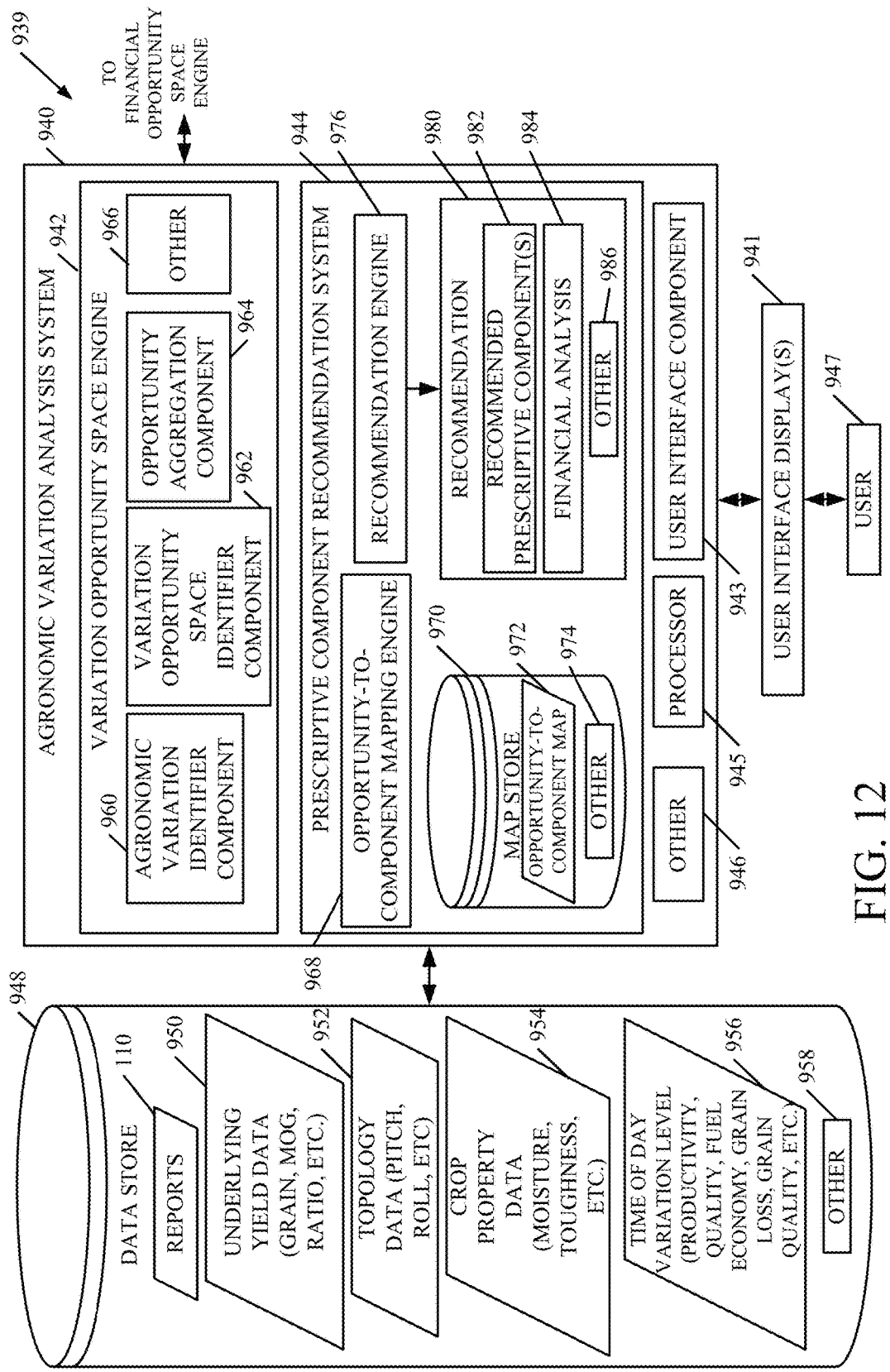
FIG. 12 is a block diagram of one example of an agronomic variation architecture.
Figure 13:
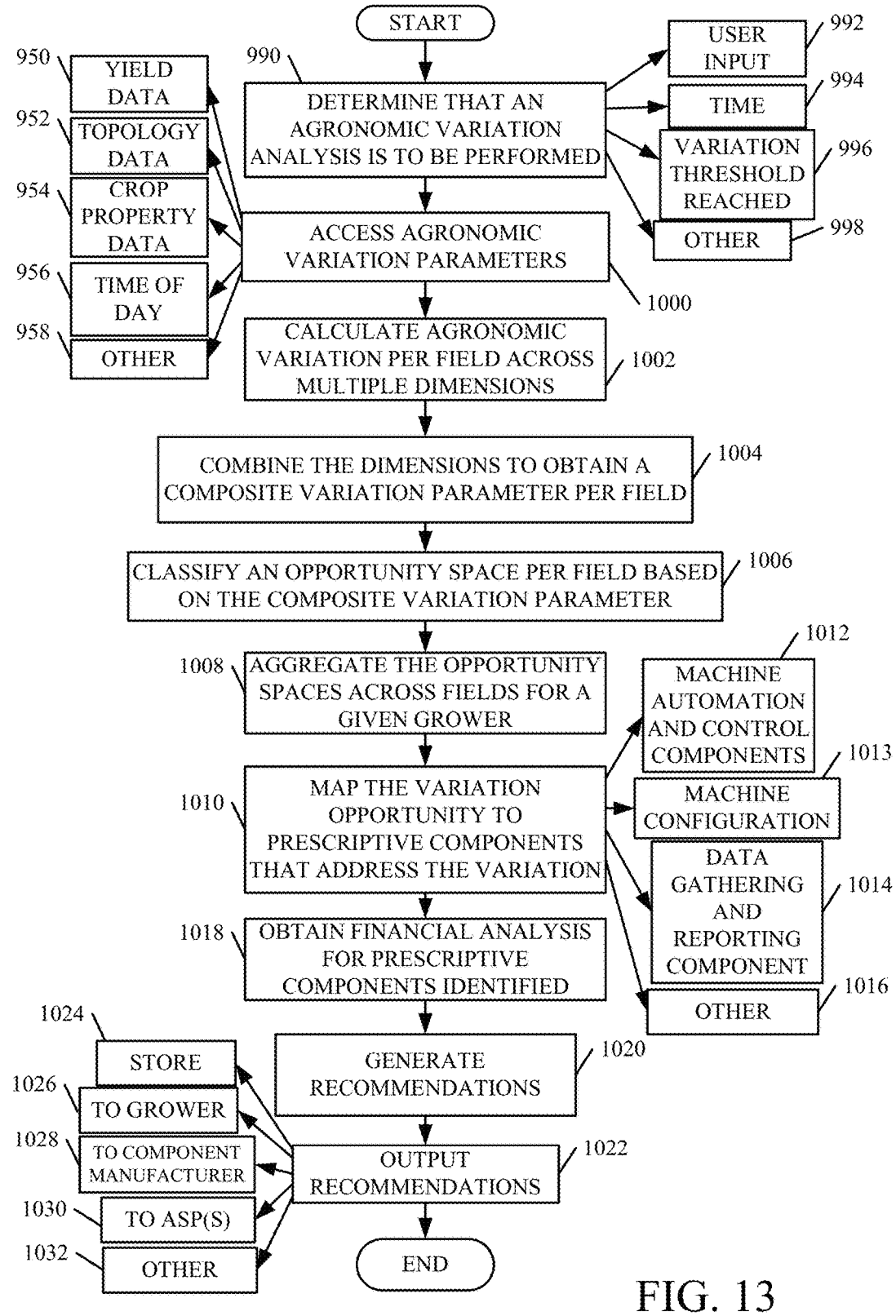
FIG. 13 is a flow diagram showing one example of the operation of the architecture shown in FIG. 12.

In accordance with another example, the information that is generated, as described above, can be used to identify agronomic variation and perform various analyses to identify improvements that a given grower can make in order to improve his or her performance, based upon the agronomic variation that the grower is encountering. FIG. 12 is a block diagram of agronomic variation architecture 939 that includes one example of an agronomic variation analysis system 940 for performing these types of analyses, and for generating recommendations. FIG. 13 is a flow diagram illustrating one example of the operation of the system shown in FIG. 12. It is first worth pointing out that, for agronomic variation analysis system 940 to perform its analyses, raw data sensing layer 116 and derived data computation layer 118 (and possibly other layers) include sensors that provide data or agronomic parameters that can be used to generate a measure of agronomic variation. For instance, as discussed above, the sensors can include yield sensors and a geographic location sensor (such as a GPS or other sensor) so that yield can be correlated to position across any given field. The sensors also illustratively include topology sensors that provide outputs indicative of a topology across a field. For instance, they can include not only a geographic location sensor, but also different orientation sensors. The orientation sensors can include such things as accelerometers, gravity switches, differential GPS receivers, among others. They illustratively provide outputs to indicate not only the location of the mobile machine (also including, for example, altitude), but the pitch and, roll, and any other orientation information that may be helpful in identifying topology. The sensors can also illustratively include a moisture sensor that indicates the moisture level for harvested crop (e.g., for grain) and material other than grain. It can also illustratively include a toughness sensor indicative of how tough a harvested material may be to process (e.g., how tough a crop is to thresh and how tough material other than grain is to process through the machine). In addition, the sensors can include sensors that indicate how the various sensed parameters vary across the time of day (such as the harvesting window). These are examples only and are described in greater detail below.

In the example shown in FIG. 12, agronomic variation analysis system 940 illustratively includes variation opportunity space engine 942, prescriptive component recommendation system 944, and it can include other items 946. System 940 is also shown accessing data store 948 that can illustratively store operator performance reports 110 and a wide variety of underlying or additional data, such as underlying yield data 950, topology data 952, crop property data 954, time of day variation levels 956, and it can include other data 958.

The yield data illustratively includes underlying data that includes grain yield and material other than grain (MOG) yield. It can also include a grain yield/MOG yield ratio, as examples. The grain yield can be sensed by a mass flow sensor that measures mass flow rate of grain through the machine. The MOG yield can also be measured by, for instance, having optical sensors that identify material other than grain that is entering the machine (e.g., that is entering the clean grain bin) or other sensors. Both of the yields can be correlated to geographical position so that the variation across a field can be calculated. The same is true of the ratios.

Topology data 952 illustratively includes data that can be used to obtain the elevation and slope variation across the field. This can affect moisture availability and ultimately yield variation as well as machine performance. The topology data can, for instance, include sensed pitch data that senses the pitch of the machine as it moves across the field. It can also include sensed roll data that senses the roll (so that roll variation can be identified) across the field. This, for example, can be used to generate side slope information indicating whether the machine is frequently operating on the sides of slopes.

Crop property data 954 illustratively includes information that can be used to understand regional effects for a given crop. For instance, it can include sensed grain moisture that can be used to identify the variation in grain moisture across a field. It can also include information that can be used to calculate the moisture level of MOG. For instance, where the optical sensor identifies the presence of material other than grain, then the sensed moisture level can be correlated to the material other than grain to calculate a moisture level for the material other than grain. The variation in MOG moisture can also be determined by calculating how it varies across the geographic location of the field. Crop property data 954 can also include toughness data. This can be obtained for the crop as well as for MOG. By way of example, a sensor that senses how hard the thresher is working can provide a measure indicative of how difficult a crop is to thresh. This can be used as a toughness metric and the variation in the crop toughness can be calculated across the field. The same is true for MOG. That is, where a sensor identifies the presence of MOG, the thresher toughness parameter can be used to identify the toughness of the MOG.

The time of day variation data 956 can include information that can be used to identify the level of variation that exists across the harvesting window (e.g., across a time of day) that might benefit from prescriptive components. For instance, the productivity variation can be sensed by sensing the level of grain productivity over time, and by considering yield variations over time. Quality variation can also be obtained. For instance, the fuel economy (e.g., engine fuel consumption and sensed grain mass flow rate) can be identified and their respective variations across time can also be identified. The sensed grain loss (e.g., separator loss and shoe loss) can be calculated over time, and the grain quality (e.g., based upon the video signal from the various grain quality cameras) can also be sensed and calculated over time so that its variation can be obtained. These are examples only.

All of this information can be obtained by agronomic variation analysis system 940. Variation opportunity space engine 942 can identify variation opportunity spaces, and prescriptive control recommendation system 944 can generate prescriptive control components that can be used to address the various agronomic variation opportunities identified by engine 942.

Before describing the operation of system 940 in more detail, a brief overview will first be provided. Variation opportunity space engine 942 illustratively includes agronomic variation identifier component 960, variation opportunity space identifier component 962, opportunity aggregation component 964, and it can include other items 966. Agronomic variation component 960 can obtain the various parameters from data store 948 and calculate or identify the various types of agronomic variation that occur on a field-by-field basis, or otherwise. Variation opportunity space identifier component 962 identifies opportunity spaces where the agronomic variations can be addressed. Opportunity aggregation component 964 aggregates those opportunities, across fields, for a given grower, or otherwise. This information can be provided to prescriptive component recommendation system 944.

Prescriptive component recommendation system 944 illustratively includes opportunity-to-component mapping engine 968, map store 970 (which, itself, illustratively includes opportunity-to-component map 972 and it can include other items 974), recommendation engine 976, and it can include other items 978. Engine 968 accesses mappings in store 970 to identify some particular prescriptive components that address the particular agronomic variation opportunities identified. Engine 976 illustratively accesses the financial opportunity space engine 676 (discussed above with respect to FIG. 7) and also generates recommendations 980. The recommendations illustratively include recommended prescriptive components 982 that identify various prescriptive components that can be used to address (e.g., reduce or otherwise address) the agronomic variations and the associated opportunities identified. Recommendations 980 can also include a financial analysis portion 984 that extrapolates the financial impact of addressing the agronomic variation opportunities with the recommended components 982, and it can include how the recommended prescriptive components 982 will impact the overall performance of the given grower with respect to the individual fields and as a whole. It can also illustratively indicate various returns on investment, based upon the increased performance and financial operation that can be obtained using the recommended prescriptive components 982. Recommendations 980 can include other items 986 as well. The recommendations 980 can be output to not only the given grower, but to machine manufacturers, manufacturers of the prescriptive components, various other vendors, other agronomic service provides (ASPs), etc.

System 940 also illustratively includes user interface component 943 and processor 945. These can be the same as previously-described user interface components and processors, or different ones. It illustratively generates user interface displays 941 for user 947. As is described below, the user 947 can be any of a wide variety of different users.

FIG. 13 is a flow diagram illustrating the overall operation of system 940, in more detail. FIGS. 12 and 13 will now be described in conjunction with one another.

System 940 first determines that an agronomic variation analysis is to be performed. This is indicated by block 990 in FIG. 13. This can be done in a wide variety of different ways. For instance, system 940 can receive a user input 992 indicating that the user is requesting system 940 to generate an agronomic variation analysis. In another example, system 940 can automatically generate the analyses intermittently or periodically or at given times 994. Further, system 940 can be configured to intermittently or continuously monitor the various types of agronomic variation and generate a full agronomic variation analysis (including recommendation 980) when one or more types of agronomic variation reach a threshold level. This is indicated by block 996. System 940 can determine that an agronomic variation analysis is to be performed in other ways as well, and this is indicated by block 998.

Variation opportunity space engine 942 (e.g., agronomic variation identifier 960) then accesses the agronomic variation parameters in data store 948 (or elsewhere). This is indicated by block 1000 in FIG. 13. Again, as briefly described above, the agronomic variation parameters can include yield data 950, topology data 952, crop property data 954, time of day variation data 956, or other data 958. Component 960 then calculates the agronomic variation, per field, across multiple different dimensions. This is indicated by block 1002 in FIG. 13. For instance, it can calculate the level of yield data variation across a field, the level of topology variation, the level of crop property variation, time of day variation, etc. It can also calculate various different measures of variation. For instance, it can calculate the standard deviation of the dimension values (or parameter values) for each given dimension (or parameter) or a wide variety of other measures of variation.

Component 960 then illustratively combines the various agronomic variations calculated for the various dimensions to obtain a composite agronomic variation parameter for a given field. This is indicated by block 1004. One example of a calculation that can be used to obtain the composite variation parameter is identified as equation 1 below:

$$\text{Agronomic variation} = x1*\text{STD (grain yield)} + x2*\text{STD (MOG yield)} + x3*\text{STD (pitch)} + \ldots \quad \text{Eq. 1}$$

where the factors x1, x2, x3 . . . are illustratively weighting factors that can be used to tune the agronomic variation calculation across the standard deviation of each included parameter (or dimension). It will be noted that this is but one method for calculating agronomic variation and any of a wide variety of other mechanisms can be used as well, including respective distribution functions for each contributing parameter (or dimension), etc.

Variation opportunity space identifier component 962 then classifies an opportunity space, per field (or per field section or on even a more or less granular basis), based upon the composite variation parameter that component 960 calculated for that field. This is indicated by block 1006. This can be done, for instance, in the same fashion as discussed above with respect to identifying performance opportunities and various financial opportunities.

Opportunity aggregation component 964 then aggregates the opportunity spaces identified, across the various fields, for a given grower (or for another entity, such as for a company that owns the land or equipment, etc.). This is indicated by block 1008 in FIG. 13.

Opportunity-to-component mapping engine 968 then accesses the mappings in store 970, based on the variation opportunity spaces identified by engine 942, to identify various prescriptive components that can be used by the grower to address the agronomic variations. These mappings are indicated by block 972. Accessing them is indicated by block 1010.

The prescriptive components can fall into a variety of different categories. For instance, they can be components that change the configuration of the mobile machine. This is indicated by block 1013. They can be prescriptive components that provide different levels of machine automation and control. This is indicated by block 1012. As examples, they can be components that increase the level of automated control of the mobile machine. They can also be prescriptive components that provide a greater level or definition, of data gathering and reporting. This is indicated by block 1014. For instance, if yields are relatively flat across a given field, then the yield sensor need not provide high definition sensor outputs, because the sensed yield does not change much across the entire field. However, where there is a large variation in yield across a given field, the grower may benefit from a higher definition yield sensor that takes yield sensing measurements more often, or that provides higher definition yield sensing data for reporting, mapping, etc. This will allow the grower to more accurately track yield variation across the field. This is but one example of a data gathering and reporting component 1014.

Of course, the prescriptive components can be a wide variety of other components as well, and this is indicated by block 1016. Other prescriptive components, for instance, can include side hill kits that allow various items of machinery to operate more effectively on side hills or where there is a relatively large variation in slope or topology. Different levels of machine automation and control components can include components that include more or less sophisticated automation, thus depending more or less on the operator to control the machine. Another example of a data gathering and reporting component 1014 may be different reporting systems. A first reporting may be a monitor only system where the various sensed parameters and performance information is only displayed, in the cab, to the operator. Another level of reporting may include generating reports on the standard definition data and providing it to a standard set of users. Still another level may include generating those same reports, or additional or different reports, using high definition data where the data is sampled at a higher sampling rate. These are examples only.

Once engine 968 has identified the various components that can be used to address the agronomic variation, it illustratively provides the opportunity information identifying the agronomic variation opportunities, and an identity of the various prescriptive components that have been identified to address those variations, to the financial opportunity space engine 676. Engine 676 illustratively performs a financial analysis based on the cost of the prescriptive components identified, and an extrapolated financial improvement that will be obtained by the grower if those components were deployed for use in the grower's fields or on the mobile machine. This can include how the components would affect the performance of the grower's machinery in those fields, as well as how they would financially impact the grower's performance, in those fields. Thus, the financial analysis can also include a return on investment indicator that identifies the return on investment for the various components that have been identified. Obtaining the financial analysis for the prescriptive components that have been identified is indicated by block 1018 in FIG. 13.

Recommendation engine 976 then generates and outputs one or more recommendations 980. This is indicated by block 1020 in FIG. 13. The recommendations 980 can then be output to a wide variety of different users 947. This is indicated by block 1022. For instance, they can be stored locally or remotely, as indicated by block 1024. They can be output to the grower 1026. They can be output to various component manufactures 1028 or to various agronomic service providers (ASPs) 1030. Of course, they can be output to a wide variety of others as well, such as agronomists, seed companies, equipment manufacturers, service vendors, etc., and this is indicated by block 1032.

It can thus be seen that system 940 can be used to drastically improve the performance of the various machinery. It can quickly surface relevant information that can be mapped to different prescriptive components or techniques that can be used to improve the overall performance of the machine or a group of machines. It can also be used to modify the configuration of a machine, the various components deployed on the machine, or a variety of other things, that can be used to increase the performance and efficiency of the machine. Further, it can increase the performance of the system 940, itself. By way of example, because it more quickly surfaces relevant information, the user need not navigate through the various data stores or launch queries to obtain different types of data, in order to surface the relevant data. Instead, the relevant data is automatically generated and surfaced for the user. This decreases the computing overhead needed to perform these types of analyses, and it also speeds up the computations, because the data is more quickly identified and surfaced. This can reduce the computing and memory overhead needed to perform these types of analyses.

In another example, the mechanisms described herein can be used to not only evaluate the performance of machine operators of a given machine, but they can also be used to evaluate the performance of teams of operators at a worksite. Many different types of teams can use these mechanisms. For instance, forestry operations use teams of workers, as do construction operations, various agricultural operations, among others. As one example, sugarcane harvesting operations often have fronts (or teams) of people that are used to support a sugarcane harvester. The front includes the sugarcane harvester and its operator, along with a set of one or more drivers that drive tractors that pull haulage wagons (or billet wagons). The tractor drivers drive the tractors to unload the sugarcane from the harvester and transport it to a staging site where it can be loaded into over the road trucks. The over the road trucks take the loaded sugarcane to a mill for processing. Thus, the equipment on a front can include a harvester, multiple tractors that each pull one or more billet wagons. There may also be staging equipment that unloads the sugarcane from the billet wagons and places it in the over the road trucks that transport the sugarcane to the mill. Each of these items of equipment has an operator. Each front often has a front leader that coordinates the activities of the individuals in the front. The sugarcane fronts are often supported by one or more service vehicles that are used to perform service on the harvester, the tractors, the wagons, etc. Such service can include maintenance operations, such as greasing the machines, or performing other maintenance, in addition to fueling the machines.

In some larger sugarcane operations, an owner of the operation may have a great deal of acreage in sugarcane (sometimes in excess of a million acres). The owner may have hundreds of different harvesters that are operated around the clock. Thus, each harvester has three-four different operators assigned to it, each harvester also has two-three tractors with haulage wagons that operate with it and each of these tractors operates around the clock and thus has three-four different operators assigned to it. A single operation may therefore have thousands of different pieces of equipment that are each assigned to a team or front. The teams may collectively number thousands of different people as well.

While the above scenario includes a very large owner that may have hundreds of different sugarcane harvesters, etc., the same mechanisms described herein can be applied to much smaller owners that may only have one harvester, or a relatively small number of harvesters and associated fronts (or teams). They can also be applied in other agricultural, forestry, construction and other environments or operations.

Thus, the present mechanisms have wide applicability and scale accordingly based upon the size of an organization to which they are applied.

The mechanisms described herein can be applied to all of the operators that work on a given team, or front, collectively to arrive at one or more performance scores for each team or front. This information can be used in a wide variety of different ways, some of which are described below.

Figure 14:
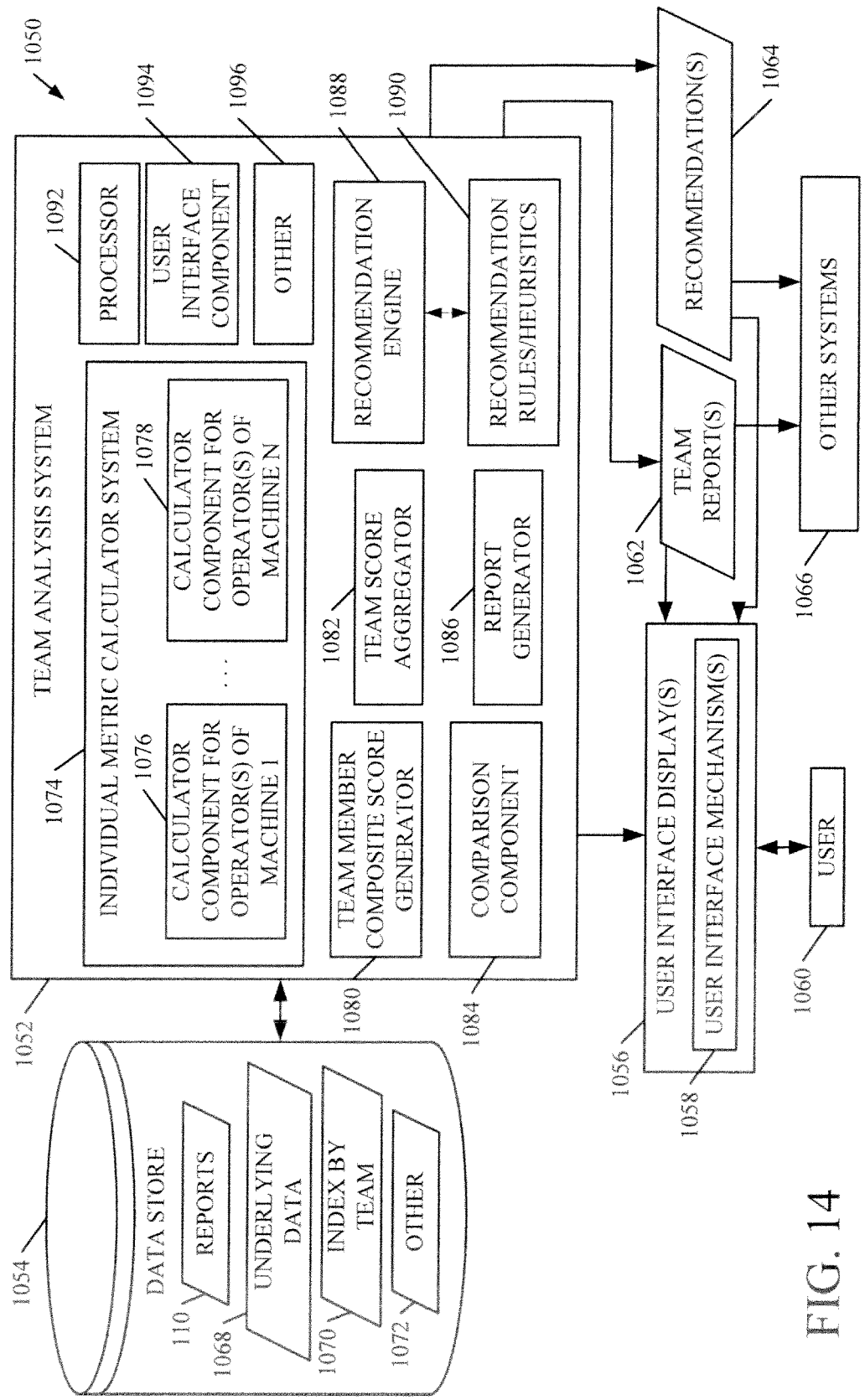
FIG. 14 is a block diagram of one example of a team analysis architecture.

FIG. 14 is a block diagram of one illustrative team analysis architecture 1050 that can be used to analyze and generate reports indicative of the performance of different teams. Architecture 1050 illustratively includes team analysis system 1052 that is shown having access to data store 1054. Data store 1054 can be any of the other data stores discussed above, or a separate data store. Architecture 1050 also shows that, in one example, system 1052 can generate user interface displays 1056 with user input mechanism(s) 1058 for interaction by user 1060. In the example shown, system 1052 illustratively generates team reports 1062 and recommendations 1064 and provides them to user 1060 through user interface displays 1056. System 1052 can also provide them to other systems 1066.

Before describing the operation of architecture 1050, a brief description of a number of the items in architecture 1050 will first be provided. Data store 1054 illustratively includes reports 110, as discussed above. It can also illustratively include any set or subset of the underlying data indicated by block 1068. It can include additional information, in addition to the information that underlies reports 110 as well. In one example, the reports and underlying data are indexed by team. This is indicated by block 1070. Data store 1054 can include a wide variety of other information 1072 as well.

The example shown in FIG. 14 illustrates that team analysis system 1052 illustratively includes individual metric calculator system 1074, which, itself, includes calculator components that calculate performance metrics for the individual operators of the different machines on each team or front. These are indicated by blocks 1076 and 1078 in FIG. 14. System 1052 also illustratively includes team member composite score generator 1080 that receives the individual metric scores for each individual operator on a given team or front and generates a composite score for each individual member, based upon the individual metric scores. System 1052 also illustratively includes team score aggregator 1082. Aggregator 1082 illustratively aggregates the various composite scores from the individual operators on a team or front and generates an aggregate team score indicative of the overall performance of that team.

System 1052 can also include comparison component 1084. Component 1084 can be used to compare the various scores for the various teams to generate an output ranking that ranks the individual teams according to their performance scores. Component 1084 can also be used to compare the team score against the score for the same team, from a previous time period. For instance, it can compare the team scores for the same team on consecutive days, over different time periods, for the same field in different years, etc. Also, it can compare the team score to scores for other teams, to an average score for a set of other teams, to scores for teams in similar geographic regions, to the best score or scores for similarly situated teams, etc.

System 1052 can also include report generator 1086. Generator 1086 can be used to generate team reports 1062 that provide a wide variety of different types of analysis results for the individual teams, and for the individual members on those teams, in addition to information indicative of a comparison of the various teams.

System 1052 can also include recommendation engine 1088. Engine 1088 can obtain the information calculated by the remainder of the system, and generate recommendations 1064 for improving the overall performance of individual teams, and of the group of teams as a whole. In doing so, engine 1088 can access recommendation rules or heuristics 1090. It can generate recommendations in other ways as well. For instance, the performance scores, or the underlying data that is used to generate the performance scores, can be mapped to recommendations. Therefore, based upon the performance scores and/or underlying data, engine 1088 can access that mapping to identify recommendations that can be used to increase the performance of a team, of a group of teams, etc.

In one example, system 1052 also illustratively includes processor 1092, user interface component 1094, and it can include other items 1096 as well. User interface component 1094 can, either by itself or under the control of other items in system 1050, generate user interface displays 1056. Processor 1092 can be used to facilitate the functionality of the items in system 1052, or that can be facilitated in other ways as well.

Figure 15A:
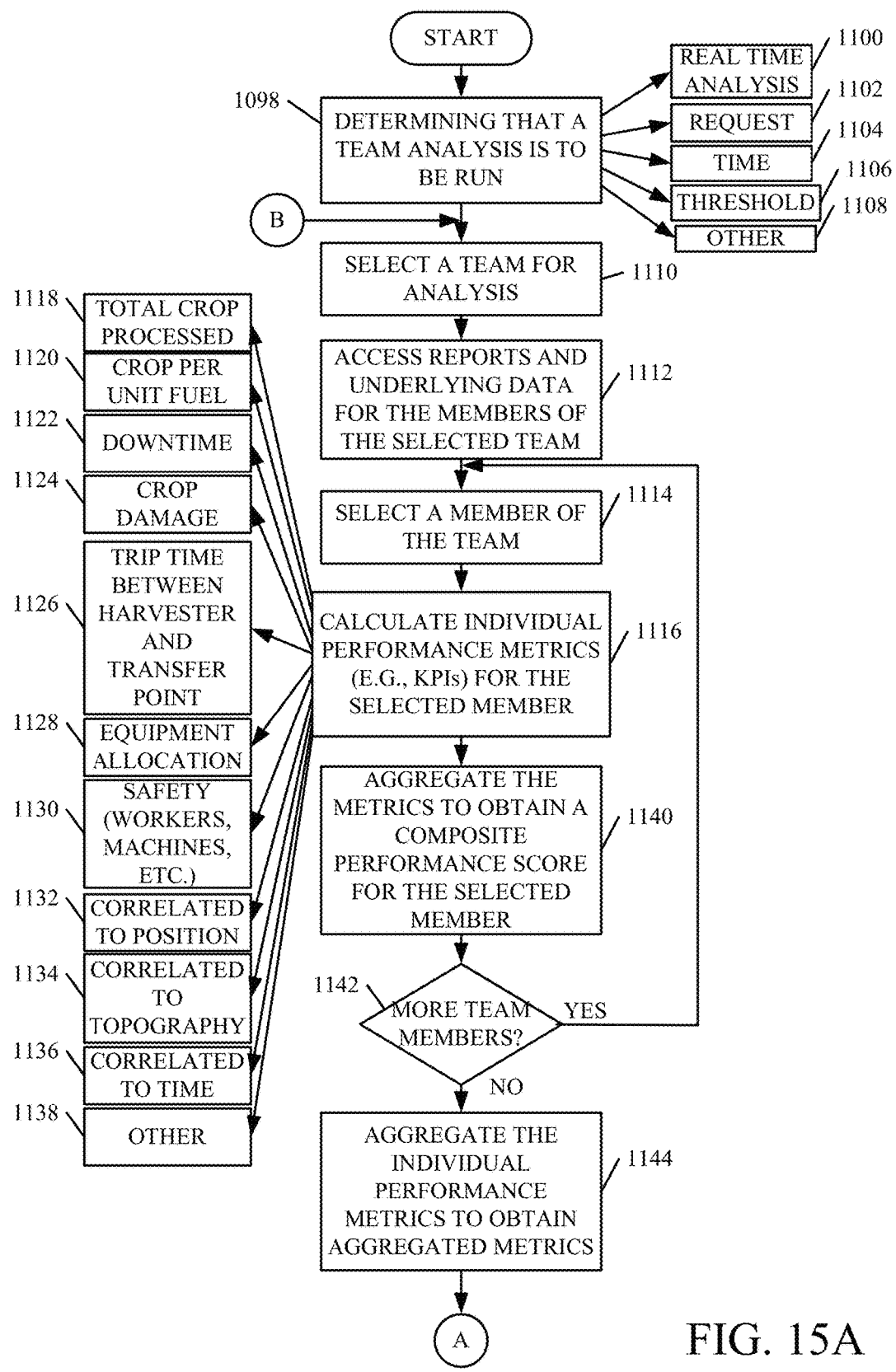
FIGS. 15A and 15B (collectively referred to as FIG. 15) show a flow diagram of one example of the operation of the architecture shown in FIG. 14.
Figure 15B:
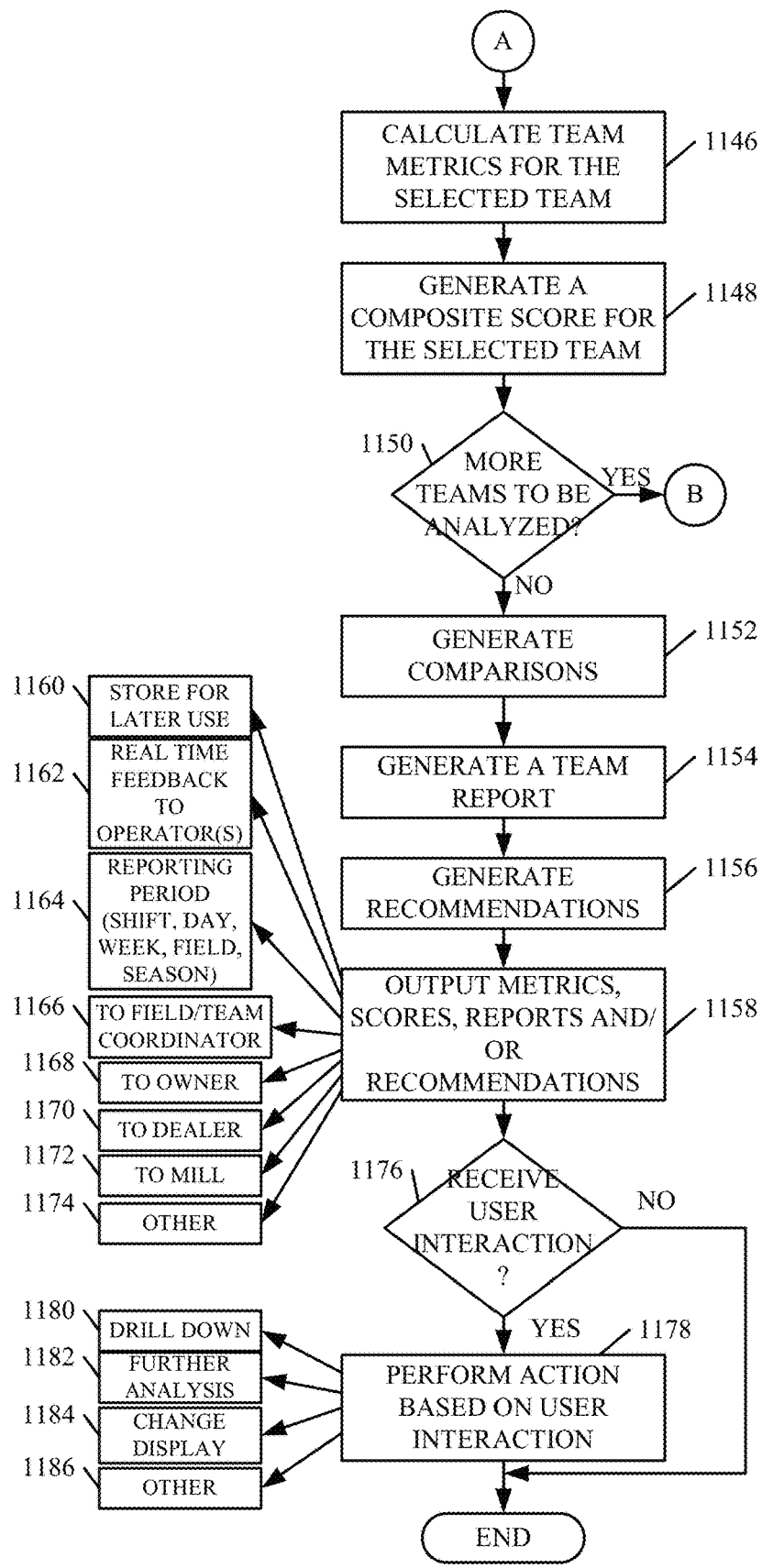

FIGS. 15A and 15B (collectively referred to herein as FIG. 15) show a flow diagram illustrating one example of the operation of team analysis architecture 1050. FIGS. 14 and 15 will now be described in conjunction with one another.

Team analysis system 1052 first determines that a team analysis is to be performed. This is indicated by block 1098 in FIG. 15. This can be done in a variety of different ways. For instance, the team analysis can be performed substantially continuously so that real time analysis results can be displayed to the operators of the various pieces of equipment in the different teams or fronts, to their coordinators, managers, to the owners, or to a variety of other people. Performing real time analysis is indicated by block 1100.

The analysis can also be performed at the request of an individual. For instance, the operator of a cane harvester may request the system to perform a team analysis system so that a current performance score for the team can be displayed. Others can request that this be done as well. This is indicated by block 1102.

The analysis can be performed on a periodic basis (such as the end of each shift, the end of each day, etc.). This is indicated by block 1104.

It can also be performed in response to one or more different performance scores reaching a threshold value. For instance, if a team's performance is suffering badly, and its performance score reaches a low score threshold, this can cause system 1052 to perform an analysis for that team. Similarly, if some of the individual metrics for a team fall below a threshold, this can indicate that system 1052 is to perform an analysis for that team. Of course, performing a team analysis in response to other items reaching other thresholds can be done as well. Performing the team analysis in response to a threshold value being reached is indicated by block 1106. System 1052 can also determine that a team analysis is to be performed in other ways as well, and this is indicated by block 1108.

System 1052 then selects or identifies a team for which the analysis is to be performed. This is indicated by block 1110. For instance, where an operator or team member requests that an analysis be performed, that person can also provide an operator input identifying the team for which the analysis is to be performed. The requesting individual may also have authentication information associated with a team so the system can automatically identify the team to be selected. In addition, it can identify sets of teams for which analyses are to be performed. For instance, at the end of each shift, system 1052 may generate a performance score for each team. Selecting or identifying the team for which an analysis is to be performed can be done in other ways as well.

Individual metric calculator system 1074 then accesses the reports 110 and/or any underlying or other data that system 1074 will operate on, for the members of the selected team. This is indicated by block 1112. The particular data being accessed may vary, based upon the different applications (such as for a sugarcane application, a construction worksite application, a forestry worksite application, other farming applications, etc.) Also, even within the same application, the data being accessed can vary. For instance, it can vary based on performance indicators that a given user wishes to use. It may be that one owner or operator believes that certain performance metrics are more important than others. In that case, system 1074 may access a certain subset of the data in data store 1054. In another example, an owner or operator may believe that other performance metrics are more important. In that case, system 1074 may access a different subset of the data in data store 1054. In any case, system 1074 obtains access to the data that it uses to calculate the individual performance metrics for the individual members of the selected team.

Individual metric calculator system 1074 then selects a member of the team. This is indicated by block 1114. It then uses a calculator component to calculate the individual performance metrics (e.g., the key performance indicators or KPIs) for the selected team member. This is indicated by block 1116. As briefly mentioned above, the particular KPIs that are calculate for each individual team member may vary widely. For instance, they may vary based upon the particular type of equipment that the team member is operating. The KPIs calculated for the operator of a sugarcane harvester, for instance, may be quite different from those calculated for the operator of a tractor that pulls a billet wagon, and from those calculated for the operator of a service vehicle or over the road truck. In addition, the particular KPIs for even the same piece of equipment may vary, based upon what is believed to be important for a given team or set of teams.

By way of example only, some of the KPIs that are calculated for the individual members can be the total amount of crop processed during a selected time period. This is indicated by block 1118. For instance, where the team member is the operator of a sugarcane harvester, system 1074 may calculate the total tonnage of sugarcane that was harvested. Where the team member is the driver of a tractor hauling a billet wagon, it may be the total tonnage of billets that were hauled by that driver.

The KPIs could also include, for instance, the amount of crop processed per unit of fuel. This is indicated by block 1120. For example, the system may calculate the number of pounds of crop per liter of fuel. The KPIs may include the downtime 1122 corresponding to the equipment that was being operated by the selected team member.

Further, the KPIs may include a measure of crop damage 1124. By way of example, if the operator of a tractor that pulls a billet wagon drives on the rattoons of a sugarcane crop, it can damage the crop. Therefore, in one example, the raw data sensing layer 116 (or derived data computation layer 118) or any of the other layers shown in FIG. 1, can receive as an input a map of the geographic location of the rows of sugarcane in a field. This can be previously computed or generated by crop position sensors on the harvester, for instance. It can also then receive the geographic location of where the tractor driver drove. It then correlates the amount of time or the linear distance (or another measure) indicative of how often the tractor driver drove on the rattoon crop. This can be calculated as a percentage of the overall time, as gross linear distance units, or in a wide variety of other ways.

The KPIs can also include time measurements, such as the average trip time between the sugarcane harvester and the staging area or transfer point where the sugarcane is transferred to an over the road truck. This is indicated by block 1126.

The KPIs can include the total amount of equipment allocated to the team that the team member is on. For instance, it may be that the team is allocated three tractors pulling billet wagons. It may also be that the team is allocated 2.5 tractors (with one splitting his or her time between two different teams). The equipment allocation is indicated by block 1128.

The KPIs can include one or more safety metrics. This is indicated by block 1130. For instance, the safety metric can identify the number of times that the individual team member was involved in an accident, the severity of the accident, etc. The safety metric can include not only operation that is unsafe for workers, but operation that is unsafe for the machines as well. By way of example, at times, a tractor driver may drive too close to the sugarcane harvester so that the billet wagon or tractor comes into contact with the harvester. This can cause damage to either or both machines. Thus, the safety metric may indicate how often this occurs, and the severity level with which it occurs, among other things.

The KPIs can be correlated to position as indicated by block 1132. They can also be correlated to topography as indicated by block 1134, or to time as indicated by block 1136. These items may provide significant insight as well. For instance, when the KPIs are correlated to position, they can indicate that a given team member was operating in a particularly difficult field. Similarly, where they are correlated to topology, it may indicate that the operator was operating on an uneven topographical area (such as one with hills—where perhaps fuel efficiency might suffer). Where they are correlated to time, this may indicate that a particular team member was operating at an advantageous time of day, or at a disadvantageous time of day. By way of example, if the team member is operating on a shift that includes the early morning hours, this may indicate that the crop has excess moisture (such as dew) on it. This can affect the overall operation and efficiency of the team.

Of course, the KPIs can be a wide variety of other KPIs as well. This is indicated by block 1138.

Once all of the individual KPIs are calculated by system 1074 for the selected team member, they can be stored and also provided to team member composite score generator 1080. Generator 1080 illustratively aggregates the metrics to obtain a composite performance score for the selected team member. This is indicated by block 1140 in FIG. 15. By way of example, the composite score can be a weighted aggregation of the individual metric scores. The weights can be varied to emphasize certain metrics that are deemed to be more important than other metrics.

System 1074 then determines whether there are any more team members for which the individual and composite performance scores are to be generated. This is indicated by block 1142. If so, processing reverts to block 1114 where the next team member is selected. If not, however, then all of the information generated by system 1074 can be provided to team member composite score generator 1080. Generator 1080 aggregates the individual performance metrics to obtain aggregated metrics for all of the members of the team. This is indicated by block 1144. In doing so, it may be that some of the metrics can be combined for all members of the team. In another example, only a subset of the metrics can be calculated for all members of the team, while other subsets are calculated for different members on the team. For instance, it may be that certain metrics pertain only to tractor drivers, or to harvester drivers, but not both. In that case, those metrics will only be aggregated for the tractor drivers, for the harvester drivers, etc.

In addition, it may be that some metrics are team metrics that are calculated for the team as a whole, without being calculated for individual members of the team. In that case, generator 1080 calculates the team metrics for the selected team. This is indicated by block 1146. For instance, the total amount of crop processed from the sugarcane harvester to the over the road truck might be a metric that is calculated for the team as a whole. If the individual member metrics (such as the amount of crop processed by each individual) were simply aggregated, that might lead to an erroneous score. If the amount of crop harvested by the sugarcane harvester were added to the amount of crop hauled by the tractor drivers with haulage wagons, that would lead to an artificially high amount of crop processed. There are a wide variety of other examples of team metrics that apply only to a team as a whole, or that are calculated in different ways, and not to the individual members. Those metrics can be calculated at block 1146.

Team score aggregator 1082 then takes the various scores and metrics that have been calculated by other components and generates a composite score for the selected team. This is indicated by block 1148. The composite score can be formed of a wide variety of different combinations of the individual scores and metrics, of the team metrics, of the composite scores for individual team members, or other information. It can also be aggregated according to a wide variety of different aggregation mechanisms. The aggregation can include summing, a weighted combination of individual values, a weighted combination of average values, or a wide variety of other aggregations. In any case, the composite score that is indicative of the overall operation of the team is generated.

System 1052 then determines whether there are any more teams to be analyzed at this time. If so, processing reverts to block 1010 where the next team is selected. This is indicated by block 1150.

If there are no more teams to analyze at this time, then comparison component 1084 can generate a wide variety of different types of comparisons that may be useful in analyzing a team's performance. For instance, the teams can be compared against one another. Component 1084 can also generate a ranked list of how the various teams ranked relative to one another, and it can also indicate a distribution of their performance scores. A variety of other comparisons can be generated as well. Generating the comparisons is indicated by block 1152.

At some point (such as while system 1052 is calculating various metrics for another team), report generator 1086 generates one or more team reports that indicate the analysis results for the team that was just analyzed. This is indicated by block 1154. The team reports (represented by number 1062 in FIG. 14) can take a wide variety of different forms. They can be relatively simple, indicating only the composite score for a given team, or they can be relatively detailed, indicating not only the composite score, but also the underlying scores and metrics that were used to generate the composite score, in addition to other data. In yet another example, the reports are generated with navigable links (or user input mechanisms). The report can show a top level overall composite score for a team, and it can provide a drill down link (or button or other user input mechanism) that can be actuated to allow a user to drill down into the various detailed information that was used in generating the composite score. All of these and other report formats are contemplated herein.

In one example, recommendation engine 1088 also generates recommendations based upon the information in the report or other data. This is indicated by block 1156. The recommendations can be wide ranging and can be correlated to the various scores or underlying data. For instance, if the metric that indicates the average amount of time to take a trip from the harvester to the staging area or transfer point is relatively large, the recommendation may be to relocate the staging point closer to the harvester. This is but one example of a recommendation, and a wide variety of others can be made as well.

The results of the analysis can then be output to various destinations in various forms. This is indicated by block 1158. For instance, the reports and recommendations may be output to the team leader, to a field coordinator that is coordinating multiple different teams in a given field or in a given geographic location, to the owner, or to a wide variety of other people. However, the individual team member metrics and scores may be provided to the individual team members either at the end of a shift, periodically, or in real time (or near real time) by providing a user interface display or another user input mechanism that indicates the current score for the individual operator or for the team or both. These are examples only.

The metrics, scores, reports and/or recommendations can be stored for later user either within a piece of equipment that the team is using or another piece of equipment, or at a remote server location. Storing them for later use is indicated by block 1160. The information can also be provided as real time feedback to the operators. This is indicated by block 1162. The information provided as real time feedback can vary widely. It may be the individual operator's current performance score. It may be the team's overall composite score in addition to a subset of other individual metric values or other data. It may also include the team's current real time ranking relative to other teams that are operating in the field or in a designated geographic location.

The reports and recommendations can also be output at the end of a reporting period. This is indicated by block 1164. The reports can be output, for instance, at the end of every shift, at the end of every day, at the end of a pay period (for instance where a user's pay is somehow tied to the score), at the end of every week, or at the end of the season. They can also be provided on a field-by-field basis as a field is completed or during harvesting.

The information can be output to the field coordinator or team coordinator. This is indicated by block 1166. It can be output to an owner of the organization that deploys the system. This is indicated by block 1168. It can be output to equipment dealers or manufacturers or other service providers that provide maintenance services or other services relative to the equipment. This is indicated by block 1170. By way of example, the dealer or service provider may identify that some harvesters, tractors, wagons, service vehicles, etc. need to undergo certain types of maintenance or repair. When they receive these reports, they can then pre-order the different parts that are needed to perform the maintenance or repair, so the work can be done more quickly.

The information can be provided to the mill (or another purchaser of the sugarcane or a crop being harvested). This is indicated by block 1172. The information can be output to other systems as well, and this is indicated by block 1174.

In the example where the information (metrics, scores, reports and/or recommendations, etc.) are output in an interactive way, report generator 1086 may receive user interaction with the report. This is indicated by block 1176. If report generator 1086 receives user interaction with a report, it performs an action based on the user interaction. This is indicated by block 1178. For instance, it may be that a report is generated that gives the composite scores for a team, or for a number of different teams, with a drill down user input mechanism that allows the user of the report to drill into the detailed data that makes up the report.

In that case, report generator 1086 navigates the user to a next detailed display that displays the next level of detail information for the user. The drill down interaction is indicated by block 1180. It may be that report generator 1086 generates the reports with user input mechanisms that allow the user to have further analysis performed. This is indicated by block 1182. For instance, it may be that the report provides sort user input mechanisms that allow a user to sort the data in the report based on time, field location, time of day, recency, crop type, field location, or a wide variety of other criteria. It may also be that the user input mechanisms allow the user to filter the data down to a certain subset of data. In addition, it may allow the user to have different calculations performed on the data (such as averaging, time rolling average, standard deviations, or a wide variety of other further analyses). These are examples only.

Report generator 1086 may also provide user input mechanisms that allows the user to change the way in which the information is displayed. This is indicated by block 1184. For instance, there may be user input mechanisms which allow the user to have the data displayed as a histogram, as a graph, along a time line, as a bar chart, or on a map. By way of example, report generator 1086 may generate a view that shows the team's overall performance score (or the individual metrics that make up that score) correlated to the location where the team was operating on the field. In that case, report generator 1086 can generate a map showing how the team performance score changed as the team moved through a field. Of course, this is only one example of how the display can be changed.

Further, there are a wide variety of other user interactions which can be detected, and the corresponding actions can be performed by report generator 1086. This is indicated by block 1186.

It can thus be seen that the team analysis system provides significant advantages. It is extremely difficult for teams or fronts (or workers at a construction site, at a forestry site, at a site where forage harvesting or other harvesting is being conducted, at a site where material is being sprayed on a crop, where a crop is being seeded, etc.) to compare their performance to those of other teams or fronts on any but a very simple set of criteria (such as acres harvested). Even then, the comparison does not account for differences in conditions, terrain, topology, etc. Further, the present system advantageously allows teams to obtain an indication of their overall performance, and detailed information, on a detailed set of metrics, that further characterize their performance. The present system also allows the teams to advantageously compare themselves to other teams, even accounting for variations in the different fields, crop types, crop conditions, topology, etc. Because the system detects, aggregates and surfaces this type of information, it can lead to significantly improved performance of the teams and individual team members. Further, because the system automatically senses this information, and surfaces the information, it improves the operation of the system itself. A user need not conduct multiple queries against the system, and use computing resources and memory overhead to search for this information and then to aggregate it on the system. Instead, the system automatically generates the information and stores it or surfaces it in real time (or near real time). This reduces the number of searches launched against the system to generate reports. This can increase the speed of the system and reduce the processing and memory overhead needed in obtaining this type of information.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 16:
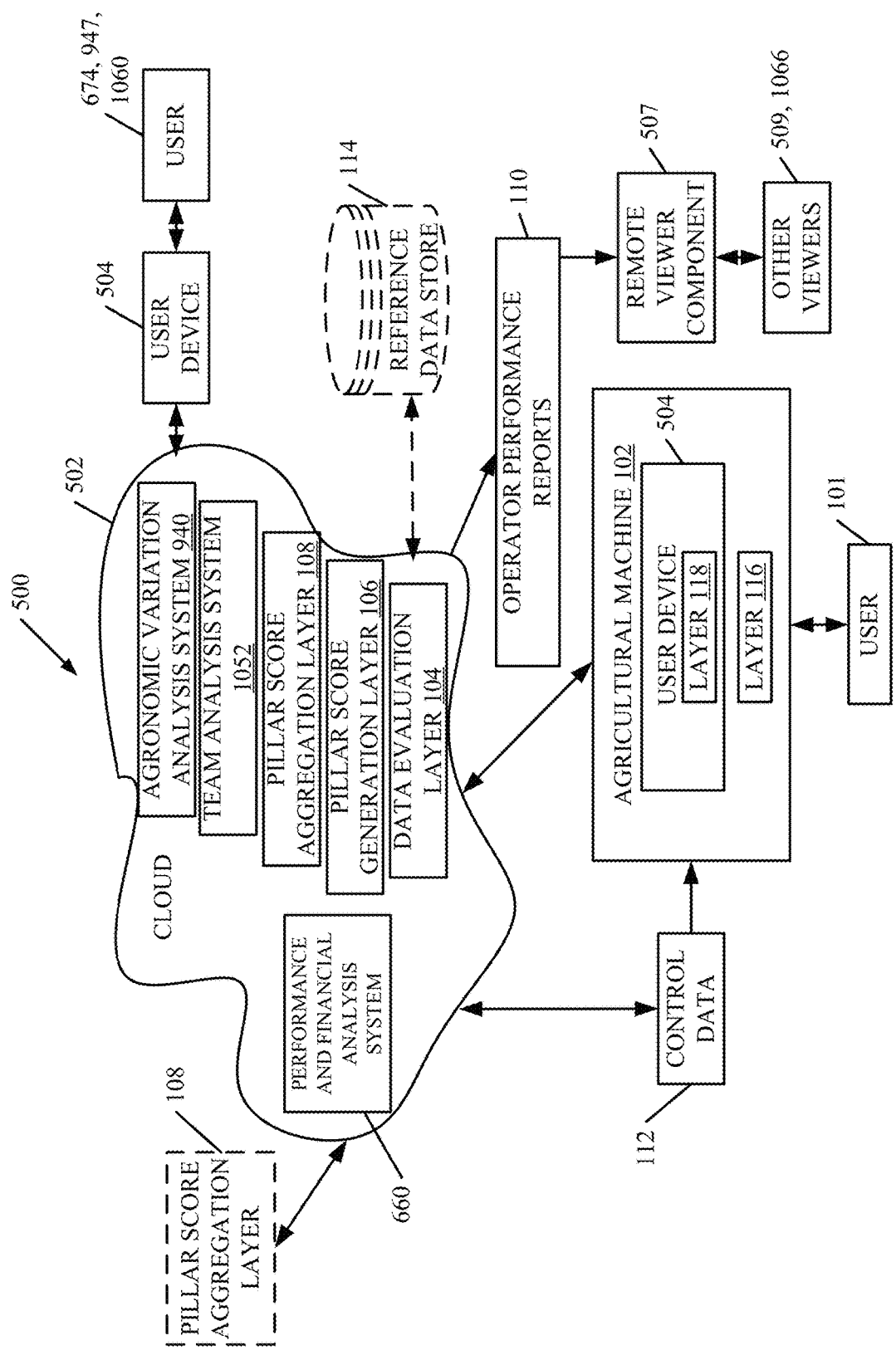
FIG. 16 is a block diagram showing one embodiment of the architecture shown in FIGS. 1, 2, 7, 12 and 14 deployed in a cloud computing architecture.

FIG. 16 is a block diagram of architecture 100, shown in FIG. 1, and those shown in FIGS. 2, 7, 12 and 14, except that elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 16, some items are similar to those shown in FIGS. 1, 2, 7, 12 and 14 and they are similarly numbered. FIG. 16 specifically shows that layers 104, 106, 108 and systems 660, 940 and 1052 can be located in cloud 502 (which can be public, private, or a combination where portions are public while others are private). Therefore, users 101, 674, 947, or 1060 can operate machine 102 or access those systems or other systems using a user device. User 101 for instance, can use a user device 504 on machine 102. User 674, for example, can use a different user device 504. Machine 102 can access layers 104, 106 and 108 through cloud 502. User 674 can access system 606 through cloud 502, and users 947, 1060, 509 and 166 can also access data and systems through cloud 502.

FIG. 16 also depicts another embodiment of a cloud architecture. FIG. 16 shows that it is also contemplated that some elements of architecture 100, those in FIG. 2, 7, 12 or 14 can be disposed in cloud 502 while others are not. By way of example, data store 114 can be disposed outside of cloud 502, and accessed through cloud 502. In another example, layer 108 (or other layers) or analysis system 660 can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

Further, FIG. 16 shows that a remote view component 507 (which can be another user device, or another component) can be used by one or more other viewers 509, 1066 who are remote from machine 102. Viewers 509, 1066 can include user 674 or other viewers that can view the reports, the opportunity or variation information or team information or other information if properly authenticated.

It will also be noted that architecture 100, or portions of it, or system 660 or the other architectures and systems can be disposed on a wide variety of different devices. Some of those devices include servers, desktop computers, laptop computers, tablet computers, or other mobile devices, such as handheld computers, cell phones, smart phones, multimedia players, personal digital assistants, etc.

Figure 17:
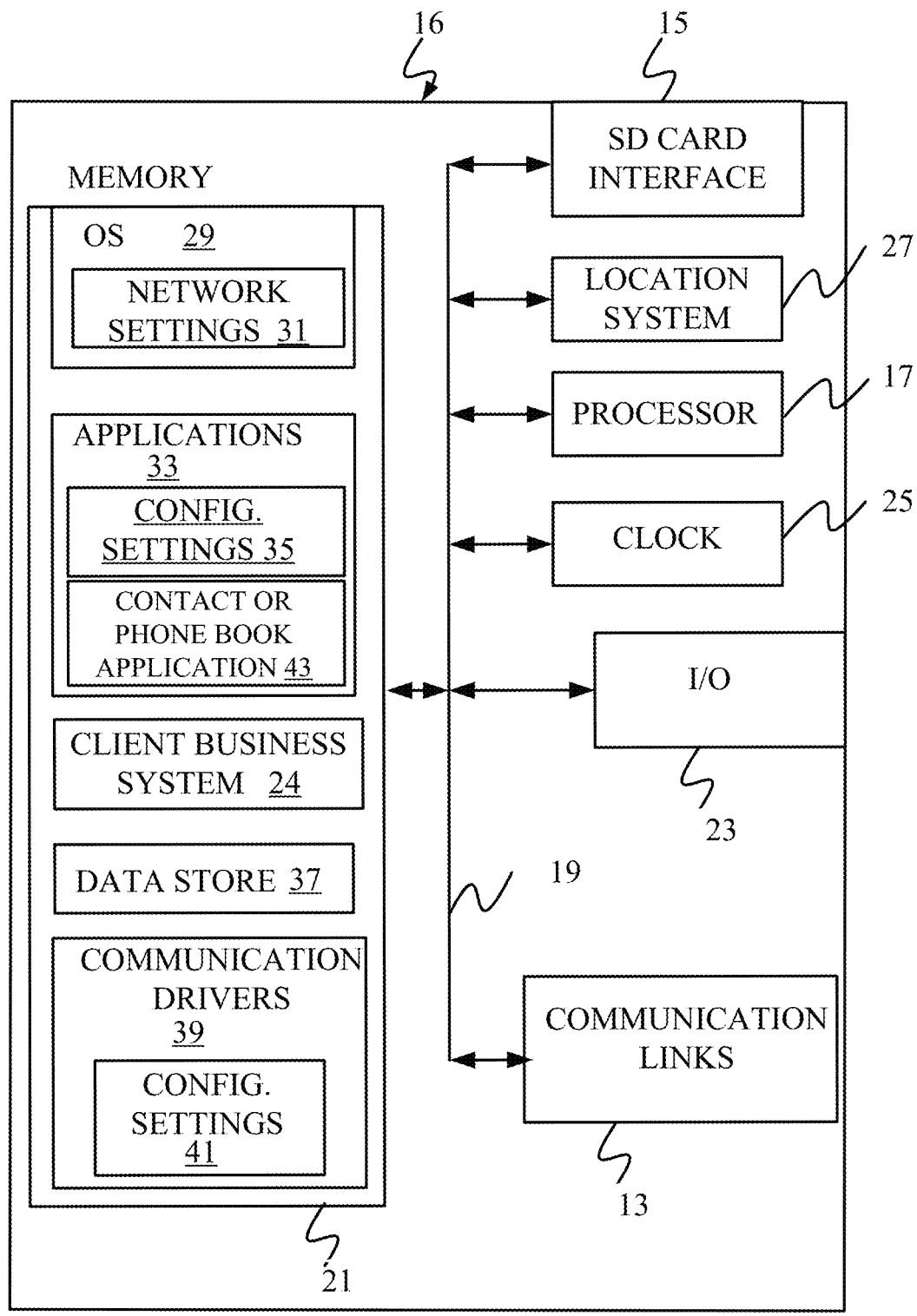
FIGS. 17-22 show various embodiments of mobile devices that can be used in the architectures shown in FIGS. 1, 2, 7, 12, 14 and 16.

FIG. 17 is a simplified block diagram of one illustrative embodiment of a handheld or mobile computing device that can be used as a user's or client's hand held device 16, in which the present system (or parts of it) can be deployed. FIGS. 18-22 are examples of handheld or mobile devices.

FIG. 17 provides a general block diagram of the components of a client device 16 that can run components of architecture 100 or system 660 or the architectures in FIG. 12 or 14 or 16, or that interacts with architecture 100 or system 660 or the other architecture, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including wireless connections to networks.

Under other embodiments, applications or systems are received on a removable Secure Digital (SD) card that is connected to a SD card interface 15. SD card interface 15 and communication links 13 communicate with a processor 17 (which can also embody processors 140, 155, 163, 186, 680, 945 or 1092 from FIGS. 2, 7, 12 and 14) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 18:
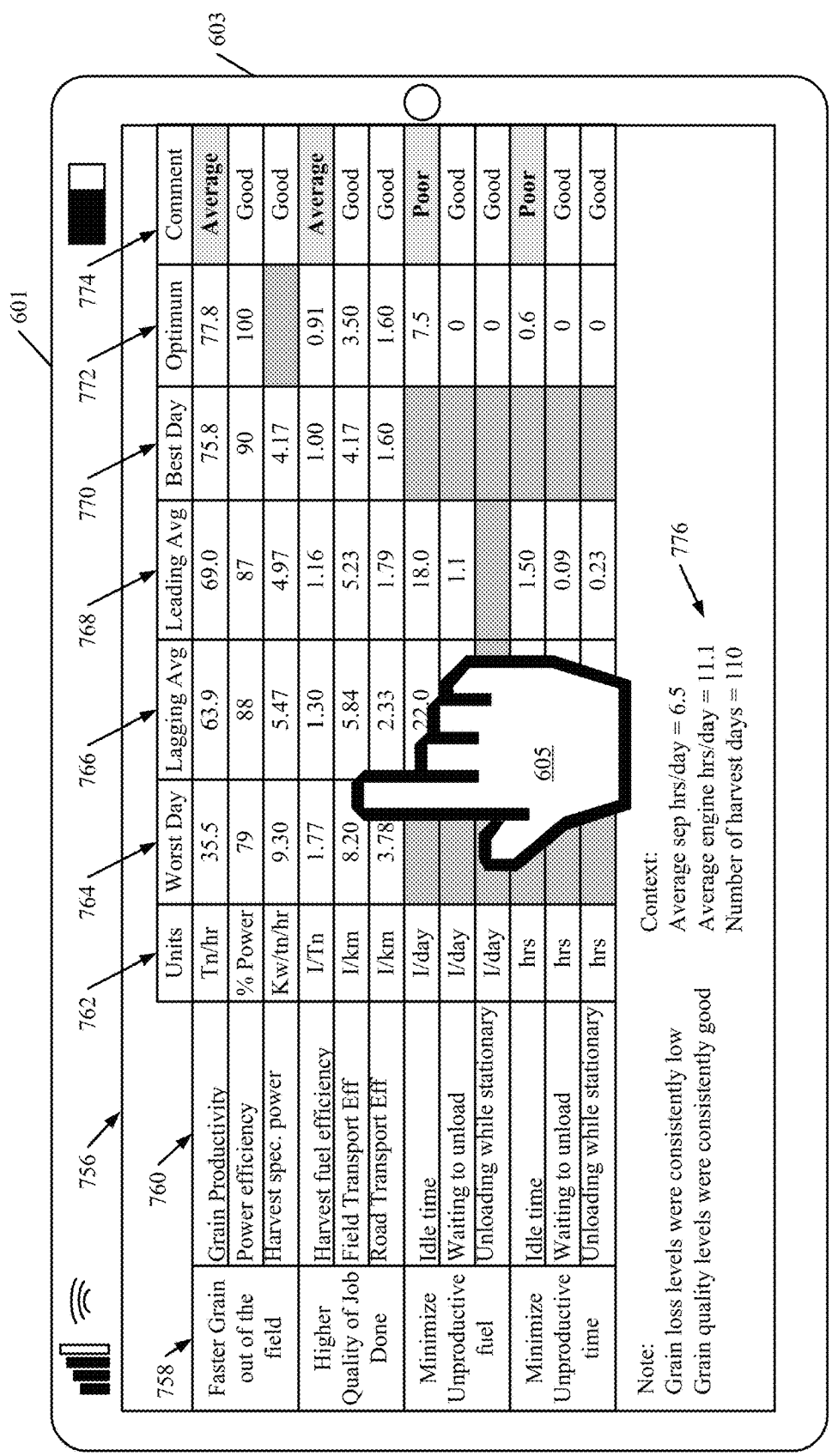

FIG. 18 shows one embodiment in which device 16 is a tablet computer 601. In FIG. 18, computer 600 is shown with the user interface display from FIG. 10A displayed on the display screen 603. Screen 603 can be a touch screen (so touch gestures from a user's finger 605 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 19:
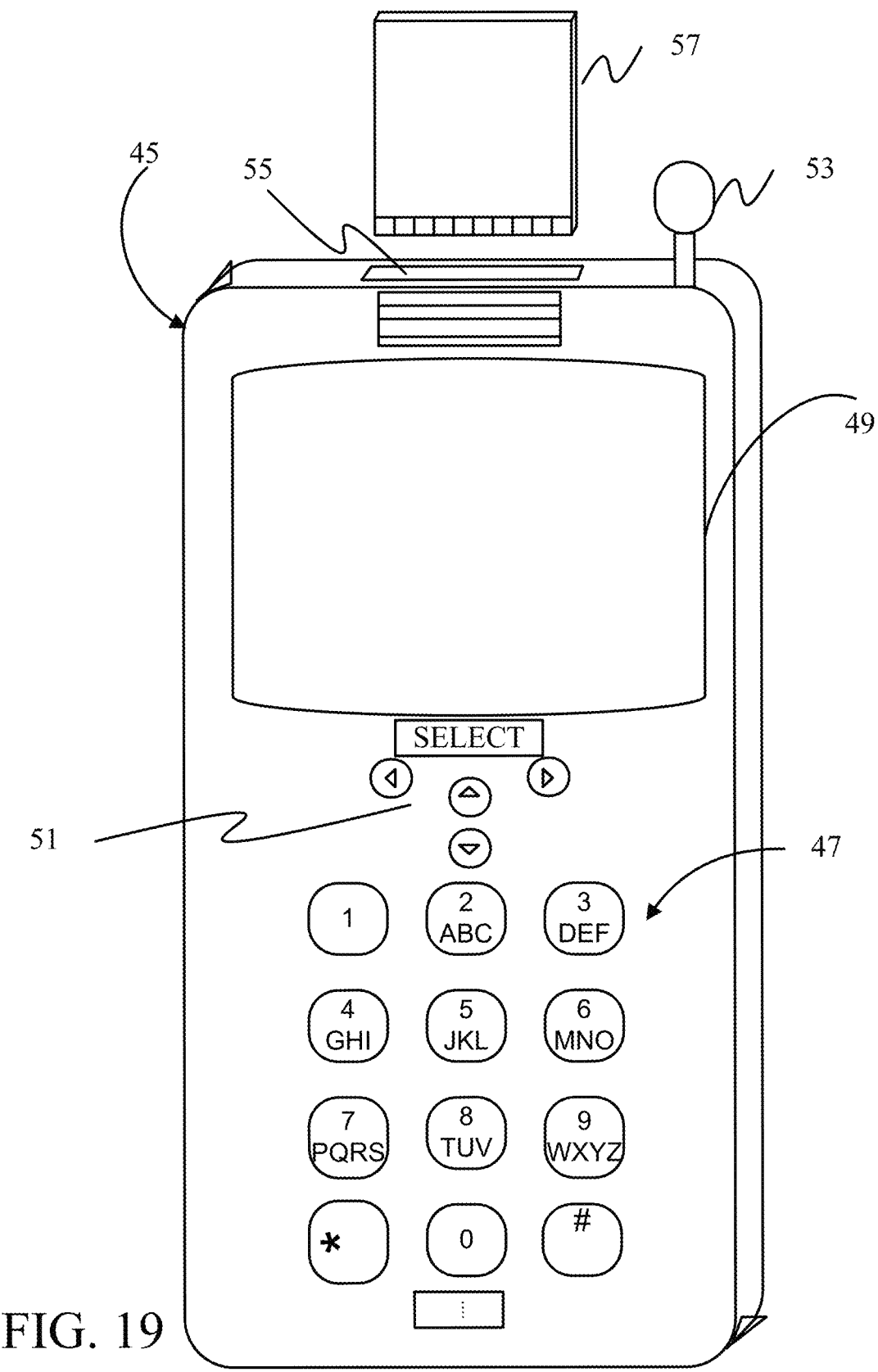
Figure 20:
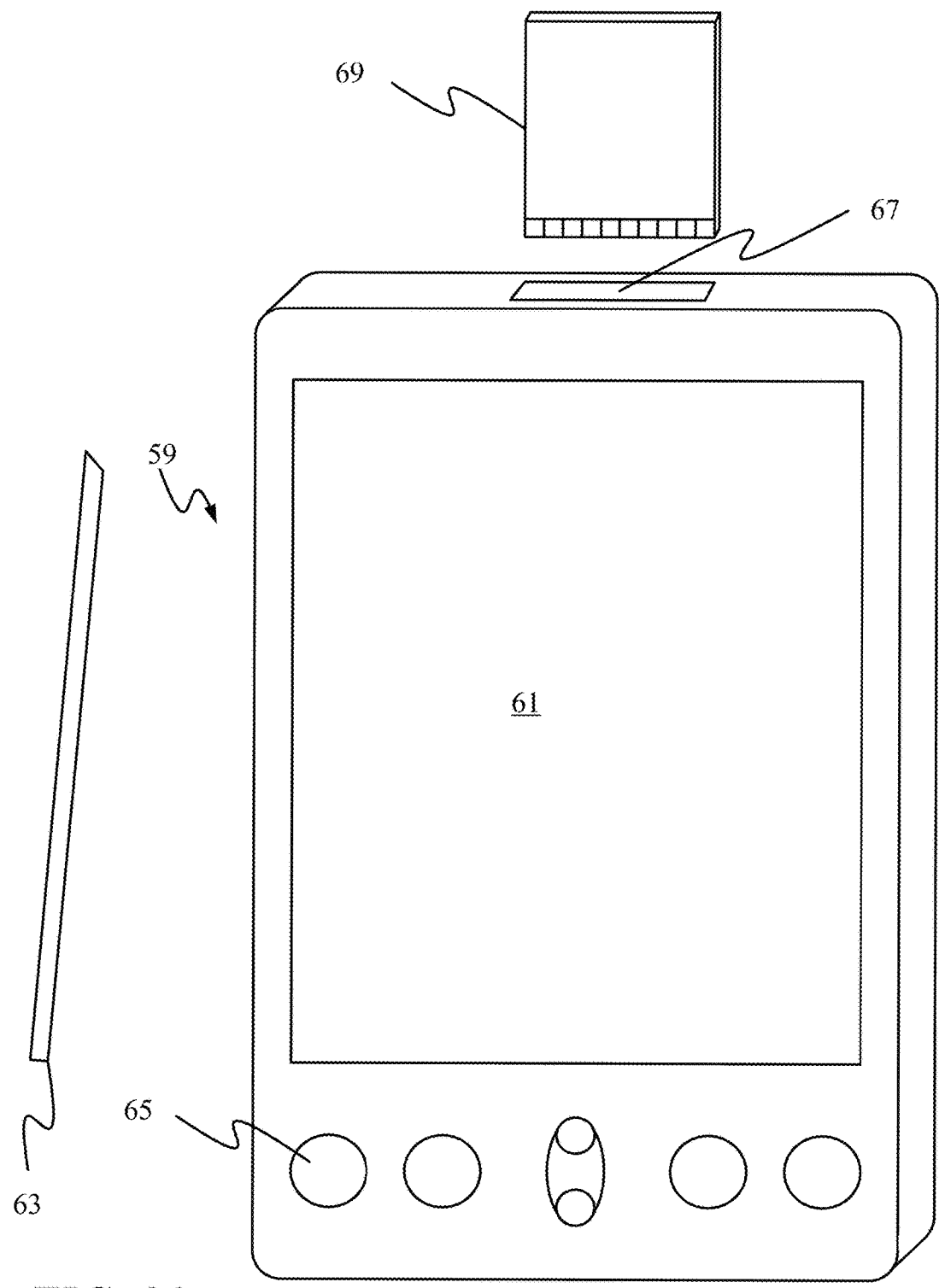

FIGS. 19 and 20 provide additional examples of devices 16 that can be used, although others can be used as well. In FIG. 19, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 20 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 21:
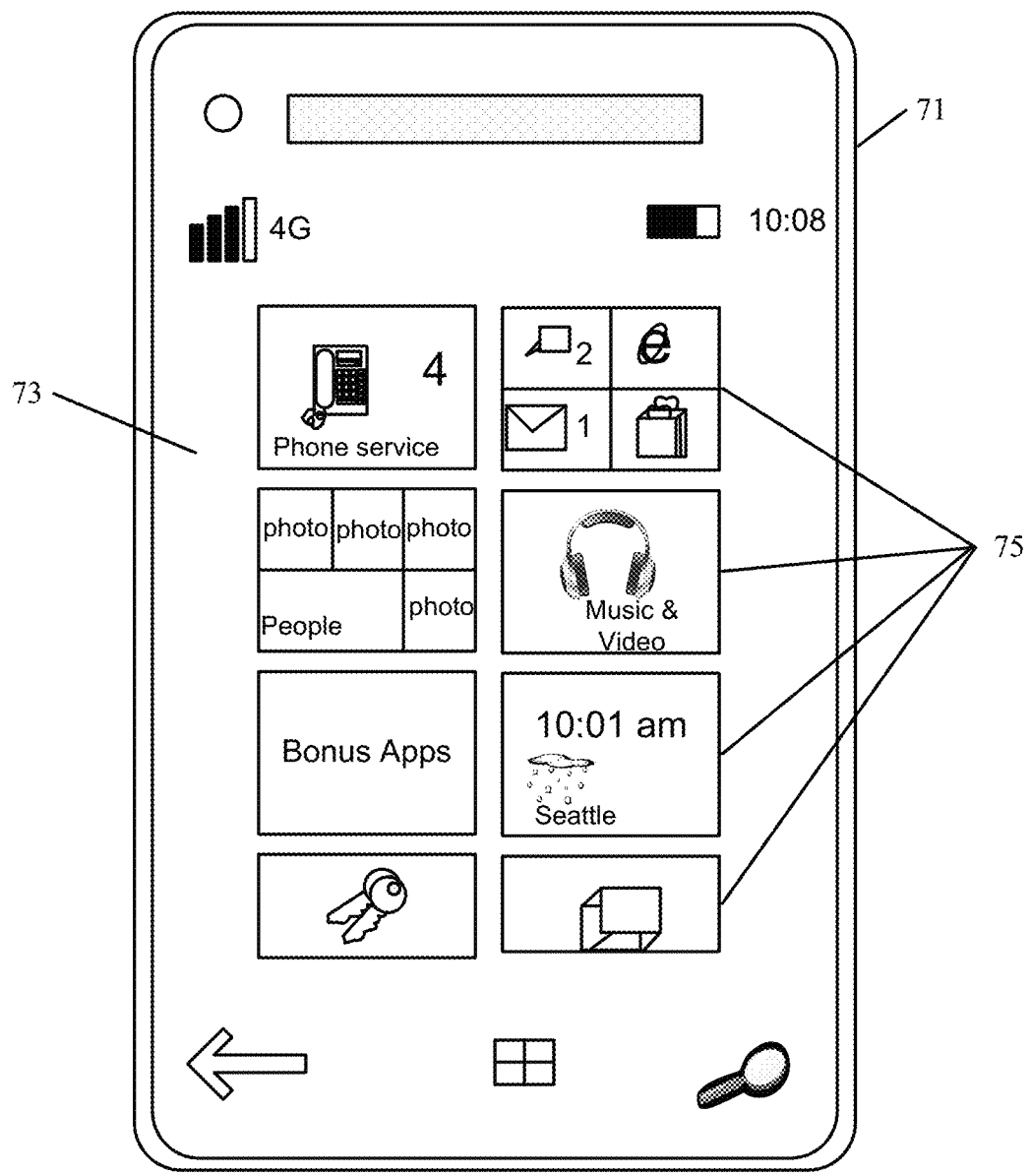
Figure 22:
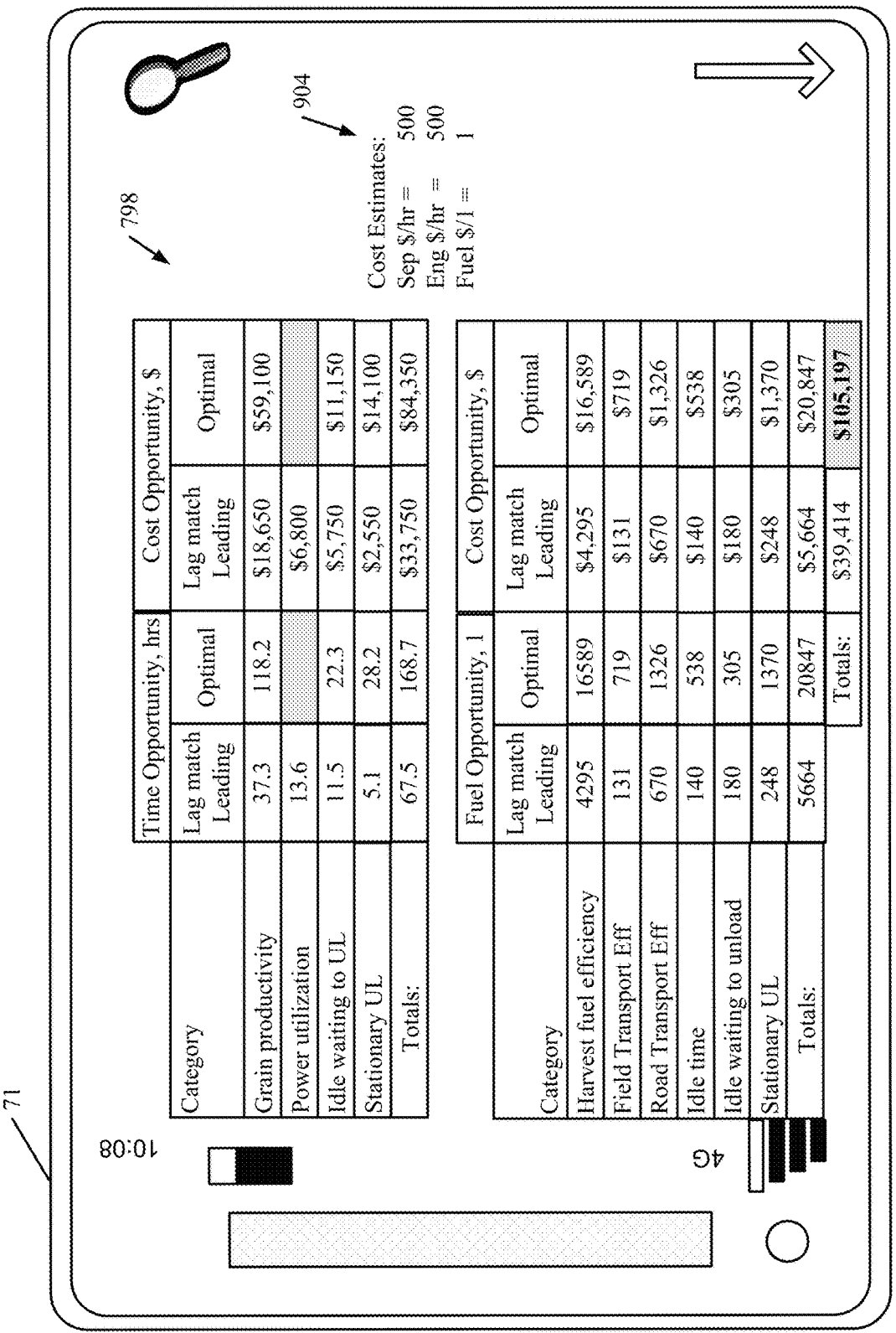

FIG. 21 is similar to FIG. 15 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. FIG. 22 shows phone 71 with the display of FIG. 10B displayed thereon.

Note that other forms of the devices 16 are possible.

Figure 23:
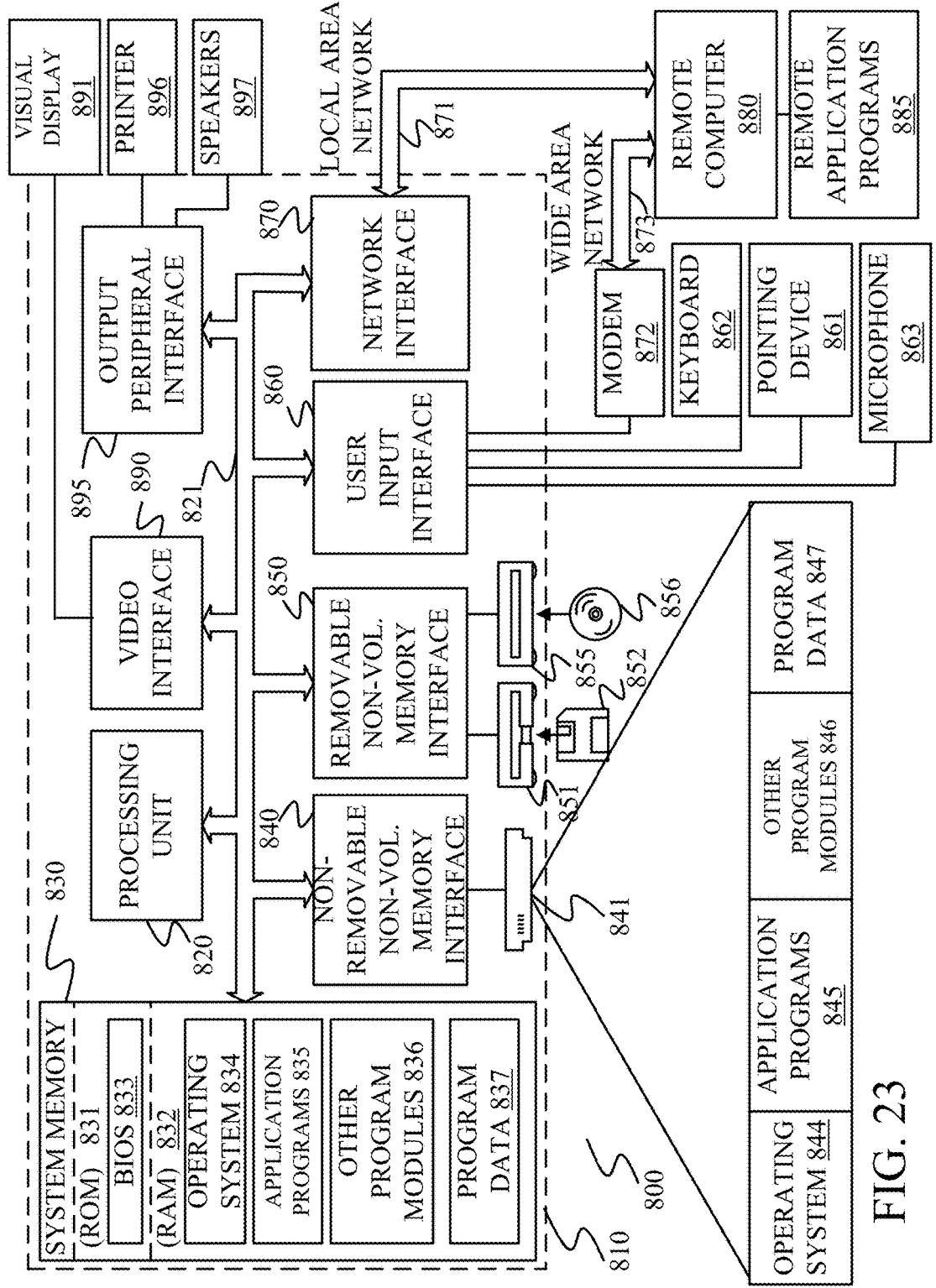
FIG. 23 is a block diagram of one illustrative computing environment which can be used in the architecture shown in FIGS. 1, 2, 7, 12, 14 and 16.

FIG. 23 is one embodiment of a computing environment in which architecture 100, or the other architectures or parts of them, (for example) can be deployed. With reference to FIG. 23, an exemplary system for implementing some embodiments includes a general-purpose computing device in the form of a computer 810. Components of computer 810 may include, but are not limited to, a processing unit 820 (which can comprise processor 140, 155, 163, 186, 680, 952 or 1092), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIGS. 1, 2, 7, 12 and 14 can be deployed in corresponding portions of FIG. 23.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 23 illustrates operating system 834, application programs 835, other program modules 836, and program data 837.

The computer 810 may also include other removable/non-removable volatile/nonvolatile computer storage media. By way of example only, FIG. 23 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 23, provide storage of computer readable instructions, data structures, program modules and other data for the computer 810. In FIG. 23, for example, hard disk drive 841 is illustrated as storing operating system 844, application programs 845, other program modules 846, and program data 847.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 23 include a local area network (LAN) 871 and a wide area network (WAN) 873, but may also include other networks.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 23 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computing system, comprising:
a hardware processor;
a variation opportunity space engine configured to control the hardware processor to identify an agronomic variation opportunity based on agronomic variation data indicative of variation of sensed agronomic parameters that are sensed by sensors on a mobile machine as the mobile machine moves across a piece of land; and
a prescriptive component system comprising:
an opportunity-to-component map that maps the agronomic variation opportunity to a set of prescriptive machine configuration components that modify a configuration on the mobile machine, a set of prescriptive machine control components that modify the mobile machine to automate portions of the control of the mobile machine, and a set of prescriptive data gathering components that modify operation of the sensors on the mobile machine to change a definition with which the agronomic parameters are sensed; and
an opportunity-to-component mapping engine that controls the hardware processor to access the opportunity-to-component map to identify at least one of the set of prescriptive machine configuration components, machine control components or data gathering components based on the agronomic variation opportunity, and wherein, upon identifying the at least one component, the prescriptive component system controls the hardware processor to automatically generate machine control data to modify the mobile machine base on the identified at least one prescriptive component.

2. The computing system of claim 1, and further comprising:
a user interface component that outputs a component identifier that identifies the at least one prescriptive component.

3. The computing system of claim 1 wherein the variation opportunity space engine comprises:
an agronomic variation identifier component configured to receive the agronomic parameters and identify a variation value, corresponding to each agronomic parameter, indicative of variation of each agronomic parameter as the mobile machine moves across a field.

4. The computing system of claim 3 wherein the variation opportunity space engine comprises:
a variation opportunity space identifier component configured to identify a variation opportunity space for the field based on the identified variation values; and
an opportunity aggregation component that identifies a combined opportunity space based on the variation opportunity space for the field and variation opportunity spaces for a plurality of additional fields.

5. The computing system of claim 1 and further comprising:
a financial opportunity space engine configured to estimate a financial impact corresponding to the modified configuration of the at least one component on the mobile machine and to output a financial analysis including the financial impact.

6. A computer implemented method, comprising:
receiving, by a hardware processor, agronomic variation information indicative of sensed agronomic information in a plurality of different categories, the sensed agronomic information being sensed by a set of sensors on a mobile machine as the mobile machine moves across a given portion of land;
controlling, by the hardware processor, an opportunity space engine to quantify a set of agronomic variation opportunities, across the plurality of different categories, based on the agronomic variation information;
controlling, by the hardware processor, a prescriptive component system to access an opportunity-to-component map that maps the set of agronomic variation opportunities to a set of prescriptive machine configuration components that change a configuration of the mobile machine, a set of prescriptive machine control components that modify the mobile machine to automate portions of the control of the mobile machine, and a set of prescriptive data gathering components that modify operation of the sensors on the mobile machine to change a definition with which the agronomic parameters are sensed;
controlling, by the hardware processor, an opportunity-to-component mapping engine to identify at least one perspective component of the set of prescriptive machine configuration components, machine control components or data gathering components based on the quantified set of agronomic variation opportunities;
automatically controlling the mobile machine to apply different level of automated machine control to the mobile machine based on the at least one perspective component and the quantified set of agronomic variation opportunities; and
controlling, by the hardware processor, a user interface component to output the quantified set of agronomic variation opportunities and a control output indicative of the different level of machine control based on the identified at least one perspective component.

7. The method of claim 6 wherein receiving agronomic variation information comprises:
receiving a set of agronomic variation parameters indicative of different types of agronomic information across a given field; and
calculating an agronomic variation value corresponding to each type of agronomic information, for the given field.

8. The method of claim 7 wherein quantifying a set of agronomic variation opportunities comprises:
combining the agronomic variation values to obtain a composite agronomic variation parameter corresponding to the given field; and
classifying an agronomic opportunity space for the given field based on the composite agronomic variation parameter.

9. The method of claim 8 wherein identifying the at least one of the components comprises:
combining the composite agronomic variation parameter for the given field with composite agronomic variation parameters from the fields to obtain an aggregated agronomic variation opportunity space; and
accessing the opportunity-to-component map to identify components that reduce the aggregated agronomic variation opportunity space.

10. The method of claim 9 and further comprising:
obtaining financial information corresponding to the agronomic variation opportunity and the identified component;
estimating a financial savings realized by controlling the at least one of the set of components on the mobile machine in accordance with the agronomic variation opportunity;
generating a financial analysis, based on the financial information, indicative of a cost of controlling the at least one of the set of components and the financial savings; and
outputting the financial analysis.

11. A computing system, comprising:
a hardware processor;
a variation opportunity space engine configured to identify, by the hardware processor, an agronomic variation opportunity based on agronomic variation data indicative of variation of a sensed agronomic parameter that is sensed by a sensor on a mobile machine as the mobile machine moves across a piece of land, the sensor being configured to generate a sensor signal indicative of a value of the sensed agronomic parameter at a first rate; and
a prescriptive component system configured to:
control a recommendation engine, by the hardware processor, to identify a set of prescriptive sensor definition components, based on the agronomic variation opportunity, as components that change the first rate at which the sensor signal is generated to a second rate, based on a variation in the sensed agronomic parameter; and
control the mobile machine to modify the sensor definition level at which the sensor senses the sensed agronomic parameter, based on the identified set of prescriptive sensor definition components, from the first rate to the second rate.

12. The computing system of claim 11 wherein the prescriptive component system is configured to increase the rate at which the sensor signal is generated from the first rate to the second rate, which is a higher rate than the first, based on a level of variation in the sensed agronomic parameter.

* * * * *

UNITED STATES PATENT AND TRADEMARK OFFICE
CERTIFICATE OF CORRECTION

PATENT NO. : 10,311,527 B2  
APPLICATION NO. : 14/546725  
DATED : June 4, 2019  
INVENTOR(S) : Dohn W. Pfeiffer et al.

Page 1 of 1

It is certified that error appears in the above-identified patent and that said Letters Patent is hereby corrected as shown below:

On the Title Page

Item (72) the following inventor should be added:
Sebastian Blank Moline, IL (US)

Signed and Sealed this
Third Day of March, 2020

Andrei Iancu
*Director of the United States Patent and Trademark Office*